United States Patent [19]

Motomura et al.

[11] Patent Number: 5,283,855
[45] Date of Patent: Feb. 1, 1994

[54] NEURAL NETWORK AND METHOD FOR TRAINING THE NEURAL NETWORK

[75] Inventors: Shuji Motomura; Toshiyuki Furuta; Hirotoshi Eguchi, all of Yokohama

[73] Assignee: Ricoh Company, Ltd., Tokyo, Japan

[21] Appl. No.: 795,952

[22] Filed: Nov. 21, 1991

[30] Foreign Application Priority Data

Nov. 22, 1990 [JP] Japan ................. 2-320472
Apr. 23, 1991 [JP] Japan ................. 3-091876
Jul. 19, 1991 [JP] Japan ................. 3-203420

[51] Int. Cl.⁵ ....................... 395 23; 395 27; 395 24
[52] U.S. Cl. ....................... 395/27; 395/23
[58] Field of Search .................. 395/23, 27, 24

[56] References Cited

U.S. PATENT DOCUMENTS

| | | | |
|---|---|---|---|
| 4,893,255 | 1/1990 | Tomlinson, Jr., et al. | 395/24 |
| 5,101,361 | 3/1992 | Eberhardt | 395/24 |
| 5,129,039 | 7/1992 | Hiraiwa | 395/24 |
| 5,131,073 | 7/1992 | Furuta et al. | 395/27 |
| 5,167,006 | 11/1992 | Furuta et al. | 395/11 |

FOREIGN PATENT DOCUMENTS

1244567  9/1989  Japan .

OTHER PUBLICATIONS

Murry et al "Asynchronous VLSI Neural Networks Using Pulse-Stream Arithmetic", 1988 IEEE.
McCluskey "Logic Design Principles," Prentice-Hall, 1986, Front Inside Cover.
1990 Spring National Convention Record, The Institute of Electronics, Information and Communication Engineers, vol. D-56, pp. 6-56, T. Furuta, et al. "Neuron Model Using Pulse Density And Its Self-Learning Circuit".
The Institute of Electronics, Information and Communication Engineers, Oct. 15, 1990, T. Furuta, et al., "Pulse Density Neuron Model Having Learning Function and How To Construct It By Hardwares".
1990 Autumn National Convention Record, The Institute of Electronics, Information and Communication Engineers, vol. D-41, pp. 6-41, T. Furuta, et al. "Development Of Neuro LSI Wuth Self-Learning Function Utilizing Pulse Density".
D. E. Rumelhart, et al., "Leraning Internal Representations By Error Propagation".
K. Katsuhiro et al., "Digital Neuron Model", pp. 415-422.

Primary Examiner—Allen R. MacDonald
Assistant Examiner—George Davis
Attorney, Agent, or Firm—Oblon, Spivak, McClelland, Maier & Neustadt

[57] ABSTRACT

A method and apparatus are disclosed that modify [ies] and generalize [s] the use in artificial neural networks of the error backpropagation algorithm. Each neuron unit first divides a plurality of weighted inputs into more than one group, then sums up weighted inputs in each group to provide each group's intermediate outputs, and finally processes the intermediate outputs to produce an output of the neuron unit. Since the method uses, when modifying each weight, a partial differential coefficient generated by partially-differentiating the output of the neuron unit by each weighted input, the weight can be properly modified even if the output of a neuron unit as a function of intermediate outputs has a plurality of variables corresponding to the number of groups. Since the conventional method uses only one differential coefficient, that is, the differential coefficient of the output of a neuron unit differentiated by the sum of all weighted inputs in a neuron unit, for all weights in a neuron unit, it may be said that the method according to the present invention generalizes the conventional method. The present invention is especially useful for pulse density neural networks which express data as an ON-bit density of a bit string.

31 Claims, 45 Drawing Sheets

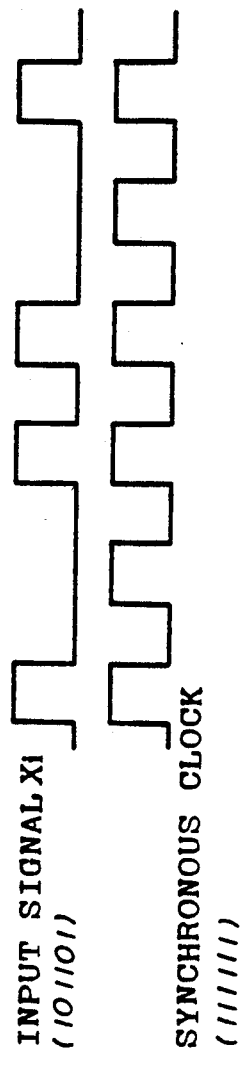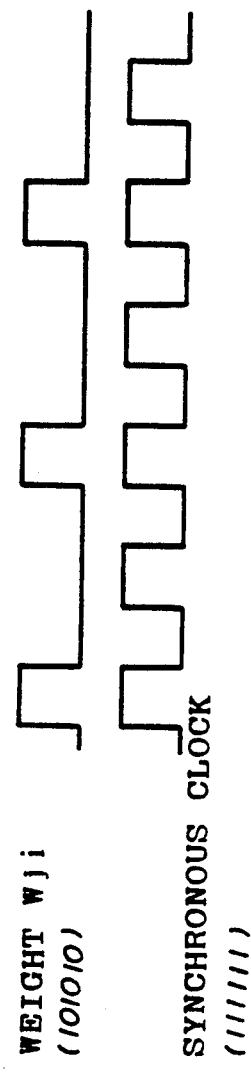
FIG. 6 PRIOR ART
FIG. 7 PRIOR ART

| Z | △ | G |
|---|---|---|
| 1 | 1 | 1 ⎤ G= △ |
| 1 | 0 | 0 ⎦ |
| 0 | 1 | 0 ⎤ G= 0 |
| 0 | 0 | 0 ⎦ |

NEURON UNIT i    NEURON UNIT j

701: INPUT SIGNAL
702: MEMORY
713: FLAG
714: SWICHING CIRCUIT
715, 716: SENSITIVITY

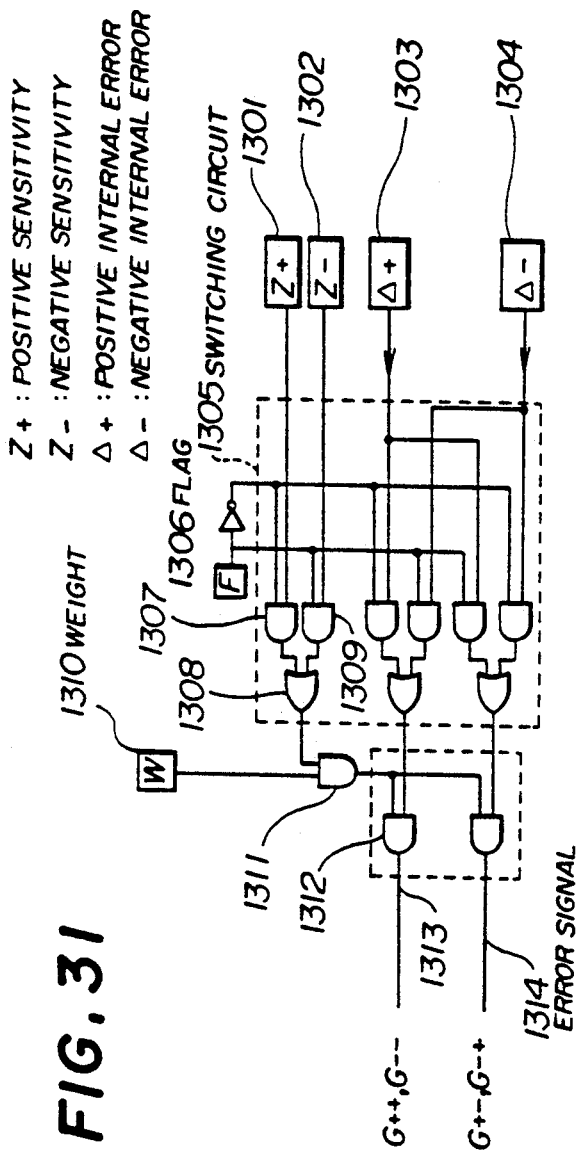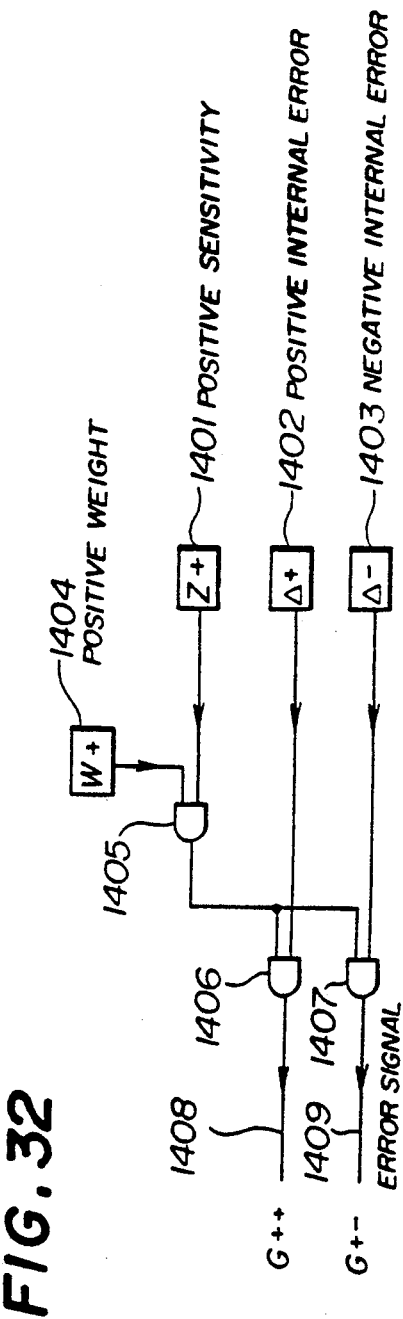
FIG. 31
FIG. 32

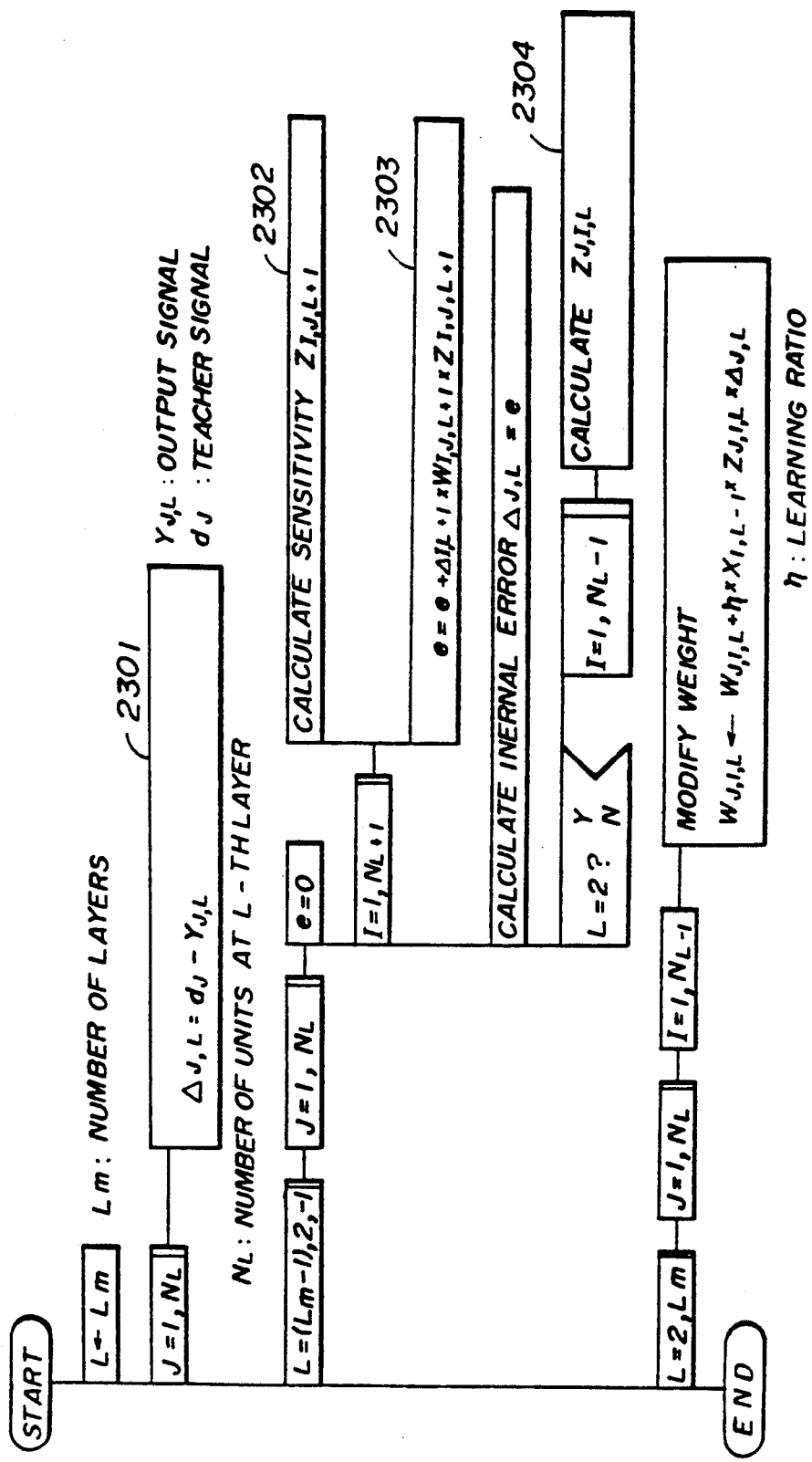

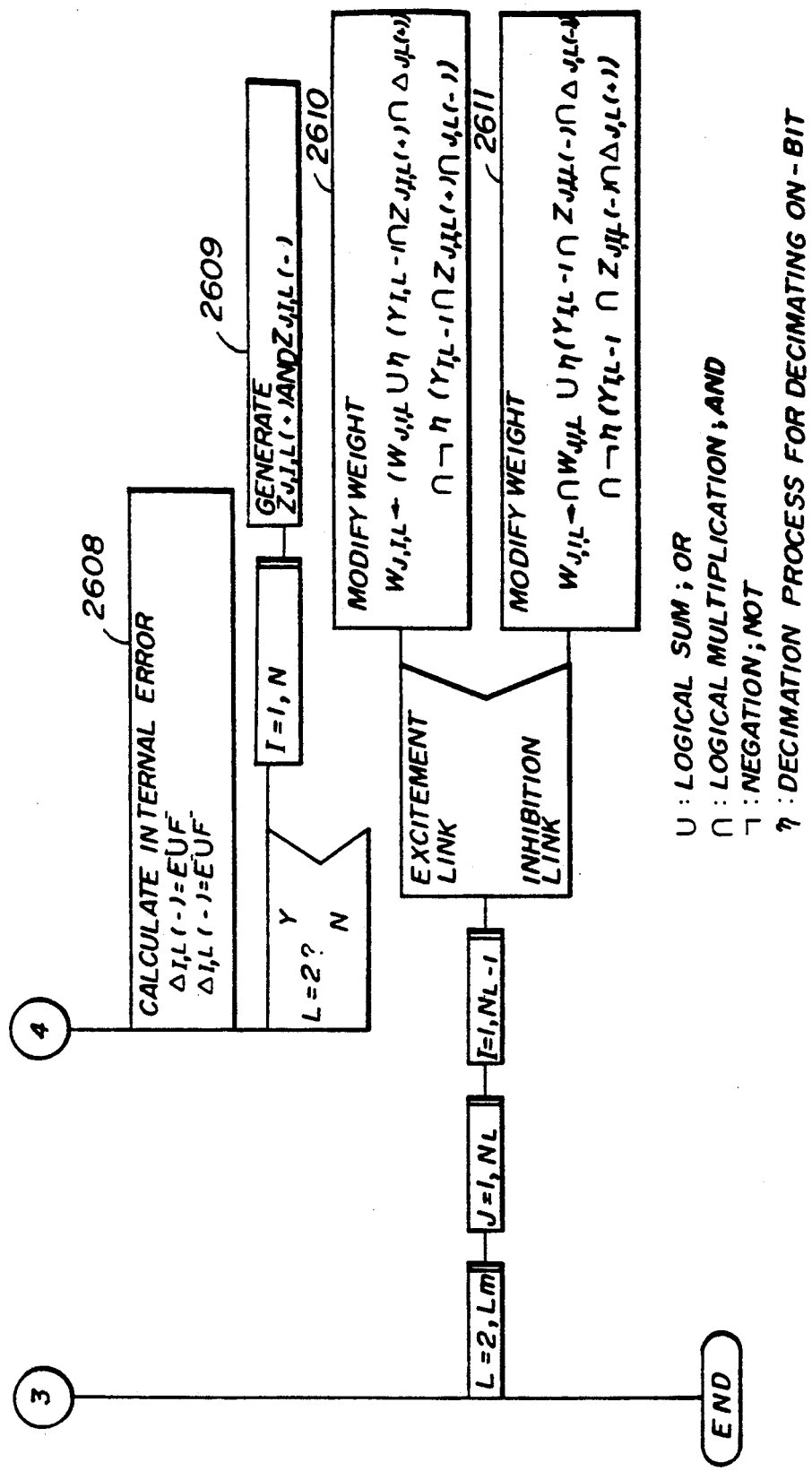

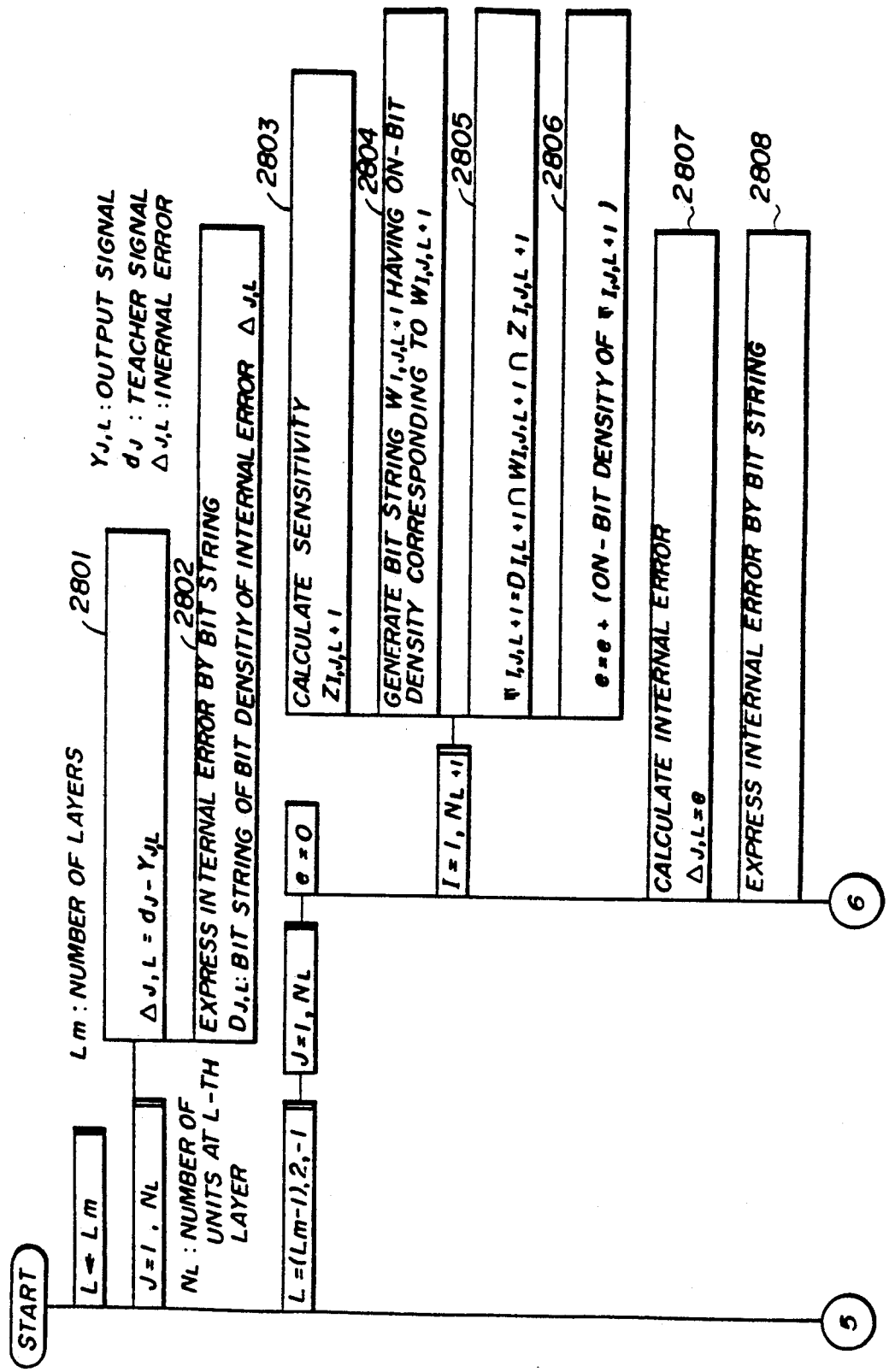

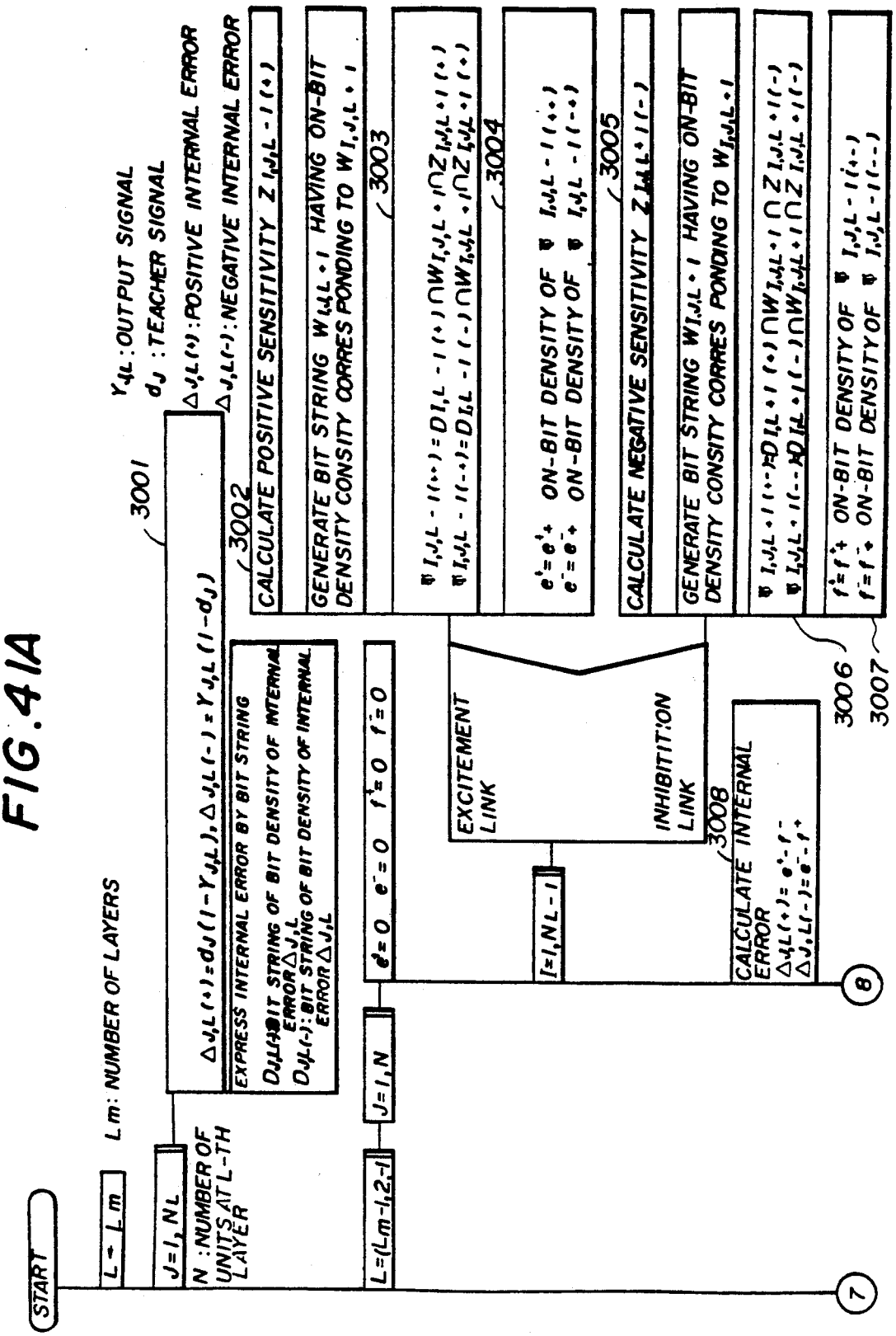

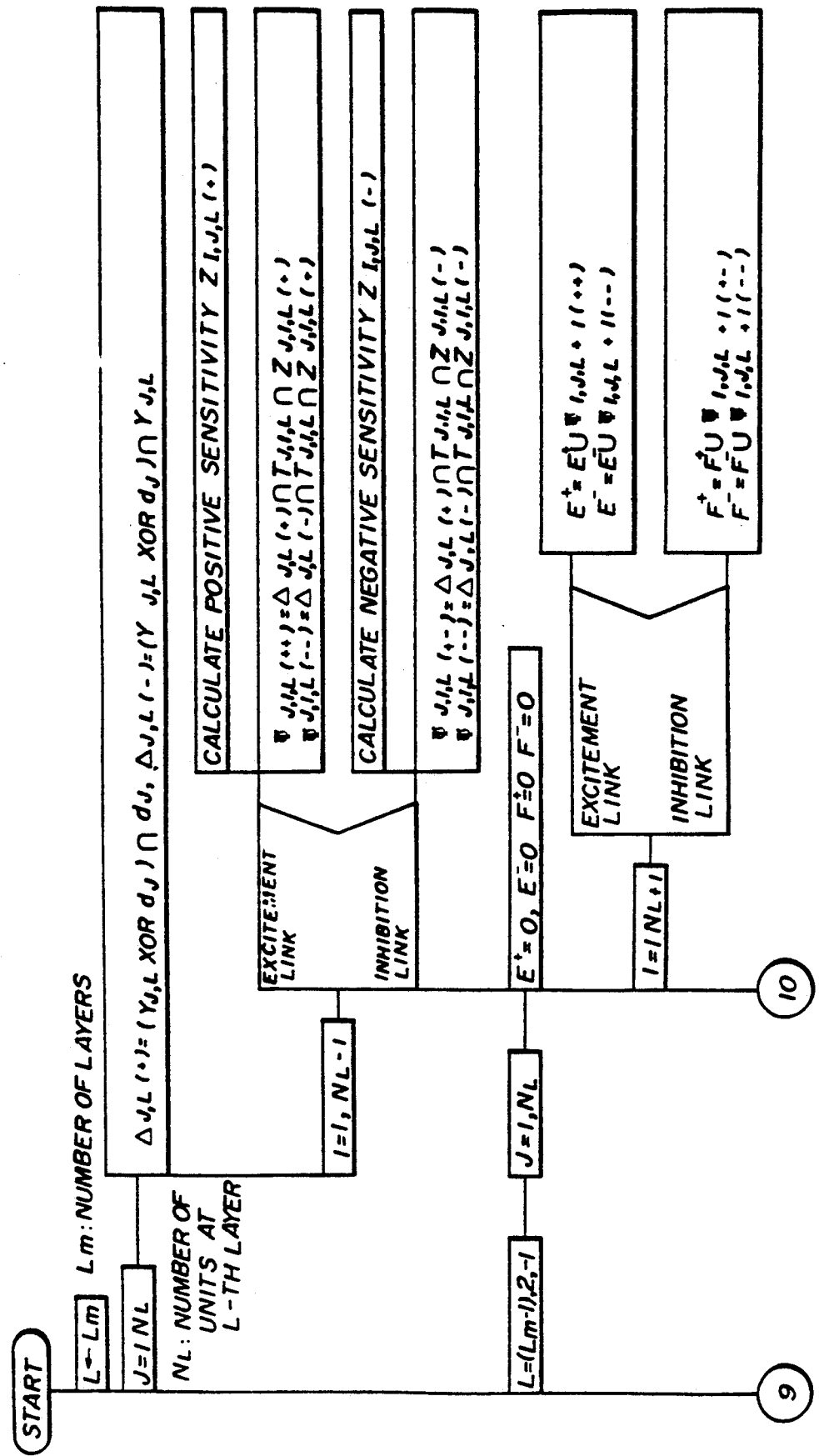

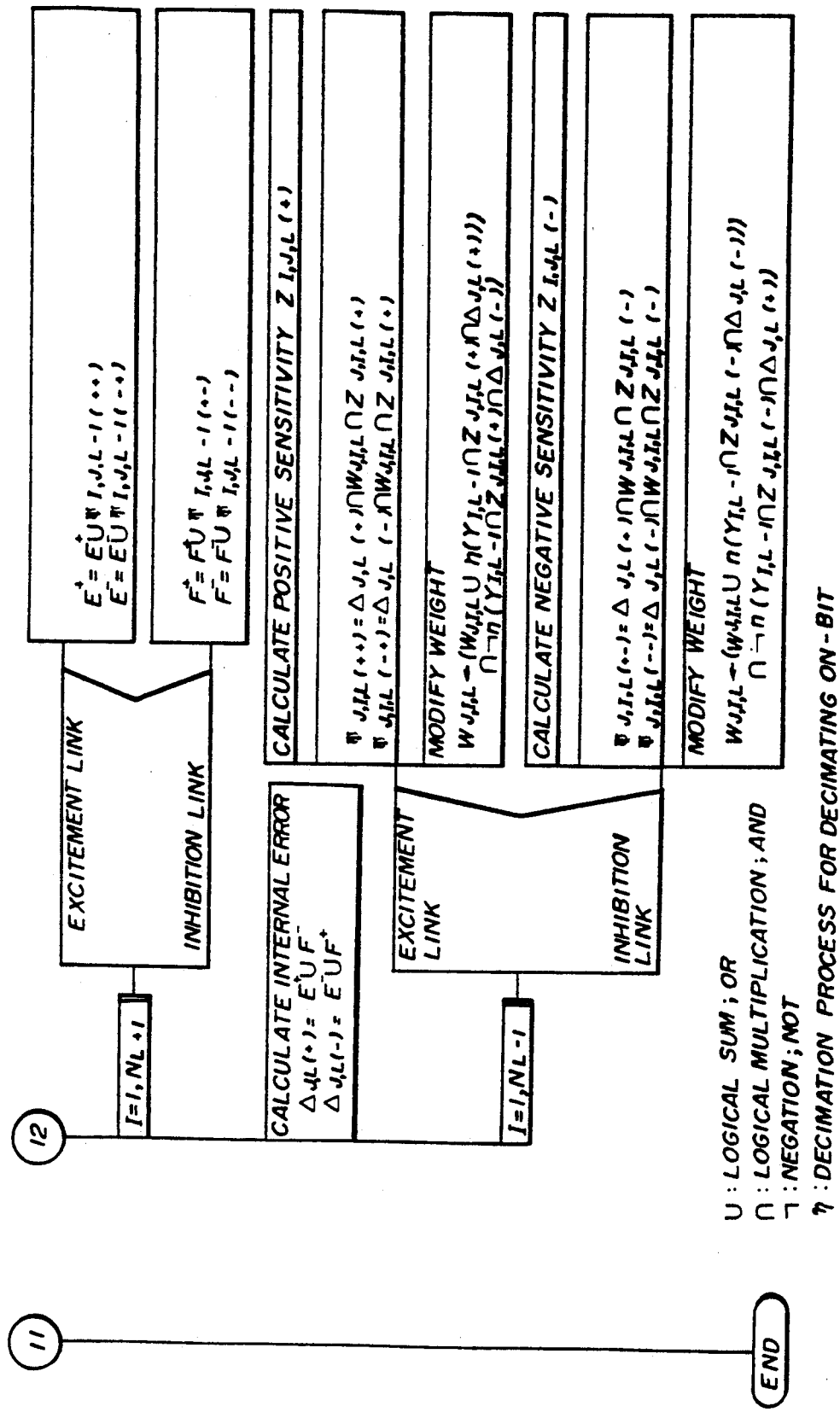

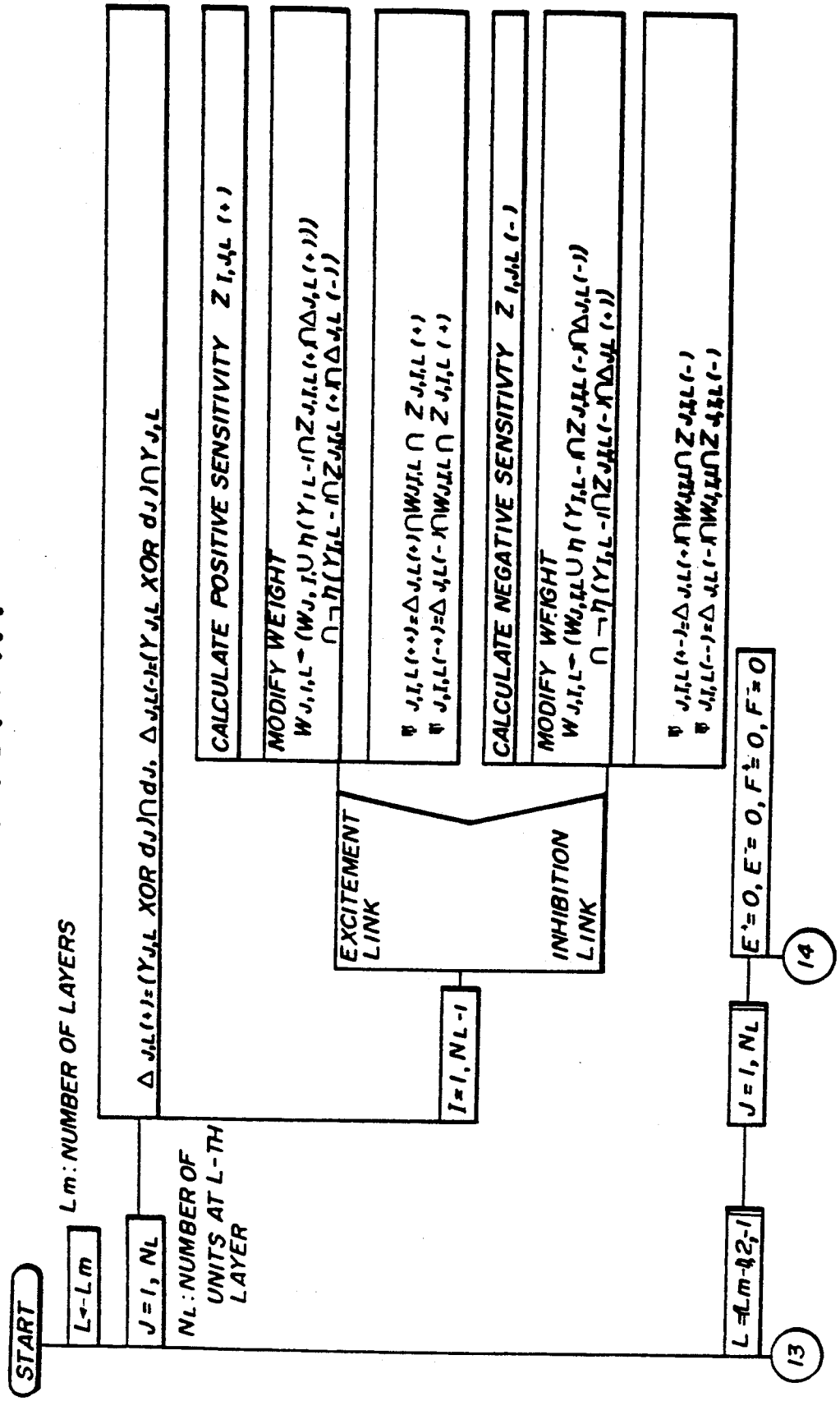

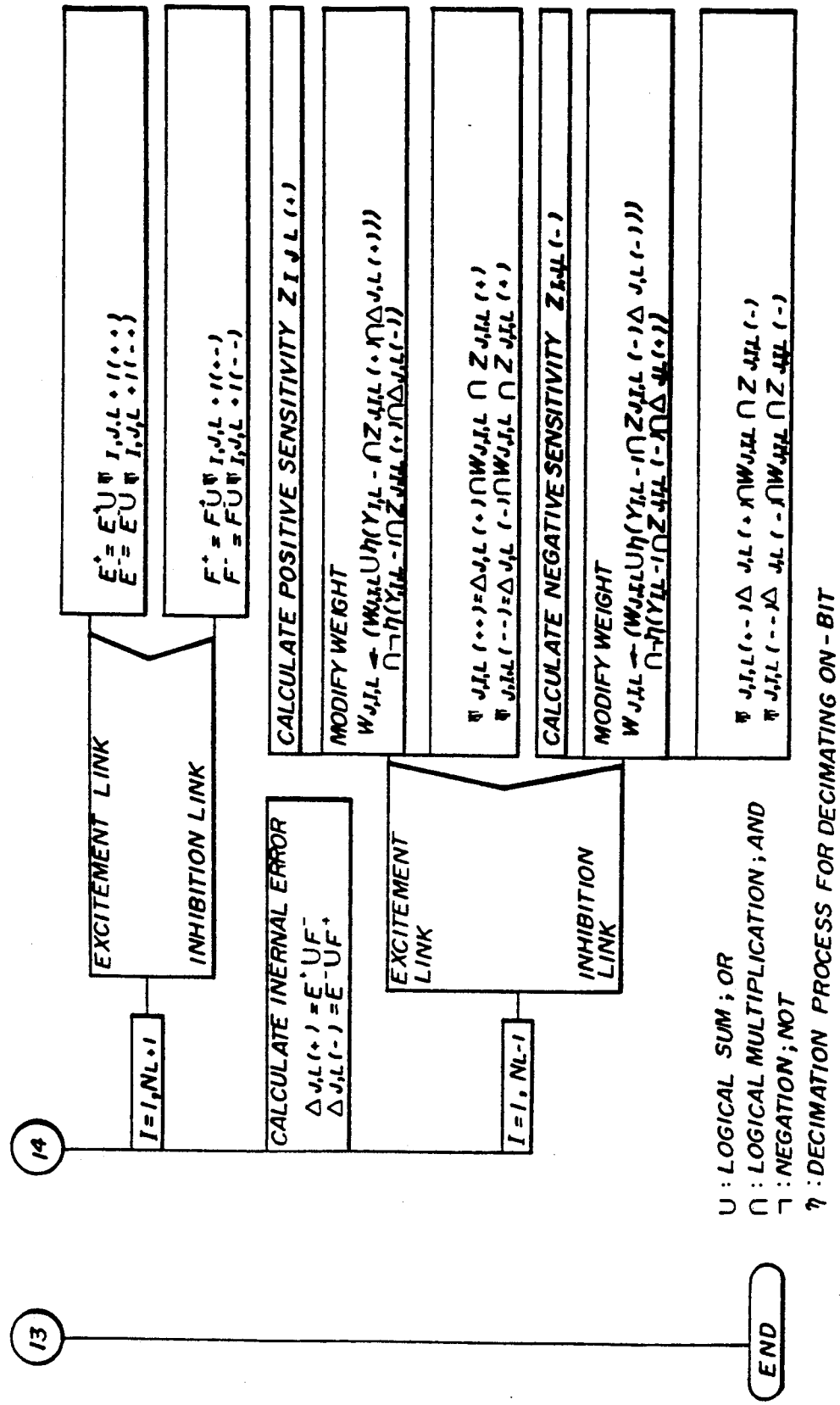

NEURAL NETWORK AND METHOD FOR TRAINING THE NEURAL NETWORK

BACKGROUND OF THE INVENTION

The present invention relates to a neural network and method for training the neural network. An information processor called hierarchical neural network, which attempts to mimic neurobiological systems, includes plural synapses of parallel-distributed-processing elements called neuron units arranged in layers, an input layer A1, an output layer A3, and one or more "hidden" layers A2 (A2-1 and A2-2) in between, as shown in FIGS. 1 and 2. Each unit's output goes to either other units in subsequent layers or outside the network, an output signal $Y_j$ being defined by the unit's weight and threshold as follows with reference to FIG. 3:

$$Y_j = f(net_j) = f\left( \sum_{i=1}^{k} W_{ji} X_i \right), \quad (1)$$

where $W_{ji}$ is a weight (incidentally, in the above equation (1) and hereinafter, a threshold is treated as another weight), $X_i$ is an input signal, and f(x) is a mapping function (so-called sigmoid logistic function) shown in FIG. 4 and defined as follows;

$$f(x) = 1/(1+\exp(-x)) \quad (2)$$

When the weight has been set to a correct level, a complex stimulus pattern (input signal) at the input layer successively propagates via hidden layers to result in a simpler output pattern (output signal). The network can be taught by feeding it an input signal and corresponding expected output signal, referred to as teacher signal; the network can learn by measuring the difference at each output unit between the expected output signal and the output signal that is actually produced. All or appropriate weights are gradually modified by iterating a learning algorithm to provide an output signal which more closely approximates the expected output signal. Hereupon, a backpropagation algorithm, disclosed in Learning Internal Representations by Error Propagation, Chapter 8 of Parallel Distributed Processing, by Rumelhart et al., MIT Press Cambridge, Mass., pp. 318–362, 1986, and has been well-known as such a learning algorithm, uses a gradient search technique to minimize an error function E equal to the mean square difference between the expected output signal $d_j$ and the actual output signal $Y_j$. The error function E is defined in a neural network with "M" outputs and "K" pairs of input and expected output signals, as follows;

$$E = \frac{1}{2} \sum_{r=1}^{K} \sum_{m=1}^{M} [d_m - Y_m]^2 \quad (3)$$

Each weight $W_{ji}$ is modified by adding $\Delta W_{ji} \alpha - \partial E/\partial W_{ji}$ thereto to minimize the error function E, hereupon, $$\frac{\partial E}{\partial W_{ji}} = \frac{\partial E}{\partial net_j} \cdot \frac{\partial net_j}{\partial W_{ji}} = \frac{\partial E}{\partial net_j} \cdot X_i \; (\because (1)) \quad (4)$$

If $\delta_j = -\partial E/\partial net_j$, \quad (5)

$\partial E/\partial W_{ji} = -\delta_j X_i \; (\because (4), (5))$ \quad (6)

$$\therefore \Delta W_{ji} = \eta \delta_j X_i \quad (7)$$

where $\eta$ is called a learning ratio (generally less than 0.5).

In addition, $$\begin{aligned}
\delta_j &= -\partial E/\partial net_j \; (\because (5)) \\
&= -(\partial E/\partial Y_j) \cdot (\partial Y_j/\partial net_j) \\
&= -(\partial E/\partial Y_j) \cdot (\partial f(net_j)/\partial net_j) \; (\because (1))
\end{aligned} \quad (8)$$

If $f'(net_j) = \partial f(net_j)/\partial net_j$, $\delta_j = -(\partial E/\partial Y_j) \cdot f'(net_j)$ In the neuron unit j at an output layer;

$$\delta_j = (d_j - Y_j) f'(net_j) \quad (9(\because (3)))$$

In the neuron unit j at a hidden layer;

$$\delta_j = \sum_{k=1}^{} \delta_k W_{kj} \cdot f'(net_j) \; (\because (1)) \quad (10)$$

Thus, $\delta_j$ regarding the neuron unit j can be expressed by $\delta_k$ of each of neuron units k which receives a signal from the neuron unit j.

Thus, a weight may be modified by the following procedures:

1. CALCULATE ERROR OF NEURON UNIT AT OUTPUT LAYER ($\because$ (9))
2. CALCULATE ERROR OF NEURON UNIT AT LAYER JUST PREVIOUS TO THE OUTPUT LAYER ($\because$ (10) and the above result)
3. CALCULATE SEQUENTIALLY, LAYER BY LAYER, ERROR OF NEURON UNITS LOCATED BETWEEN THE OUTPUT AND INPUT LAYERS ($\because$ (10) and the above result)
4. CALCULATE $\Delta W_{ji}$ ($\because$ (7))

Various methodologies to construct the neural network as hardwares have been proposed; the easiest methodology being to produce it by a software. This software implements various types of neural networks but results in a low operational speed and a bulk-sized computer, so that the method is useful only for the research of the neural network. Accordingly, as another methodology, a neurocomputer architecture built on a chip, as an analog circuit or a digital circuit, has been proposed. The analog neural network expresses each weight as a variable resistor and each unit as an operational amplifier, however the analog network has disadvantages in an instable characteristic depending on temperature, every chip of discrete characteristic, and a low degree of noise tolerance. On the other hand, the digital neural network can overcome the above disadvantages however have a disadvantage in a complicated circuitry construction. Accordingly, the applicant has disclosed a new digital network having a relatively simple circuitry construction, referred to as a pulse-density neural network hereinafter, in Japanese Laid-Open Patent Applications No. 1-179629 and No. 1-343891, and 1990 SPRING NATIONAL CONVENTION RECORD, THE INSTITUTE OF ELECTRONICS, INFORMATION AND COMMUNICATION ENGINEERS D-56, and THE TRANSACTIONS OF THE INSTITUTE OF ELECTRONICS, INFORMATION AND COMMUNICATION ENGINEERS REPORT IDC90-129. In addition, the applicant has also proposed a new neutral network squeezed on an LSI chip in 1990 SPRING NATIONAL CONVENTION RECORD, THE INSTITUTE OF ELECTRONICS, INFORMATION AND COMMUNICATION ENGINEERS D-41. Other various types of pulse-density neural networks are disclosed in Japanese Laid-Open Patent Application No. 1-244567, U.S. Pat. No. 4,893,255, and THE TRANSACTIONS OF THE INSTITUTE OF ELECTRONICS, INFORMATION AND COMMUNICATION ENGINEERS REPORT MBE87-157, pp. 415–422, March, 1988.

A brief description will now be given with reference to FIGS. 5 to 11 of the operation of the pulse-density neural network disclosed by this applicant. As shown in FIG. 5, an input signal 4601, an output signal 4602 and a weight 4603 respectively are expressed as a synchronous bit string comprising an OFF-bit "0" and an ON-bit "1" and its bit density (pulse-density) is expressed as a ratio of the ON-bits for all the bits. As shown in FIGS. 5 to 7, if an input signal (101101) shown in FIG. 6, whose pulse-density is thus 4/6, is input to an AND circuit 4604 with a weight (101010) shown in FIG. 7, whose pulse-density is thus 3/6, the AND circuit 4604 outputs a bit string (101000) to an OR circuit 4605 with multiplex input terminals which functions as the above function f(x). This pulse-density neural network can manage an excitatory synapse whose weight is non-negative, and an inhibitory synapse whose weight is negative in accordance with one of the following three methodologies:

1. Classifying each synapse into either the excitatory synapse 4909 or inhibitory synapse group 4910, as shown in FIG. 8; Logical operations being individually performed for each group. Instead of the above, each input signal may be classified into the excitatory input group or the inhibitory input group. An output signal of an OR circuit 4906 in the inhibitory synapse group 4910 is inverted by an inverter 4907, and an AND circuit 4908 performs the logical multiplication for the output of an OR circuit 4905 and that of the inverter 4907 to produce an output signal 4902.

2. Providing memories 5011 for storing information for classifying each synapse into an excitatory synapse or an inhibitory synapse, and set circuits 5012 connected to the corresponding memory 5011, for classifying each weight in accordance with the information stored therein, as shown in FIG. 9; i.e., "0" stored in the memory 5011 indicates the excitatory synapse whereas "1" stored therein indicates the inhibitory synapse. OR circuits 5005 and 5006, an inverter 5007, and an AND circuit 5008 respectively correspond to the OR circuits 4905 and 4906, the inverter 4907, and the AND circuit 4908, and a duplicate description thereof will be omitted.

3. Expressing each weight into a subtraction of a negative weight (component) $W_{ji-}$ from a positive weight (component) $W_{ji+}(W_{ji+}-W_{ji-}, W_{ji+} \geq 0$ and $W_{ji-} \geq 0)$, and storing the positive weight into a memory 5103 and the negative weight into a memory 5104, as shown in FIG. 10. An AND circuit 5105 performs the logical multiplication for an input signal 5101 and the positive weight whereas an AND circuit 5106 performs the logical multiplication for an input signal 5101 and a negative weight. OR circuits 5107 and 5108, an inverter 5109, and an AND circuit 5110 respectively correspond to the OR circuits 4905 and 4906, the inverter 4907, and the AND circuit 4908, and a duplicate description thereof will be omitted.

The above three methodologies have characteristics in that, when the pulse-density "0" of the input signal is supplied, that of the output signal becomes accordingly "0". In addition, the input signal from the inhibitory synapse group influences more strongly than that from the excitatory signal. However, the above three methodologies have a disadvantage in that their mapping functions are approximately expressed as a function shown in FIG. 11 similar to the sigmoid function shown in FIG. 4 but whose longitudinal axis is biased toward the negative direction. Accordingly, the applicant has improved the above three methodologies, as disclosed in Japanese Laid-Open Patent Application No. 2-316505, to approximate the sigmoid function shown in FIG. 4. Briefly speaking, as shown in FIGS. 12 to 14 respectively corresponding to FIGS. 8 to 10, the improved pulse-density neural network uses a logic operational circuit (5214, 5314, or 5414) and a predetermined input signal (5213, 5313, or 5413) generated by an external pulse generator. Since the bit density of the predetermined input signal can be freely adjusted, the output signal will preferably approximates to the sigmoid function if the bit density thereof is set to 0.5.

However, each of the above pulse-density neural networks has the following disadvantage: The backpropagation algorithm using the equation (1) can be applied to a digital neural network which is not the pulse-density neural network and manages both excitatory and inhibitory synapses, since "$net_j$" can freely choose a positive or negative value and thus express two variables. But, contrastingly, the backpropagation algorithm using the equation (1) cannot be applied to each of the above pulse-density neural networks which manages both the excitatory and inhibitory synapses since the pulse-density can only take a positive value and thus express only one variable. Accordingly, it is necessary for each pulse-density neural network compatible with both the excitatory and inhibitory synapses to individually process two variables so as to generate an output signal defined by the following equation (11).

$$Y_j = f\{X_{i+}, X_{i-}\} \tag{11}$$

Incidentally, U. Hirai has disclosed a new pulse-density neural network in NIKKEI MICRODEVICES JULY, 1988, pp. 72–75, and Japanese Laid-Open Patent Application No. 1-244567, in which an updown counter is used to calculate "$net_j$" for two variables. However, Hirai's neural network has a disadvantage in that the updown counter complicates the circuitry construction of the neural network.

SUMMARY OF THE INVENTION

Accordingly, it is a general object of the present invention to provide a novel and useful backpropagation algorithm and neural network using the backpropagation algorithm in which the above disadvantages are eliminated.

Another and more specific object of the present invention is to provide a backpropagation algorithm compatible with a multivariate function of output signal and a pulse-density neural network having a relatively simple circuitry construction and adopting the backpropagation algorithm.

According to one feature of the present invention, a method for training of a neural network which includes an input layer, an output layer, and at least one hidden layer located between the input layer and output layer, the input layer, hidden layer and output layer each respectively including at least one neuron unit, neuron units arranged at successive layers being interconnected to each other via a synapse, an input to be supplied to each neuron unit being weighted by a weight of a corresponding synapse and thus each neuron unit receiving a weighted input, each neuron unit dividing a plurality of weighted inputs into more than one group and then summing up the weighted inputs in each group to provide each group's intermediate outputs, and finally processing the intermediate outputs to produce an output of the neuron unit, comprises the steps of supplying an input signal to the neuron unit at the input layer, and a desired output to be generated from the neuron unit at the output layer if the input signal is supplied to the neuron unit at the input layer, to the neuron unit at the output layer, calculating an internal error of a neuron unit at the output layer as a difference between the desired output signal and an actual output of the neuron unit at the output layer, calculating a partial differential coefficient by partially-differentiating, with respect to each weighted input, the output of the neuron unit, calculating an error signal by using the partial differential coefficient, weight, and internal error, calculating sequentially, layer by layer, an internal error of the neuron unit at a hidden layer by summing error signals backpropagated to the neuron unit from neurons at higher layer, and modifying, by using the partial differential coefficient and the internal error, the weight of each of the weighted inputs, so that the output of the neuron unit at the output layer can approximate the desired output.

According to another feature of the present invention, a neural network comprises an input layer, an output layer, and at least one hidden layer located between the input layer and output layer, wherein the input layer, hidden layer and output layer each respectively includes at least one neuron unit, neuron units arranged at subsequent layers being interconnected to each other via a synapse, an input to be supplied to each neuron unit being weighted by a weight of a corresponding synapse and thus each neuron unit receiving a weighted input, and wherein each neuron unit comprises output signal generating means for generating an output from a plurality of weighted inputs by dividing the plurality of weighted inputs into more than one group, then summing up weighted inputs in each group to provide each group's intermediate outputs, and finally processing the intermediate outputs to produce an output of the neuron unit, internal error generating means for generating an internal error which is a difference between a desired output signal and an actual output signal of the neuron unit at the output layer, sensitivity generating means for generating a sensitivity which is a partial differential coefficient generated by partially-differentiating the output of the neuron unit by each weighted input, error signal generating means for generating an error signal by using the sensitivity, the error signal being backpropagated to the internal error generating means of a previous neuron unit so as to define the internal error of the previous neuron unit, and weight modifying means, coupled to the internal error generating means and sensitivity generating means, for modifying each weight of the weighted inputs by using the internal error and sensitivity.

According to one aspect of the present invention, since the partial differential coefficient is used to calculate the error signals and modify the weight of the weighted inputs, the weight can be properly modified. Since the conventional method only can manage one group and uses the differential coefficient of the output of the neuron unit differentiated by the weighted inputs, it may be said that the method according to the present invention generalizes the conventional method. According to another aspect of the present invention, because of the sensitivity generating means, a neural network having a relatively simple construction and adopting the above method can be provided. The present invention is especially useful for the pulse-density neural network.

Other objects and further features of the present invention will become apparent from the following detailed description when read in conjunction with the accompanying drawings.

BRIEF DESCRIPTION OF THE DRAWINGS

FIG. 6 shows the input signal having a pulse-density of 4/6 used for the pulse-density neural network shown in FIG. 5;

FIG. 7 shows a weight having a pulse-density of 3/6 used for the pulse-density neural network shown in FIG. 5;

FIG. 31 shows one example of a circuitry diagram of error signal generating means shown in FIGS. 20 to 23;

FIG. 32 shows another example of a circuitry diagram of the error signal generating means shown in FIGS. 20 to 23;

FIG. 37 shows a first problem analysis diagram (PAD) for explaining a learning method according to the present invention using a monovariate error signal, internal error, and sensitivity which are to be expressed by a real number value;

FIGS. 39A and 39B show a third PAD for explaining a learning process according to the present invention using a bit string of error signal, internal error, and sensitivity;

FIGS. 40A and 40B show a fourth PAD for explaining a learning process according to the present invention using a monovariate error signal, internal error, and sensitivity which are freely expressed by a bit string or a real number value;

FIGS. 41A and 41B show a fifth PAD for explaining a learning process according to the present invention using a bivariate error signal, internal error, and sensitivity which are freely expressed by a bit string or a real number value;

FIGS. 42A and 42B show a sixth problem analysis diagram for explaining a learning process according to the present invention which modifies that shown in FIGS. 41A and 41B;

FIGS. 43A and 43B show a seventh problem analysis diagram for explaining a learning process according to the present invention which modifies that shown in FIGS. 42A and 42B;

FIGS. 44A and 44B show an eighth problem analysis diagram for explaining a learning process according to the present invention which modifies that shown in FIGS. 43A and 43B;

DESCRIPTION OF THE PREFERRED EMBODIMENTS

Figure 15:
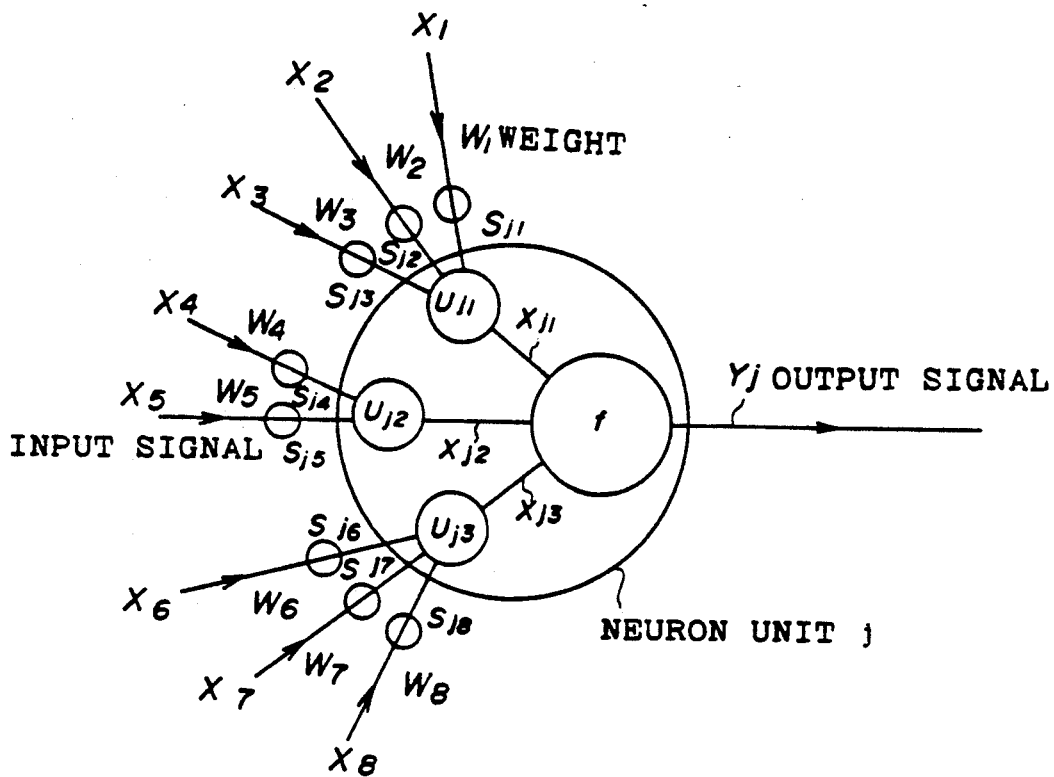
FIG. 15 shows a view for explaining an expanded backpropagation algorithm according to the present invention.

According to an expanded backpropagation algorithm of the present invention, a neuron unit $j$ divides "k" input signals into "t" groups and generates an output signal $Y_j = f(X_{j1}, X_{j2}, \ldots X_{jt})$ by processing each group of input signals $(X_{j1}, \ldots X_{jt})$. If "n" input signals are input to a m-th group in "t" groups, $X_{jm} = U_{jm}(S_{j1}(m), \ldots S_{jn}(m))$, $(m=1 \ldots t)$; $S_{ji}$ denoting an input signal Xi weighted by $W_{ji}$. For example, as shown in FIG. 15, if k=8 and t=3, $Y_j = f(X_{j1}, X_{j2}, X_{j3})$. Hereupon, $$\text{if } Z_{ji} = \partial f/\partial S_{ji} \qquad (12)$$
$$= (\partial f/\partial U_{jr}) \cdot (\partial U_{jr}/\partial S_{ji})$$

where $r=1, \ldots t$, $U_{jr}$ corresponds to $S_{ji}$ (for example, $U_{j2}$ corresponds to $S_{j4}$ and $S_{j5}$ in FIG. 15) and $Z_{ji}$, which is referred to as a sensitivity hereinafter, representing a ratio of an increased amount of an output signal for a minutely-increased amount of a weighted input signal, will supersede $f'(net_j)$ hereinafter. If $Y_j$ is defined by the equation (1)

$$t=1, U_{j1} = \Sigma S_{jk}, X_{j1} = net_j, \text{ and } Z_{ji} = \partial f/\partial S_{ji} = f'(net_j).$$

But, if $Y_j$ is defined by the equation (11), $Z_{ji}$ is expressed by using $U_{j+}(=X_{j+})$ and $U_{j-}(=X_{j-})$ as follows:

$$Z_{ji+} = (\partial f/\partial U_{j+}) \cdot (\partial U_{j+}/\partial S_{ji}) \qquad (13)$$

$$Z_{ji-} = (\partial f/\partial U_{j-}) \cdot (\partial U_{j-}/\partial S_{ji}) \qquad (14)$$

where $Z_{ji+}$ is referred to as a positive sensitivity whereas an absolute value of $Z_{ji-}$, $|Z_{ji-}|$ is referred to as a negative sensitivity, hereinafter.

Moreover, if the output signal Yj is defined by a multivariate functional, such as $Y_j = f(X_{1j}, X_{2j}, \ldots X_{tj})$, it is not opposite to express an error term $\delta_j$ by "net j", as indicated by the equation (5). Accordingly, $\Delta_j$, defined as follows and referred to as an internal error of a neuron unit j, will supersede $\delta_j$.

$$\Delta_j = -\partial E/\partial Y_j \qquad (15)$$

The present invention improved, by means of the sensitivity and internal error, the error propagation and weight modification in the conventional backpropagation algorithm. Firstly, the conventional backpropagation algorithm is rewritten with the internal error $\Delta_j$ and $f'(net_j)$. If the output of the neuron unit j is defined by the equation (1), $\delta_j$ is defined with reference to the equations (8) and (15) as follows;

$$\therefore \delta_j = \Delta_j \cdot f'(net_j) \qquad (16)$$

Thus, the conventional backpropagation algorithm can be rewritten as follows:

1) CALCULATE INTERNAL ERROR OF NEURON UNIT AT OUTPUT LAYER $$\Delta_j = d_j - Y_j \qquad (17)$$

2) CALCULATE SEQUENTIALLY, LAYER BY LAYER, INTERNAL ERROR OF NEURON UNITS LOCATED BETWEEN THE OUTPUT AND INPUT LAYERS $$\Delta_{jk} = \Sigma f'(net_k) W_{kj} \Delta_k \qquad (18)$$

(neuron units k receive a signal from a neuron unit

3) MODIFY WEIGHT

A modified weight $W_{ji}'$ is calculated from the previous weight $W_{ji}$ as follows:

$$W_{ji}' = W_{ji} + \delta f'(net_j) X_i \Delta_j \qquad (19)$$

(Incidentally, if $\eta$ is very small, a convergence speed of the weight W becomes small. In addition, if $\eta$ is not an adequate value, the neural network does not learn.)

The expanded backpropagation algorithm according to the present invention can be obtained by using $Z_{kj}$ instead of $f'(net_k)$ in the equation (18), and using $Z_{ji}$ instead of $f'(net_j)$ in the equation (19). Each internal error of each neuron unit is firstly calculated, and then each weight is modified, backwardly from the output layer to the input layer, by means of the calculated internal error, as follows:

1) CALCULATE INTERNAL ERROR OF NEURON UNIT AT OUTPUT LAYER $$\Delta_j = d_j - Y_j \qquad (17)'$$

2) CALCULATE SEQUENTIALLY, LAYER BY LAYER, INTERNAL ERROR OF NEURON UNITS LOCATED BETWEEN THE OUTPUT AND INPUT LAYERS $$\Delta_j = {}_k\Sigma Z_{kj} W_{kj} \Delta_k = \Sigma_k G_{kj} \qquad (18)'$$

(neuron units k receive a signal from a neuron unit j. In addition, $G_{ki}$ is referred to as an error signal hereinafter.)

3) MODIFY WEIGHT

A modified weight $W_{ji}'$ is calculated from the previous weight $W_{ji}$ as follows:

$$W_{ji}' = W_{ji} + \eta Z_{ji} X_i \Delta_j \qquad (19)'$$

(Incidentally, if $\eta$ is very small, a convergence speed of the weight W becomes small. In addition, if $\eta$ is not an adequate value, the neural network does not learn. Further, the input $X_i$ is equal to the output $Y_i$ of a neuron unit i.)

If $Y_j$ is defined by the equation (1), $Z_{kj} = f'(net_k)$ and $Z_{ji} = f'(net_j)$. Since $\delta_k = f'(net_k) \Delta_k$ and $\delta_j = f'(net_j) \Delta_j (\because (8), (15))$, the above procedures are the same as the conventional backpropagation algorithm. In short, the expanded procedures generalize the conventional backpropagation algorithm. The equations (18) and (19) conclude that the amount of a error signal backpropagated to an arbitrary synapse and a modified amount of a weight of the synapse are determined based on how influential a sensitivity of the synapse is in the output signal.

Figure 1:
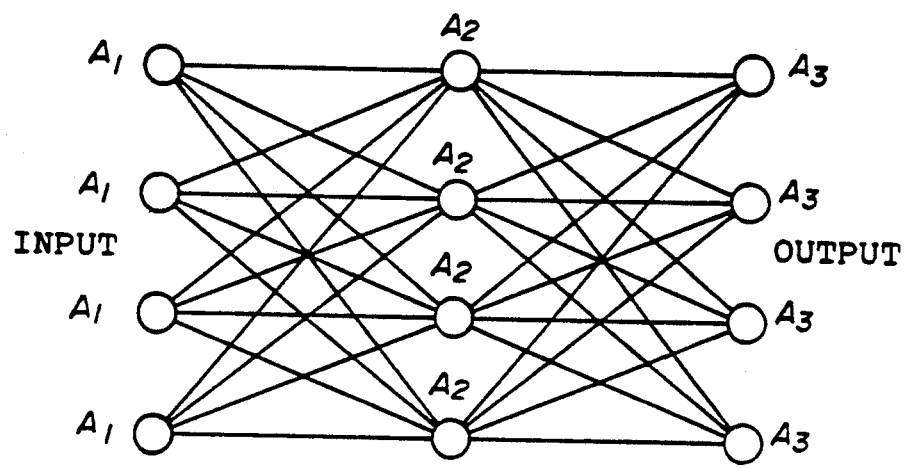
FIG. 1 schematically shows a conventional general hierarchical neural network having one hidden layer.
Figure 2:
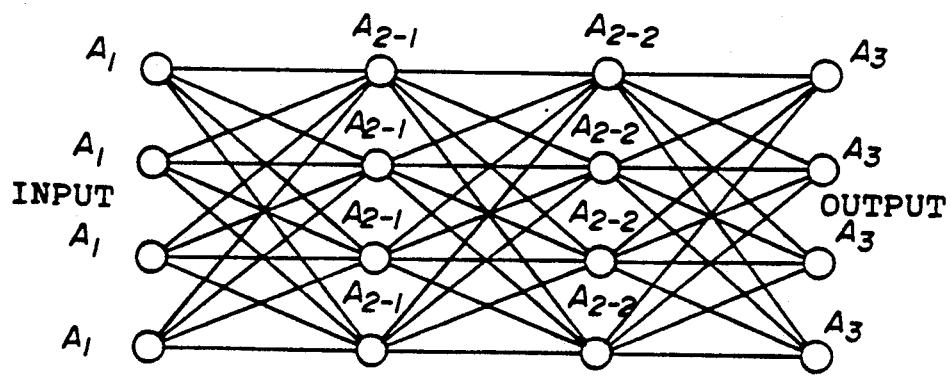
FIG. 2 schematically shows a conventional general hierarchical neural network having two hidden layers.
Figure 3:
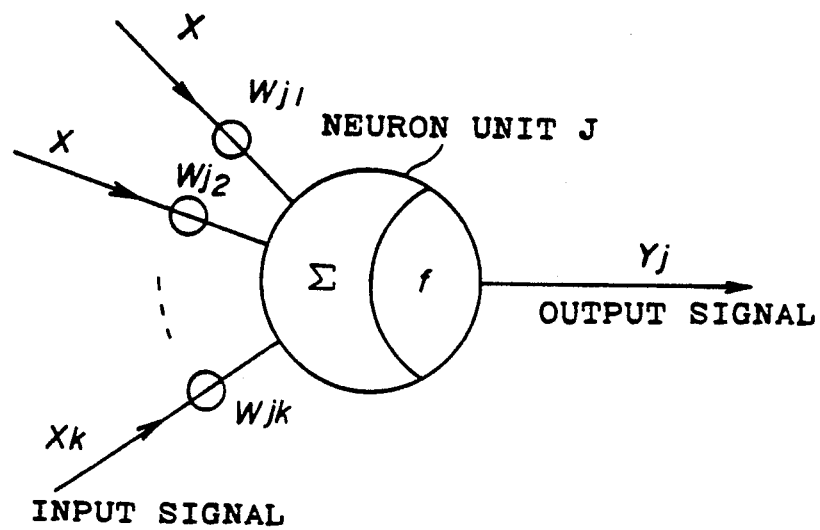
FIG 3 schematically shows a neuron unit j in a conventional neural network which receives K input signals.
Figure 4:
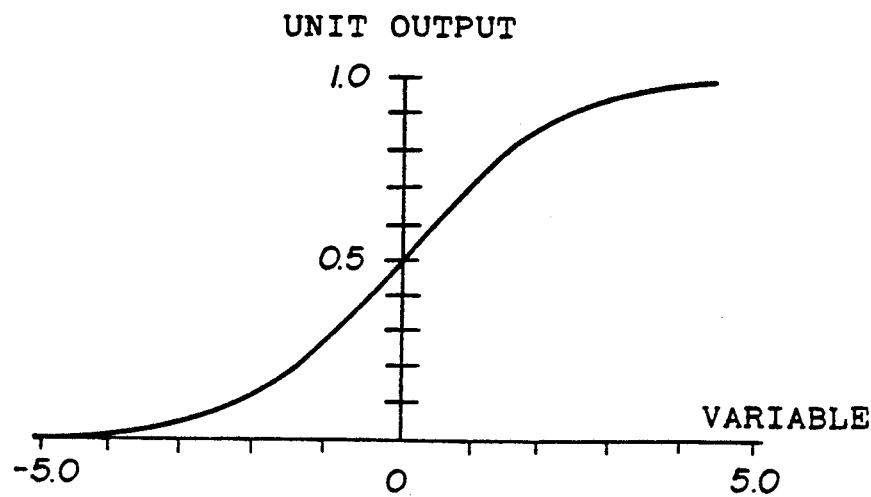
FIG. 4 shows a sigmoid function.
Figure 5:
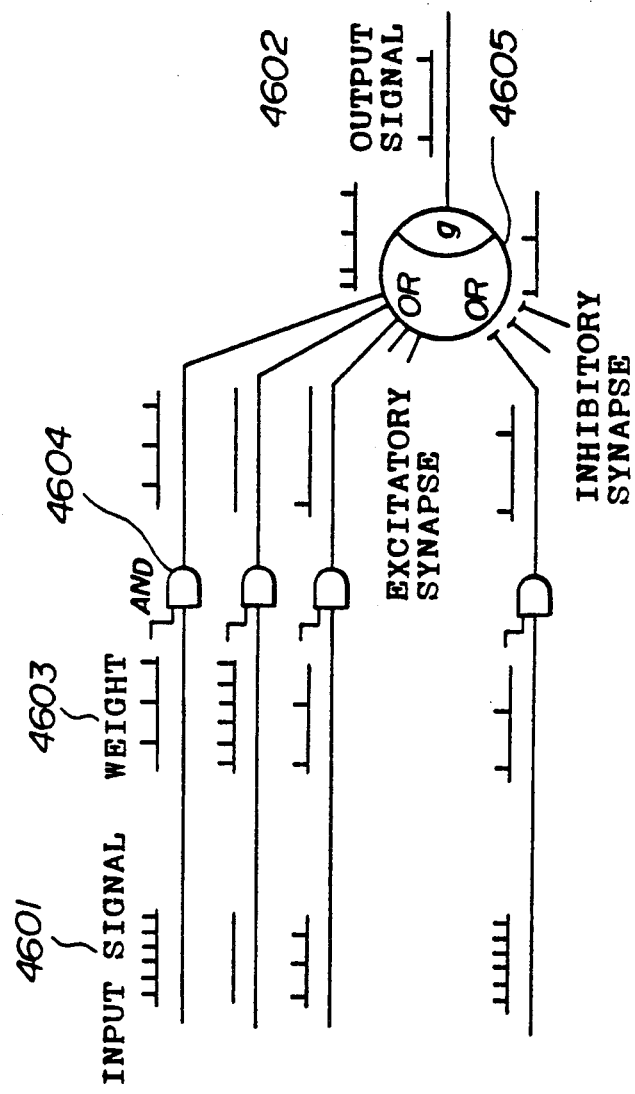
FIG. 5 shows a view for explaining how a conventional pulse-density neural network processes an input signal.
Figure 8:
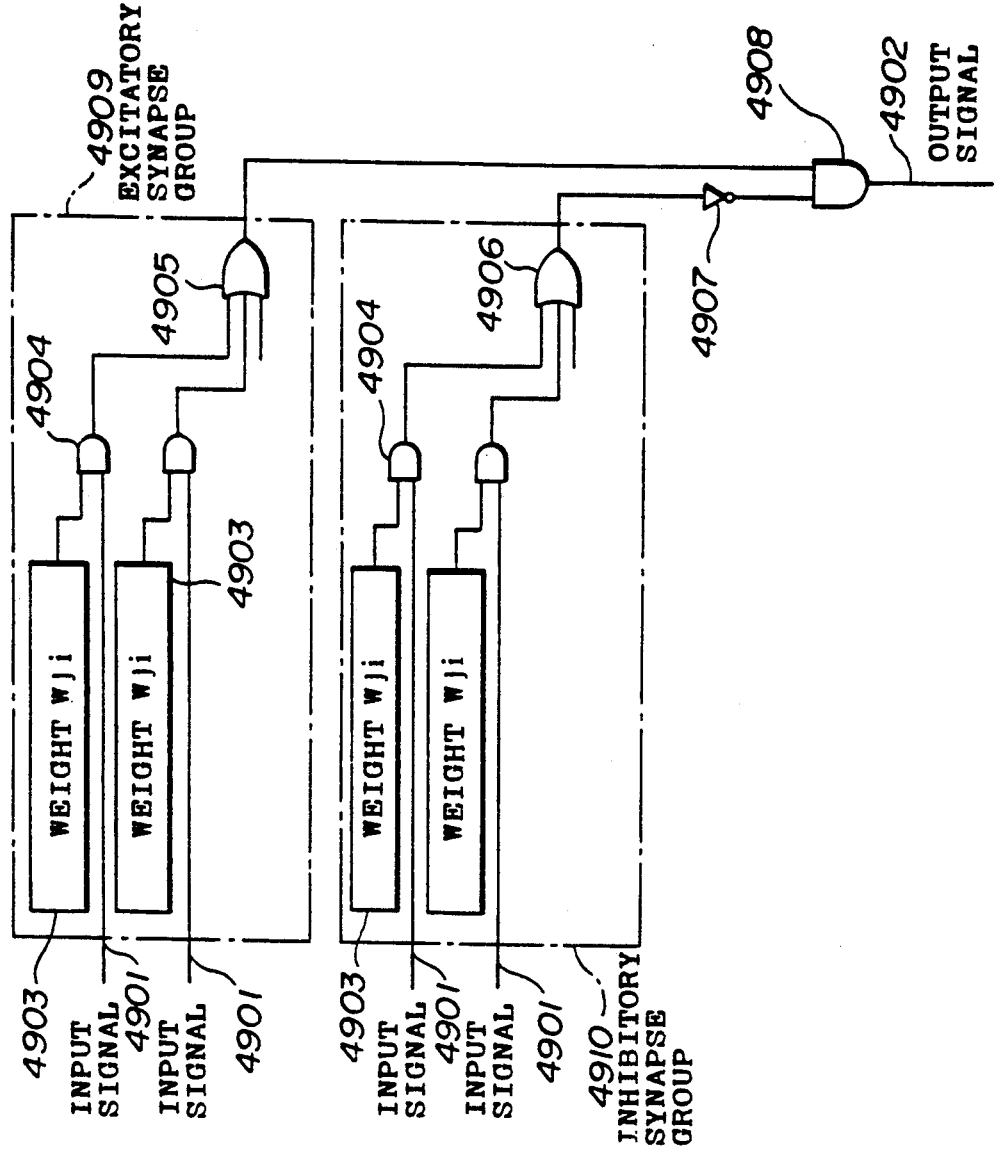
FIG. 8 shows a first circuitry diagram of the conventional pulse-density neural network shown in FIG. 5, which circuitry achieves a desired signal processing.
Figure 9:
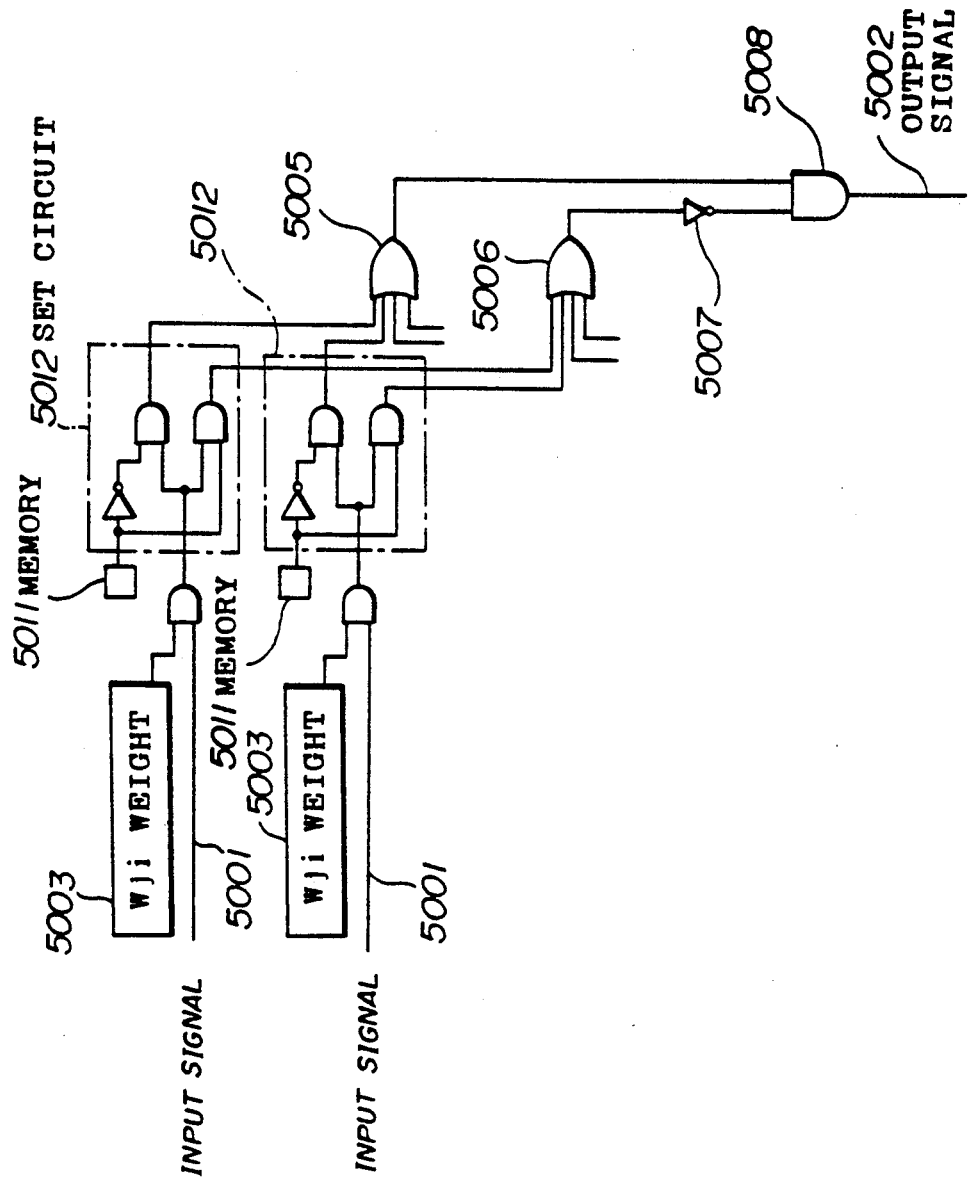
FIG. 9 shows a second circuitry diagram of the conventional pulse-density neural network shown in FIG. 5, which circuitry achieves a desired signal processing.
Figure 10:
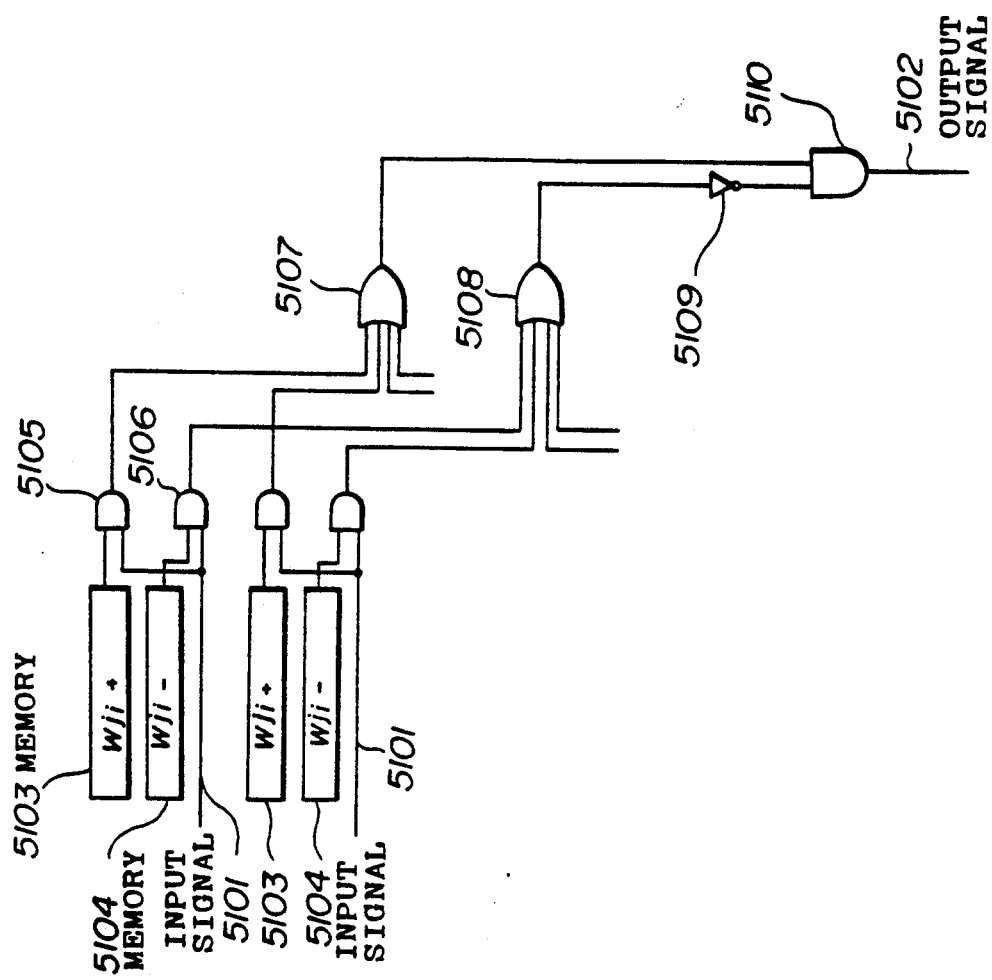
FIG. 10 shows a third circuitry diagram of the conventional pulse-density neural network shown in FIG. 5, which circuitry achieves a desired signal processing.
Figure 11:
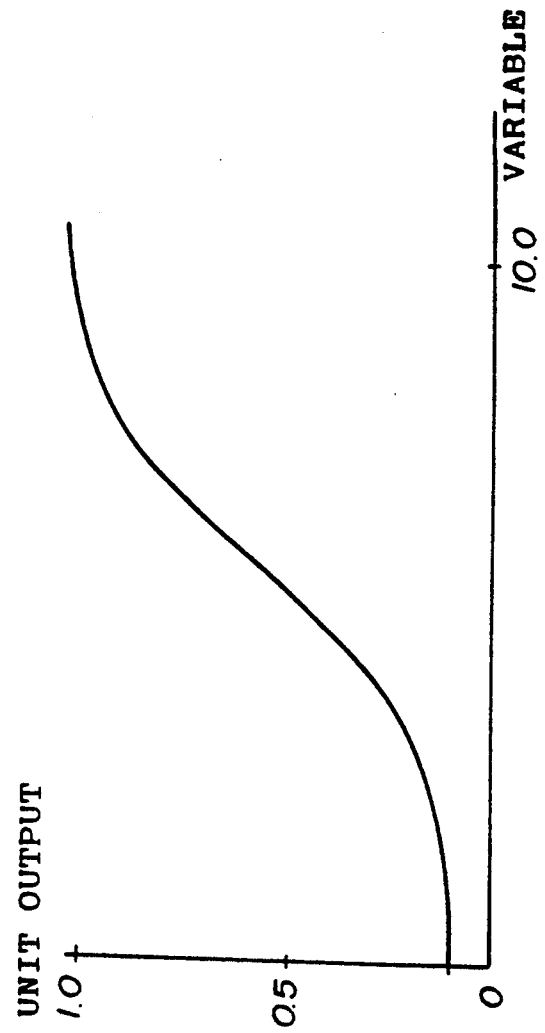
FIG. 11 shows a function which the first through third circuitry diagrams shown in FIGS. 8 to 10 can express.
Figure 12:
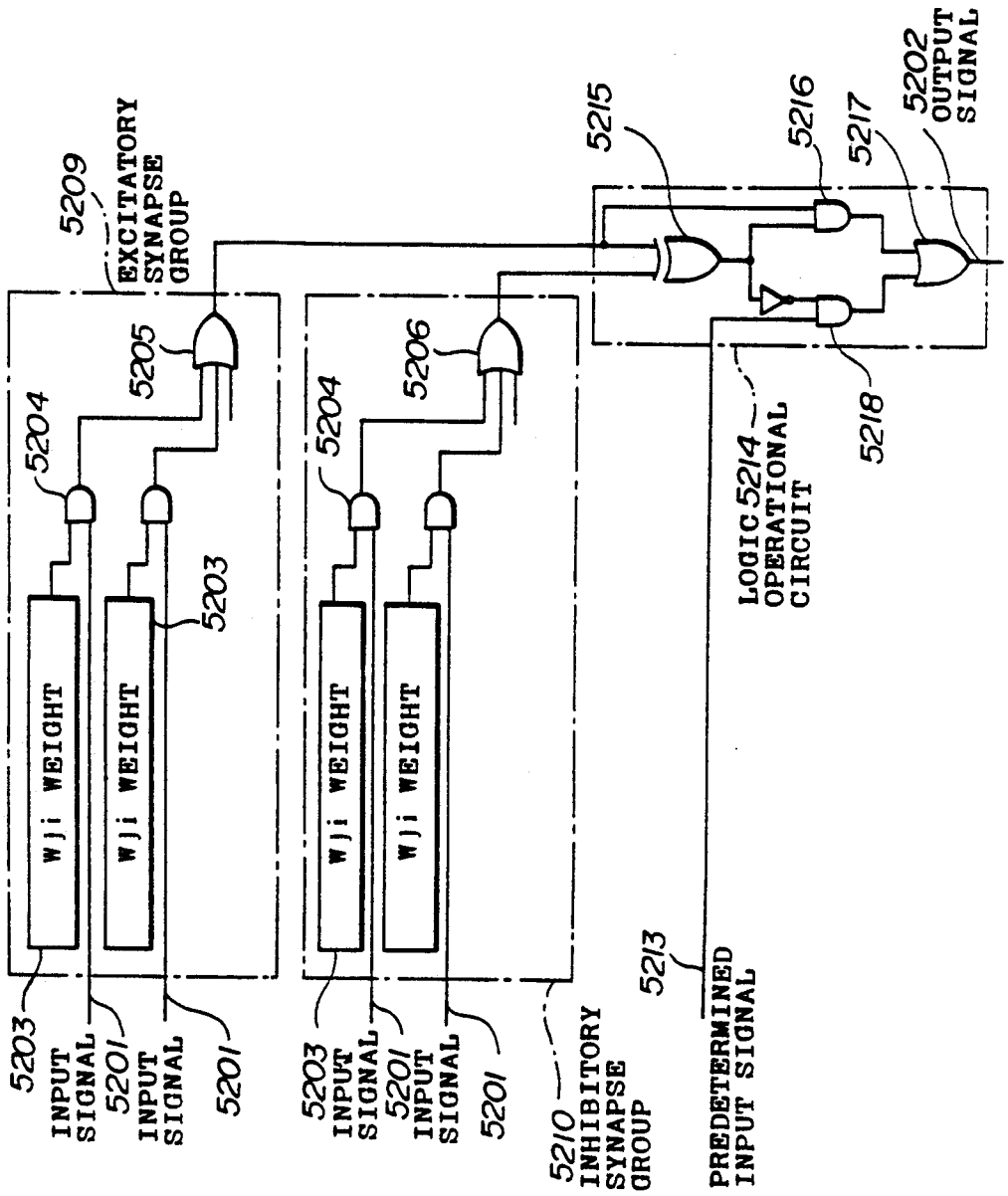
FIG. 12 shows an improved version of the first circuitry diagram shown in FIG. 8.
Figure 13:
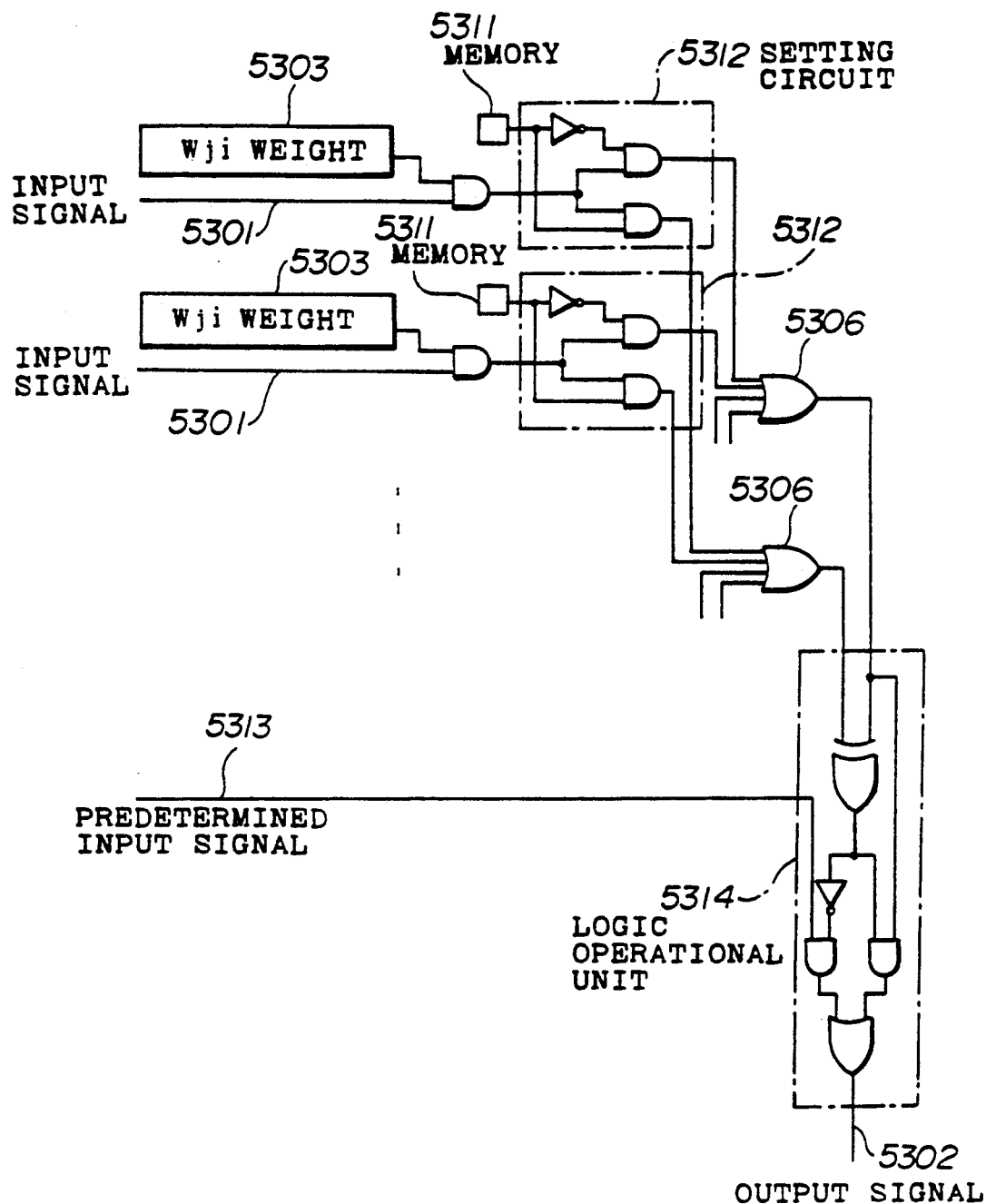
FIG. 13 shows an improved version of the second circuitry diagram shown in FIG. 9.
Figure 14:
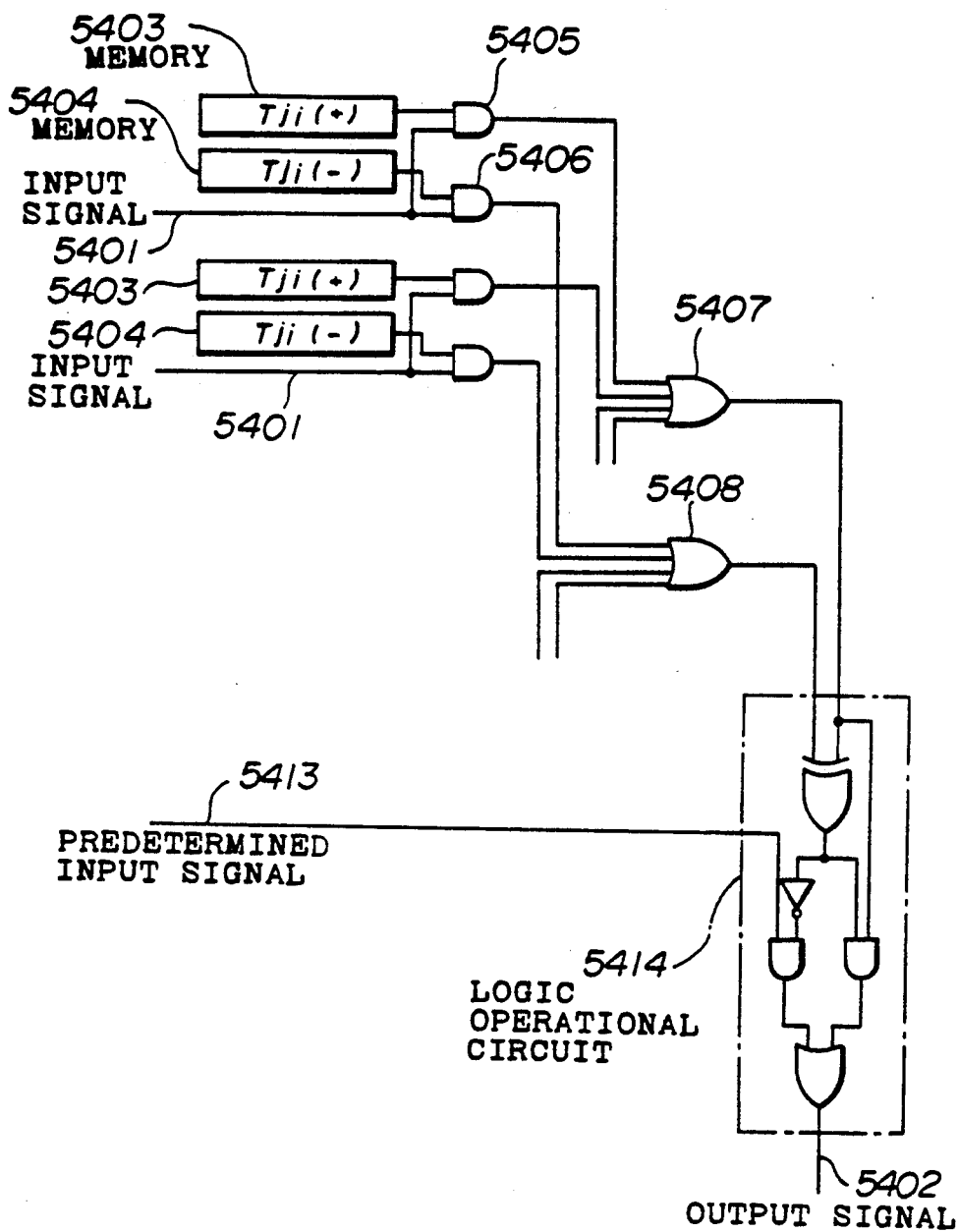
FIG. 14 shows an improved version of the third circuitry diagram shown in FIG. 10.

Next follows a description of an improved pulse-density neural network according to the present invention using the above expanded backpropagation algorithm. Since the pulse-density neutral network expresses data, such as an internal error and a weight, by an (ON-)bit density which can only take a positive value, an arbitrary data D which can freely choose a positive or negative value must be expressed as $D = D_+ - D_-$ by using a positive component $D_+ (\geq 0)$ and a negative component $D_- (\geq 0)$. Moreover, each weight comprises a positive weight and a negative weight, and it may be said that an excitatory synapse has a weight in which the positive weight is larger than the negative weight, whereas the inhibitory synapse has a weight in which the negative weight is larger than the positive. The above is applicable to each internal error and each sensitivity. The positive weight, negative weight, positive internal error, negative internal error, positive sensitivity, and negative sensitivity can be 0 or a positive value. Thus, the above expanded backpropagation algorithm is rewritten as follows. Incidentally, if the synapse has been made an excitatory synapse, its weight is defined by a positive weight (so that the negative weight is not needed). On the other hand, if the synapse has been made an inhibitory synapse, its weight is defined by a negative weight (so that the positive weight is not needed), which is applicable to the pulse-density neural networks shown FIGS. 8 and 12. Likewise, only if the synapse is classified into either an excitatory synapse or an inhibitory synapse, the synapse's weight can be properly expressed by only one kind of weight, which is applicable to the pulse-density neural network shown in FIGS. 9 and 13. However, unlike the above definitions, in the following algorithm, a synapse having a weight whose positive component is not 0 is defined as an excitatory synapse, whereas a synapse having a weight whose negative component is not 0 is defined as an inhibitory synapse. Hereinafter, "adding excitatory synapses to each other" means adding synapses to each other each having a weight whose positive component is not 0, whereas "adding inhibitory synapses to each other" means adding synapses to each other each having a weight whose negative component is not 0. Therefore, a synapse has a weight whose both positive and negative components are not 0 is an object of the above adding calculations.

1) CALCULATE POSITIVE AND NEGATIVE INTERNAL ERRORS OF NEURON UNIT AT OUTPUT LAYER;

$$\Delta_j = \Delta_{j+} - \Delta_{j-} \tag{20}$$

One method to calculate them is to use the following equation;

$$\Delta_{j+} = d_j(1-Y_j), \quad \Delta_{j-} = Y_j(1-d_j) \tag{21}$$

Another method is to use the following equations;

$$\Delta_{j+} = d_j - Y_j, \quad \Delta_{j-} = 0 \text{ (if } Y_j < d_j) \tag{22}$$

$$\Delta_{j+} = 0, \quad \Delta_{j-} = Y_j - d_j \text{ (if } Y_j \geq d_j) \tag{23}$$

2) CALCULATE SEQUENTIALLY, LAYER BY LAYER, POSITIVE AND NEGATIVE INTERNAL ERRORS OF NEURON UNITS LOCATED BETWEEN THE OUTPUT AND INPUT LAYERS $$\Delta_{j+} = \sum_{k+} G_{kj++} + \sum_{k-} G_{kj--} \tag{24}$$

$$\Delta_{j-} = \sum_{k+} G_{kj+-} + \sum_{k-} G_{kj-+} \tag{25}$$

where $k+$ relates to neuron units k which respectively receive a signal from a neuron unit j via an excitatory synapse, whereas $k-$ relates to neuron units k which respectively receives a signal from a neuron unit j via an inhibitory synapse. Hereupon, $$G_{kj++} = Z_{kj+} W_{kj+} \Delta_{k+} \tag{26}$$

$$G_{kj+-} = Z_{kj+} W_{kj+} \Delta_{k-} \tag{27}$$

$$G_{kj-+} = Z_{kj-} W_{kj-} \Delta_{k+} \tag{28}$$

$$G_{kj--} = Z_{kj-} W_{kj-} \Delta_{k-} \tag{29}$$

where $W_{kj+}$ is a positive weight and $W_{kj-}$ is a negative weight. $G_{kj++}$ and $G_{kj--}$ are respectively referred to as a positive error signal, and $G_{kj+-}$ and $G_{kj-+}$ are respectively referred to as a negative error signal. Besides, $G_{kj++}$ and $G_{kj+-}$ are respectively transmitted via an excitatory synapse, and $G_{kj--}$ and $G_{kj-+}$ are transmitted via an inhibitory synapse (note that from the equation (12) and $Z = Z_+ - Z_-$, if $W \geq 0$, $Z_+ \geq 0$ and $Z_- = 0$, and if $W \leq 0$, $Z_+ = 0$ and $Z_- \geq 0$.)

3) MODIFY WEIGHT

A modified weight $W_{ji}'$ is defined as follows;

$$W_{ji}'+ = W_{ji+} + \eta Z_{ji+} X_i [\Delta_{j+} - \Delta_{j-}] \tag{30}$$

$$W_{ji}'- = W_{ji-} + \eta Z_{ji-} X_i [\Delta_{j-} - \Delta_{j+}] \tag{31}$$

Next follows a description of a learning process of the pulse-density neural network consisting of logical operators which achieve a relatively simple circuitry construction and a neuro-LSI chip with high integration. Since a learning process includes the arithmetic multiplication, addition and subtraction, a logical sum, a logical multiplication and a negation will be used instead of them as follows:

$$xy \rightarrow X \cap Y \tag{32}$$

$$x+y \rightarrow X \cup Y \tag{33}$$

$$x+y-z \rightarrow (X \cup Y) \cap (\neg Z) \tag{34}$$

$$1-x \rightarrow \neg X \tag{35}$$

where X,Y,Z respectively represent a pulse (or bit) string, and x, y, z respectively represent an (ON-)bit density of the pulse string. In addition, $\cap$ represents a logical multiplication, $\cup$ represents a logical sum, and $\neg$ represents a negation. The above expanded back-propagation algorithm is then modified as follows:

1) CALCULATE POSITIVE AND NEGATIVE INTERNAL ERRORS OF NEURON UNIT AT OUTPUT LAYER

They may be calculated as follows:

$$\Delta_{j+} = d_j \cap (d_j \text{ XOR } Y_j) \tag{36}$$

$$\Delta_{j-} = Y_j \cap (d_j \text{ XOR } Y_j) \tag{37}$$

where "XOR" is an exclusive OR operation.

2) CALCULATE SEQUENTIALLY, LAYER BY LAYER, POSITIVE AND NEGATIVE INTERNAL ERRORS OF NEURON UNITS LOCATED BETWEEN THE OUTPUT AND INPUT LAYERS $$\Delta_{j+} = (\cup_{k+} G_{kj++}) \cup (\cup_{k-} G_{kj--}) \tag{38}$$

$$\Delta_{j-} = (\cup_{k+} G_{kj+-}) \cup (\cup_{k-} G_{kj-+}) \tag{39}$$

Hereupon, $$G_{kj++} = W_{kj+} \cap Z_{kj+} \cap \Delta_{k+} \tag{40}$$

$$G_{kj+-} = W_{kj+} \cap Z_{kj+} \cap \Delta_{k-} \tag{41}$$

$$G_{kj-+} = W_{kj-} \cap Z_{kj-} \cap \Delta_{k+} \tag{42}$$

$$G_{kj--} = W_{kj-} \cap Z_{kj-} \cap \Delta_{k-} \tag{43}$$

In addition, $\cup_{k+}$ means a logical sum with respect to neuron units k each of which receives an output signal from a neuron unit j via an excitatory synapse, whereas $\cup_{k-}$ means a logical sum with respect to neuron units k each of which receives an output signal from a neuron unit j via an inhibitory synapse.

3) MODIFY WEIGHT

A modified weight $W_{ji}'$ is calculated from the previous weight $W_{ji}$ as follows:

$$W_{ji}'+ = [W_{ji+} \cup \eta(Z_{ji+} \cap X_i \cap \Delta_{j+})] \cap \neg \eta(Z_{ji+} \cap X_i \cap \Delta_{j-}) \tag{44}$$

$$W_{ji}'- = [W_{ji-} \cup \eta(Z_{ji-} \cap X_i \cap \Delta_{j-})] \cap \neg \eta(Z_{ji+} \cap X_i \cap \Delta_{j-}) \tag{45}$$

where $\eta$ represents a decimation process for decimating an ON-bit from the bit string. In addition, $\Delta_{j+}$, $d_j$, $Y_j$, $\Delta_{j-}$, $G_{kj++}$, $G_{kj--}$, $G_{kj+-}$, $G_{kh-+}$, $W_{kj+}$, $W_{kj-}$, $Z_{kj+}$, $Z_{kj-}$, $\Delta_{k+}$, $\Delta_{k-}$, $W_{ji+}$, $W_{ji-}$, $X_i$, $Z_{ji+}$, $Z_{ji-}$, $W_{ji}'+$ and $W_{ji}'-$ are each respectively expressed as a bit string. Although the equations (32) to (34) can be valid when the pulse strings X, Y, and Z have no correlation with one another, a iteration of the learning process makes each weight resemble in bit string and thus the learning process makes no further progress. Accordingly, it is desirable to change the arrangement of a bit string of each weight while maintaining the bit string's ON-bit density whenever the learning process is iterated.

The sensitivity defined by the equation (12) is dependent on the function f(x). In the pulse-density neural network proposed shown in FIG. 12, an output signal $A_j$ of the excitatory synapse group 5209 is computed by input signals $X_i$ and corresponding weights $W_{ji}$ as follows:

$$A_j = \cup_{i+}(X_i \cap W_{ji+}) \tag{46}$$

Hereupon, if $a_j$ represents a probability of $A_j = 1$, $$\therefore a_j = 1 - \pi_{i+}(1 - X_i W_{ji+}) \tag{47)($\because$(46))}$$

where $X_i$, which is a pulse density of a signal input to a neuron unit j via a synapse i, represents a probability of $X_i = 1$. In addition, $W_{ji+}$ is a pulse density of a positive weight between neuron units i and j. $\pi_{i+}$ represents the multiplication of all the excitatory synapses which respectively transmit output signals to the neuron unit j.

Likewise, an output signal $B_j$ of the inhibitory synapse group 5210 is computed by input signals $X_i$ 5201 and corresponding weights $W_{ji-}$ as $$B_j = \cup_{i-}(X_i \cap W_{ji-}) \tag{48}$$

Hereupon, if $b_j$ represents a probability of $B_j = 1$, $$\therefore b_j = 1 - \pi_{i-}(1 - X_i W_{ji-}) \tag{49)($\because$(48))}$$

where $\pi_{i-}$ represents the multiplication of all the inhibitory synapses which respectively transmit output signals to the neuron unit j.

Thus, an output bit $Y_j$ 5202 will be expressed, by $A_j$, $B_j$, and the predetermined output signal $E_j$ which is set at 0 or 1 at random, as follows;

$$Y_j = (A_j \cap \neg B_j) \cup (A_j \cap B_j \cap E_j) \cup (\neg A_j \cap \neg B_j \cap E_j) \tag{50}$$

The following table shows the relationship among $A_j$, $B_m$, $E_j$, $Y_j$, and a probability P of their combination. Incidentally, $e_j$ represents a probability of $E_j = 1$.

TABLE

| $A_j$ | $B_j$ | $E_j$ | $Y_j$ | P |
|---|---|---|---|---|
| 0 | 0 | 0 | 0 | $(1 - a_j)(1 - b_j)(1 - e_j)$ |
| 0 | 0 | 1 | 1 | $(1 - a_j)(1 - b_j) e_j$ |
| 0 | 1 | 0 | 0 | $(1 - a_j) b_j (1 - e_j)$ |
| 0 | 1 | 1 | 0 | $(1 - a_j) b_j e_j$ |
| 1 | 0 | 0 | 1 | $a_j(1 - b_j)(1 - e_j)$ |
| 1 | 0 | 1 | 1 | $a_j(1 - b_j) e_j$ |
| 1 | 1 | 0 | 0 | $a_j b_j (1 - e_j)$ |
| 1 | 1 | 1 | 1 | $a_j b_j e_j$ |

Thus, if $y_j$ represents a probability of $Y_j = 1$, $$\therefore y_j = a_j - a_j b_j + (1 - a_j - b_j + 2a_j b_j) e_j \tag{51}$$

A positive sensitivity $Z_{jp+}$ of a snapse between a neuron j and a neuron p which outputs a signal to the neuron unit j is defined by partially-differentiating the equation (51) by $S_{jp+}(=X_p W_{jp+})$ as follows:

$$\therefore Z_{jp+} = \{1 - b_j + (2b_j - 1)e_j\} a_{jp} \tag{52}$$

Likewise, a negative sensitivity $Z_{jp-}$ is calculated by partially-defferentiating the equation (51) by $S_{jp-}(=X_p W_{jp-})$, $$\therefore Z_{jp-} = \{a_j + (1 - 2a_j)e_j\} \beta_{jp} \tag{53}$$

where $$a_{jp} = \pi_{i+\neq p}(1 - X_i W_{ji+}) \tag{54}$$

$$\beta_{jp} = \pi_{i-\neq p}(1 - X_i W_{ji-}) \tag{55}$$

$\pi_{i+\neq p}$ represents the multiplication of all the excitatory synapses (but those connected to the neuron unit p) which respectively transmit output signals to the neuron unit j whereas $\pi_{i-\neq p}$ represents the multiplication of all the inhibitory synapses (but those connected to the neuron unit p) which respectively transmit output signals to the neuron unit j. Particularly;

① if $e_j = 1$, $$Z_{jp+} = a_{jp} b_j \tag{56)($\because$(52))}$$

$$Z_{jp-} = (1 - a_j)\beta_{jp} \tag{57)($\because$(53))}$$

On the other hand, by using $\neg((\neg X) \cap (\neg Y)) = X \cup Y$ and the equations (32) to (35), (47), (49), and (54) to (57)

$$Z_{jp+} = [\cup_{i-}(X_i \cap W_{ji-})] \cap [\neg \cup_{i+\neq p}(X_i \cap W_{ji+})] \tag{58}$$

$$Z_{jp-} = [\neg \cup_{i+}(X_i \cap W_{ji+})] \cap [\neg \cup_{i-\neq p}(X_i \cap W_{ji-})] \tag{59}$$

where $X_i$, $W_{ji+}$, and $W_{ji-}$ are respectively pulse strings. $\cup_{i+}$ is the logical sum relating to positively-weighted input signals input into the neuron unit j, whereas $\cup_{i-}$ is the logical sum relating to negatively-weighted input signals input into the neuron unit j. $\cup_{i+\neq p}$ is the logical sum relating to positively-weighted input signals input into the neuron unit j which is not connected to the neuron unit p, whereas $\cup_{i-\neq p}$ is the logical sum relating to negatively-weighted input signals input into the neuron unit j which is not connected to the neuron unit p.

② if $e_j = 0.5$, $$Z_{jp+} = 0.5 \, a_{jp} \tag{60)($\because$(52))}$$

$$Z_{jp-} = 0.5 \, \beta_{jp} \tag{61)($\because$(53))}$$

On the other hand, by equations (32) to (35), (54), (55), (60), and (61):

$$Z_{jp+} = \wedge[\neg \cup_{i+\neq p}(X_i \cap W_{ji+})] \tag{62}$$

$$Z_{jp-} = \wedge[\neg \cup_{i-\neq p}(X_i \cap W_{ji-})] \tag{63}$$

where $\wedge$ represents an operation to decimate an ON-bit from the bit string so that its bit density becomes half.

③ if $e_j = 0$, $$Z_{jp+} = (1 - b_j) a_{jp} \tag{64)($\because$(52))}$$

$$Z_{jp-} = a_j \beta_{jp} \tag{65)($\because$(53))}$$

Likewise, $$Z_{jp+} = [\neg \cup_{i-}(X_i \cap W_{ji-})] \cap [\neg \cup_{i+\neq p}(X_k \cap W_{ji+})] \tag{66}$$

$$Z_{jp-} = [\cup_{i+}(X_i \cap W_{ji+})] \cap [\neg \cup_{i-\neq p}(X_i \cap W_{ji-})] \tag{67}$$

Figure 16:
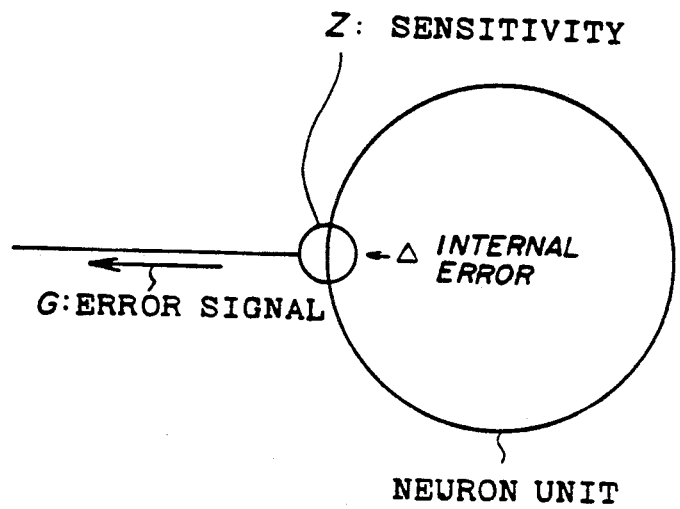
FIG. 16 shows a view for explaining a relationship among sensitivity, an internal error, and an error signal.
Figures 17, 18:
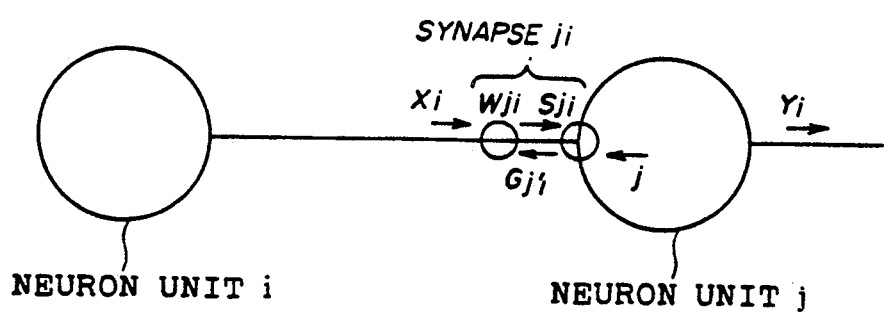
FIG. 17 shows a table correlating the sensitivity with the internal error and the error signal.
FIG. 18 shows another view for explaining a relationship among the sensitivity, internal error, and error signal.

A description will be now given with reference to FIGS. 16, 17 and 18 of functions of the sensitivity Z as an example of $e_j = 0$. First, the equations (38), (39), (44) and (45) will be discussed. In a case where a pulse string $G(= Z \cap A)$ is output from an arbitrary unit having a sensitivity Z and internal error Δ backpropagated via the unit, as shown in FIG. 16, Z may be said to be a gate functioning as shown in FIG. 17; an ON-bit of Z allows a bit of Δ to be propagated, and if an OFF-bit of Z prevents a bit of Δ from being propagated. Next, think a synapse ji which supplies, as shown in FIG. 18, an output of a neuron unit i to a neuron unit j, and compare each bit of a pulse string of a weighted input signal $S_{ji}$ ($X_i \cap W_{ji}$) with that of an output signal $Y_i$ generated from the weighted input signal $S_{ji}$, so as to judge whether or not a bit value of the output signal $Y_i$ would change if a corresponding bit value of the weighted input signal $S_{ji}$ were different from the current value (that is, ON if the current value is OFF or OFF if the current value is ON). If it is judged to be YES, the synapse ji attributes to the internal error of the neuron unit j. Because the changed bit varies the output of the neuron unit j, thus the internal error $\Delta_j$ could have been changed. Therefore, in this case, a bit of $Z_{ji}$ should be made ON, so as to propagate the internal error $\Delta_j$ through the synapse ji and to modify the weight $W_{ji}$ if the bit of the $X_i$ is ON. But, in the opposite case, a bit of $Z_{ji}$ should be made OFF, so as to prevent the internal error $\Delta_j$ from being propagated and thus prevent the weight $W_{ji}$ from being modified. This is the meaning of equations (38), (39), (44) and (45).

Next, the equations (66) and (67) will be discussed while using $e_j=0$, likewise.

① If the synapse ji is an excitatory synapse;
i) if there is at least one input supplied from an inhibitory synapse to the neuron unit j, $b_j=1$ ($\because$(49)) and $y_j=0$ ($\because$(51)) and thus an output bit is maintained OFF, irrespective of $S_{ji+}$.
ii) if there is at least one input supplied from other excitatory synapses to the neuron unit j, the logical sum of inputs from all the excitatory synapses becomes I and thus an output bit will not change irrespective of $S_{ji+}$.

In the above cases, a bit of $Z_{ji+}$ must be OFF. The equation (66) means the above.

② If the synapse ji is an inhibitory synapse;
i) if no input is supplied from the excitatory synapse to the neuron unit j, $a_j=0$ ($\because$(47)), $y_j=0$ ($\because$(51)) and thus an output bit is maintained OFF, irrespective of $S_{ji-}$.
ii) if there is at least one input supplied from other inhibitory synapses to the neuron unit j, the logical sum of inputs from all the inhibitory synapses is I and thus an output bit will not change, irrespective of $S_{ji-}$.

In the above cases, a bit of $Z_{ji-}$ must be OFF. The equation (67) means the above.

Figure 19:
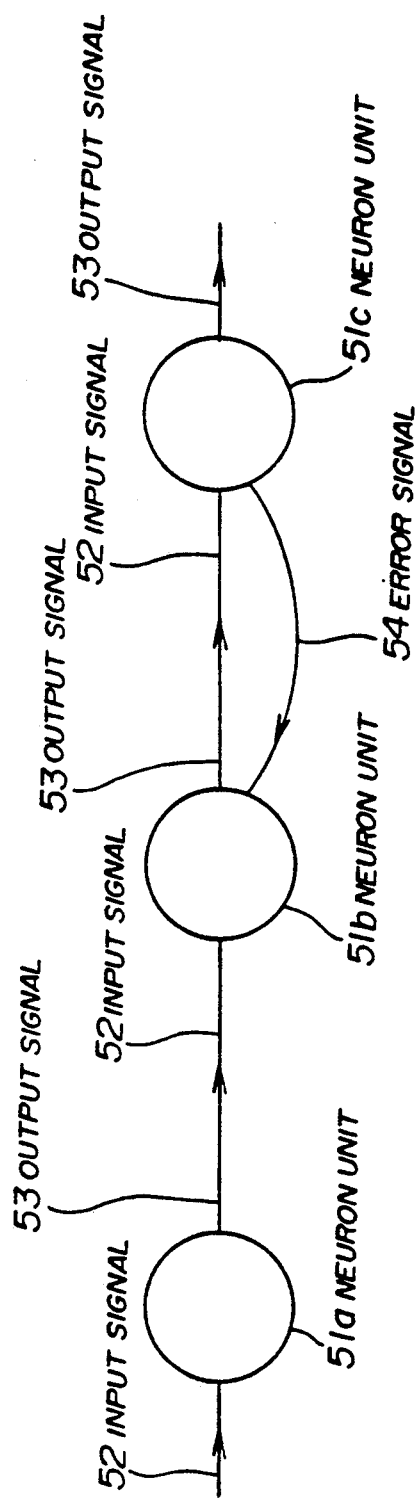
FIG. 19 shows a part of a hierarchical neural network of a first embodiment according to the present invention.

Next follows a description of a hierarchical neural network according to the present invention shown in FIG. 19. An error signal 54 is supplied from a neural unit 51c at the output layer to a neural network 51b at the hidden layer. The error signal 54 may consist of two kinds of signals, a positive error signal and a negative error signal, or may comprise plural kinds of signals. Incidentally, the neuron unit 51a at the input layer output an input signal 52 as it is to the adjacent neuron unit 51 at the hidden layer.

Figure 20:
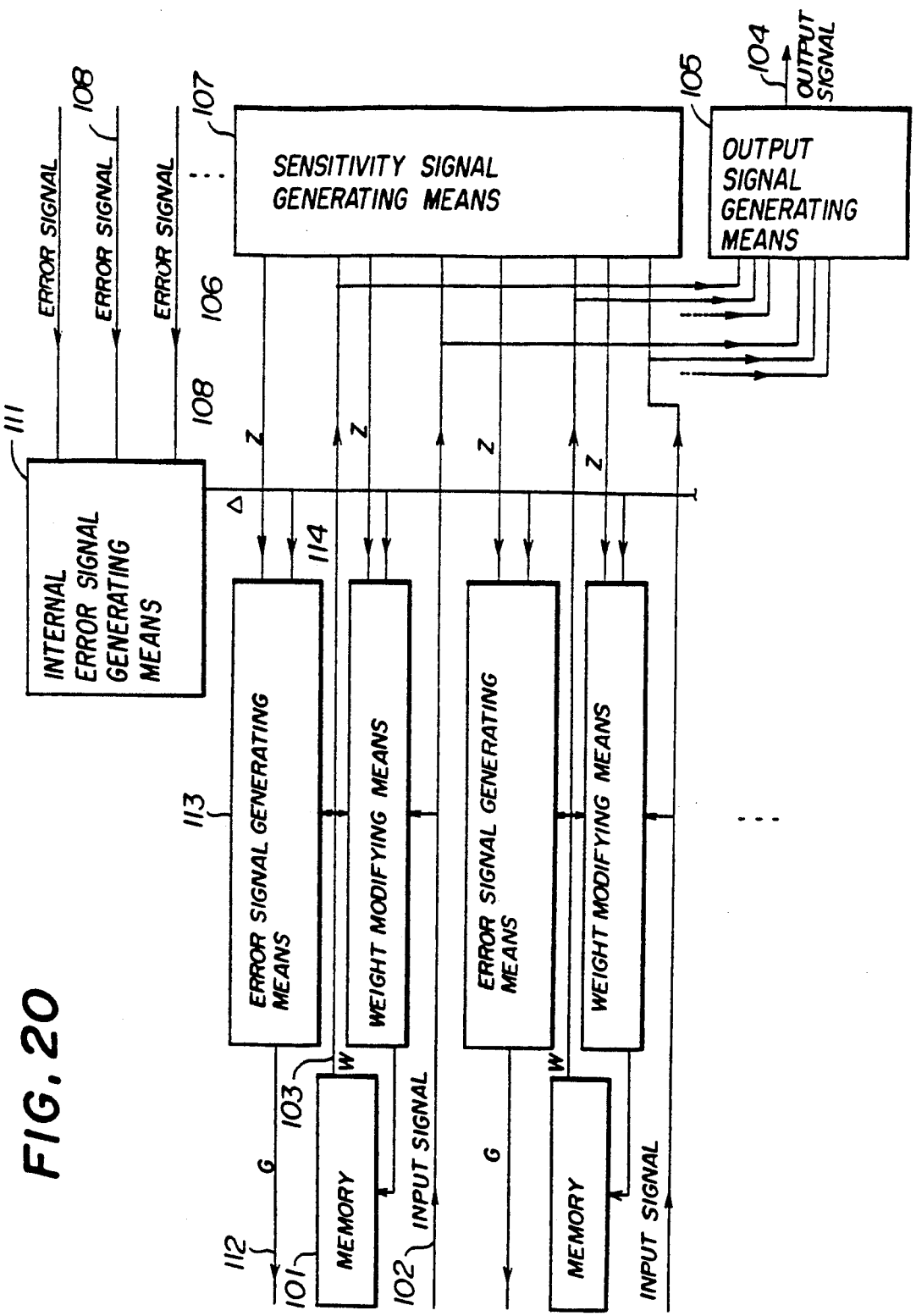
FIG. 20 shows a block diagram for explaining a neuron unit at a hidden layer of the first embodiment according to the present invention.

A neuron unit "A" at a hidden layer of the hierarchical neural network of a first embodiment according to the present invention comprises, as shown in FIG. 20, memories 101, output signal generating means 105, sensitivity signal generating means 107, internal error signal generating means 111, error signal generating means 113, and weight modifying means 114. The neuron unit "A" expresses an output signal, etc. as a monovariate function. Each of the memories 101 stores a unique weight 103 W therein. The output signal generating means 105 generates an output signal 104 from input signals 102 and corresponding weights W 103. The sensitivity signal generating means 107 generates a sensitivity Z 106 from the input signals 102 and the corresponding weights W 103. The internal error signal generating means 111 generates an internal error Δ109 by performing an arithmetic addition or logical sum for error signals 108 supplied from units connected to the neuron unit "A". The error signal generating means 113 generates an error signal G 112 by performing an arithmetic multiplication or logical multiplication for the weight W 103, sensitivity Z 106 and internal error Δ109. The weight modifying means 114 modifies the corresponding weight 103 by performing an arithmetic addition or logical sum for a signal "1" and the corresponding weight, or by performing a logical multiplication for a signal "2+ and the corresponding weight; the signal "1" being made by performing an arithmetic multiplication for the input signal 102, sensitivity 106 and internal error 109 and then performing an arithmetic multiplication for the above result and the learning ratio $\eta$, or by performing a logical multiplication for the input signal 102, sensitivity 106 and internal error 109, or by decimating some ON-bits from the above result to decrease the bit density thereof, and the signal "2" being made by performing a logical multiplication for the input signal 102, sensitivity 106 and internal error 109 and then performing a negation for the above result, or by decimating some ON-bits from the above result and then performing the negation.

Figure 21:
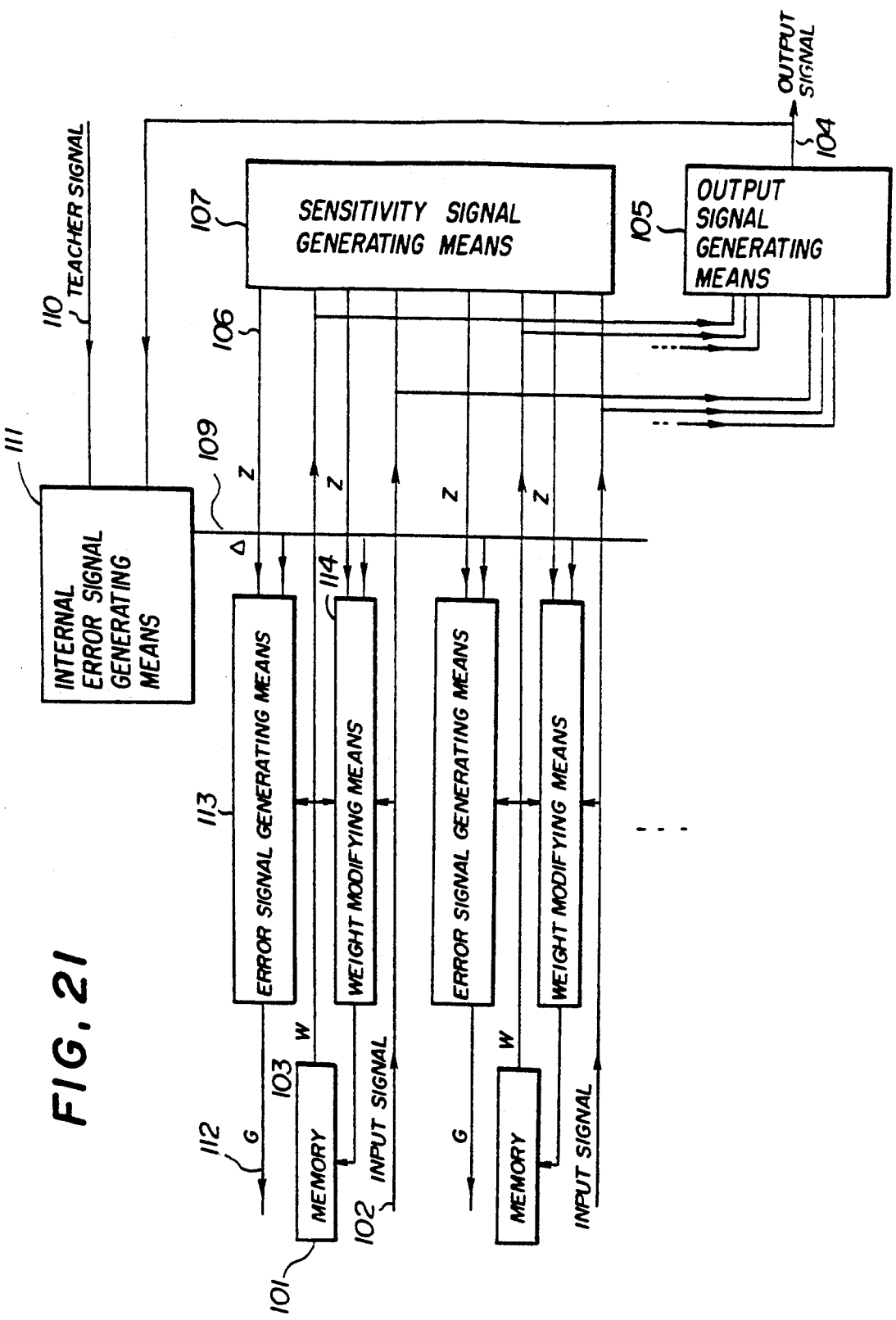
FIG. 21 shows a block diagram for explaining a neuron unit at an output layer of the first embodiment according to the present invention.

A neural unit at the output layer shown in FIG. 21 differs from the neural unit at the hidden layer shown in FIG. 20 only in that the internal error signal generating means 111 receives target signals 110 and the output signal 104 of error signals 108 from the outside of the network, and thus a duplicate description of each element thereof will be omitted.

Figure 22:
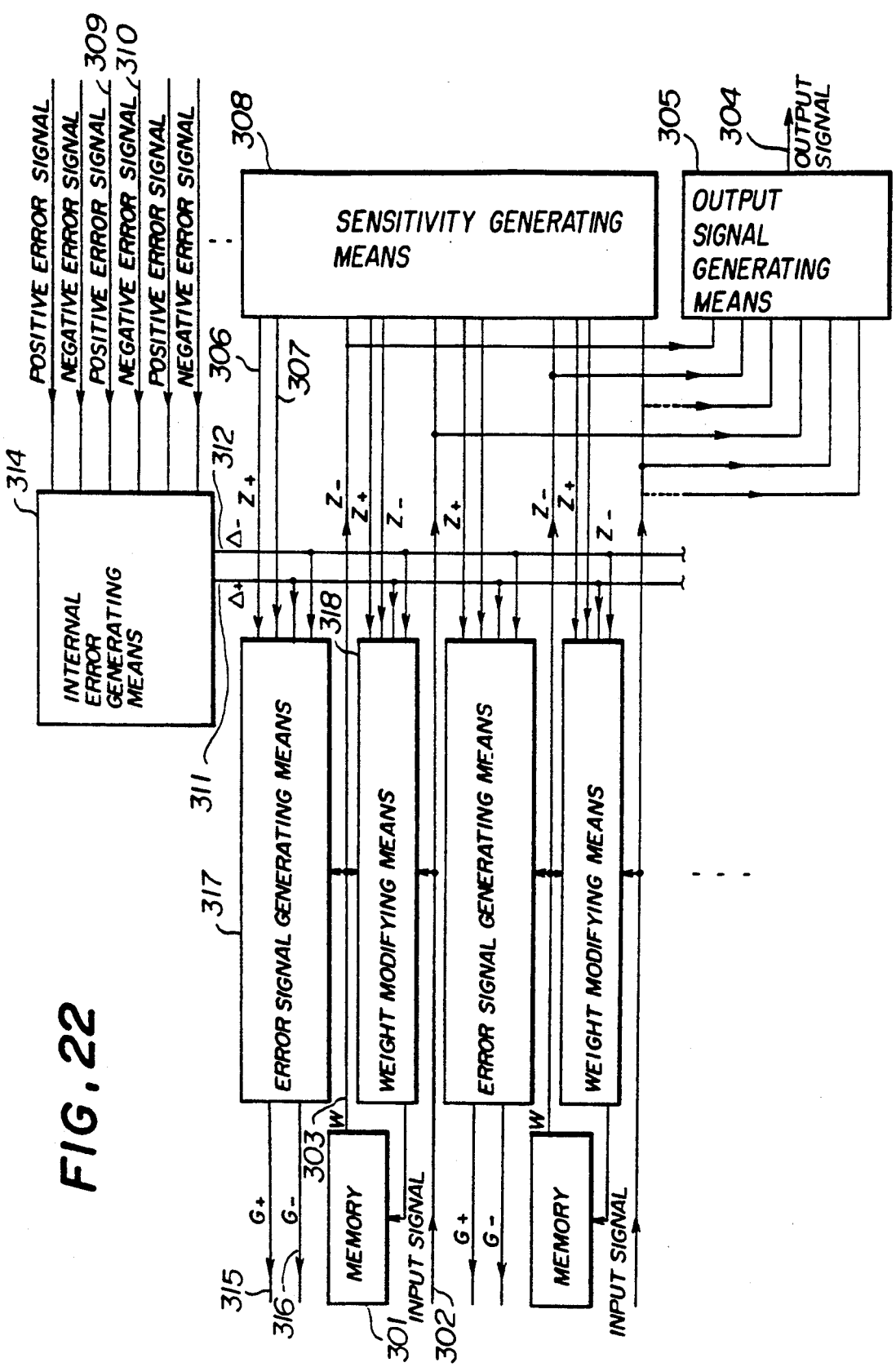
FIG. 22 shows a block diagram for explaining a neural unit at a hidden layer of a pulse-density neural network of a second embodiment according to the present invention.

A neuron unit "B" at a hidden layer according to the present invention comprises, as shown in FIG. 22, memories 301, output signal generating means 305, sensitivity generating means 308, internal error generating means 314, error signal generating means 317, and weight modifying means 318. The neuron unit "B" expresses an error signal, etc. as a bivariate function. However, if positive and negative error signals, positive and negative internal errors, and positive and negative sensitivities are time-sharingly transmitted through one signal path, this neuron unit can be constructed as shown in FIG. 20. Each of the memories 301 stores a corresponding weight 303 of either an excitatory synapse or an inhibitory synapse. The output signal generating means 305 generates an output signal 304 from input signals 302 and the corresponding weights W 303. The sensitivity generating means 308 generates a positive sensitivity $Z_+$306 and a negative sensitivity $Z_-$307 from the input signals 302 and corresponding weights W 303. The internal error generating means 314 generates a positive internal error Δ_311 by performing an arithmetic addition or logical sum for positive error signals 309 supplied from units connected to the unit "B" and generates a negative internal error Δ_312 by performing an arithmetical addition or logical sum for negative error signals 310 supplied from units connected thereto. The error signal generating means 317 generates a positive error signal $G_{+}315$ by performing an arithmetic multiplication or logical multiplication for the positive weight W 303, positive sensitivity $Z_{+}$ 306 and positive internal error $\Delta_{+}311$, or by performing an arithmetic multiplication or logical multiplication for the negative weight 303, negative sensitivity $Z_{-}307$ and negative internal error $\Delta_{-}312$, and generates a negative error signal $G_{-}306$ by performing an arithmetic multiplication or logical multiplication for the positive weight W 303, positive sensitivity $Z_{+}306$, and negative internal error $\Delta_{+}312$, or by performing an arithmetic multiplication or logical multiplication for the negative weight 303, negative sensitivity $Z_{-}307$, and positive internal error $\Delta_{+}311$. The weight modifying means 318 produces the corresponding positive weight 303 by performing an arithmetic addition or logical sum for a signal "3" and the corresponding positive weight 303 and then performing an arithmetic addition or logical multiplication for the above result and a signal "4"; by performing an arithmetic addition or logic multiplication for both the signals "3" and "4" and then performing an arithmetic addition or logical sum for the above result and the positive weight 303; or by performing an arithmetic addition or logical multiplication for the signal "4" and the positive weight 303 and then performing an arithmetic addition or logical sum for the above result and the signal "3"; the signal "3" being made by performing an arithmetic multiplication for the input signal 302, positive sensitivity 306 and positive internal error 311 and then performing an arithmetic multiplication for the above result and the learning ratio $\eta$, or by performing a logical multiplication for the input signal 302, positive sensitivity 306 and positive internal error 311, or by decimating some ON-bits from the above result to decrease the bit density thereof, and the signal "4" being made by performing an arithmetic multiplication for the input signal 302, positive sensitivity 306, negative internal error 312, and the learning ration $\eta$, and then multiplying $-1$ by the above result, or by performing a logical multiplication for the input signal 302, positive sensitivity 306, and negative internal error $\Delta_{-}312$, and then performing the negation for the above result, or by decimating some ON-bits from the above result and then performing the negation. The weight modifying means 318 produces the corresponding negative weight 303 by performing an arithmetic addition or logical sum for a signal "5" and the corresponding negative weight 303 and then performing an arithmetic addition or logical multiplication for the above result and the signal "6"; by performing an arithmetic addition or logical multiplication for both the signals "5" and "6" and then performing an arithmetic addition or logical sum for the above result and the negative weight 303; or by performing an arithmetic addition or logical multiplication for the signal "6" and the negative weight 303 and then performing an arithmetic addition or logical sum for the above result and the signal "5"; the signal "5" being made by performing an arithmetic multiplication for the input signal 302, negative sensitivity 307 and negative internal error 312 and then performing an arithmetic multiplication for the above result and the learning ratio $\eta$, or by performing a logical multiplication for the input signal 302, negative sensitivity 307 and negative internal error 312, or by decimating some ON-bits from the above result to decrease the bit density thereof, and the signal "6" being made by performing an arithmetic multiplication for the input signal 302, negative sensitivity 307, positive internal error 311, and the learning ratio $\eta$, and then multiplying $-1$ by the above result, or by performing a logical multiplication for the input signal 302, negative sensitivity 307, and positive internal error $\Delta_{+}311$, and then performing the negation for the above result, or by decimating some ON-bits from the above result and then performing a negation.

Figure 23:
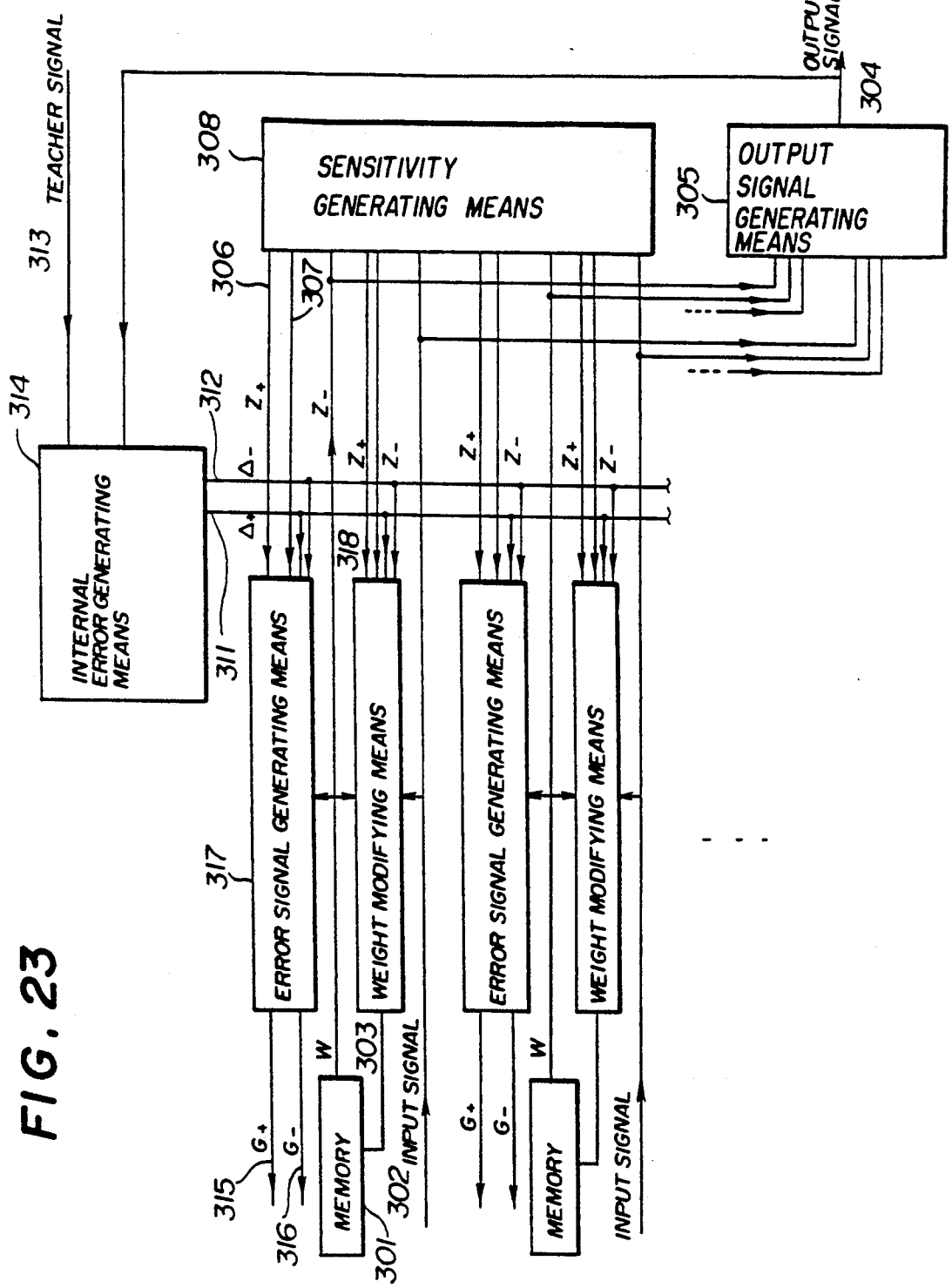
FIG. 23 shows a block diagram for explaining a neural unit at an output layer of the pulse-density neural network of the second embodiment according to the present invention.

A neural unit at the output layer shown in FIG. 23 differs from the neural unit at the hidden layer shown in FIG. 22 only in that the internal error generating means 111 receives teacher signals 313 and the output signal 304 instead of error signals 309 and 310 from the outside of the network, and thus a duplicate description of each element thereof will be omitted.

The above various signals may be expressed by a real number, a bit string, or a combination thereof. If a signal expressed by a real number value is input to a logic operator, the signal is converted by bit string generating means into a bit string whose ON-bit density is equal to its real number value whereas, if a signal expressed by a bit string is input to an arithmetic operator, the signal is converted by bit density calculating means into a real number which is equal to an ON-bit density of a bit density of the bit string. Such bit string generating means and bit density calculating means may be installed respectively in each of the memories, output signal generating means, sensitivity generating means, internal error generating means, error signal generating means, and weight modifying means. In addition, the arithmetic operator may be comprise a software.

Next follows a description of concrete constructions of each means of the neuron unit.

Figure 24:
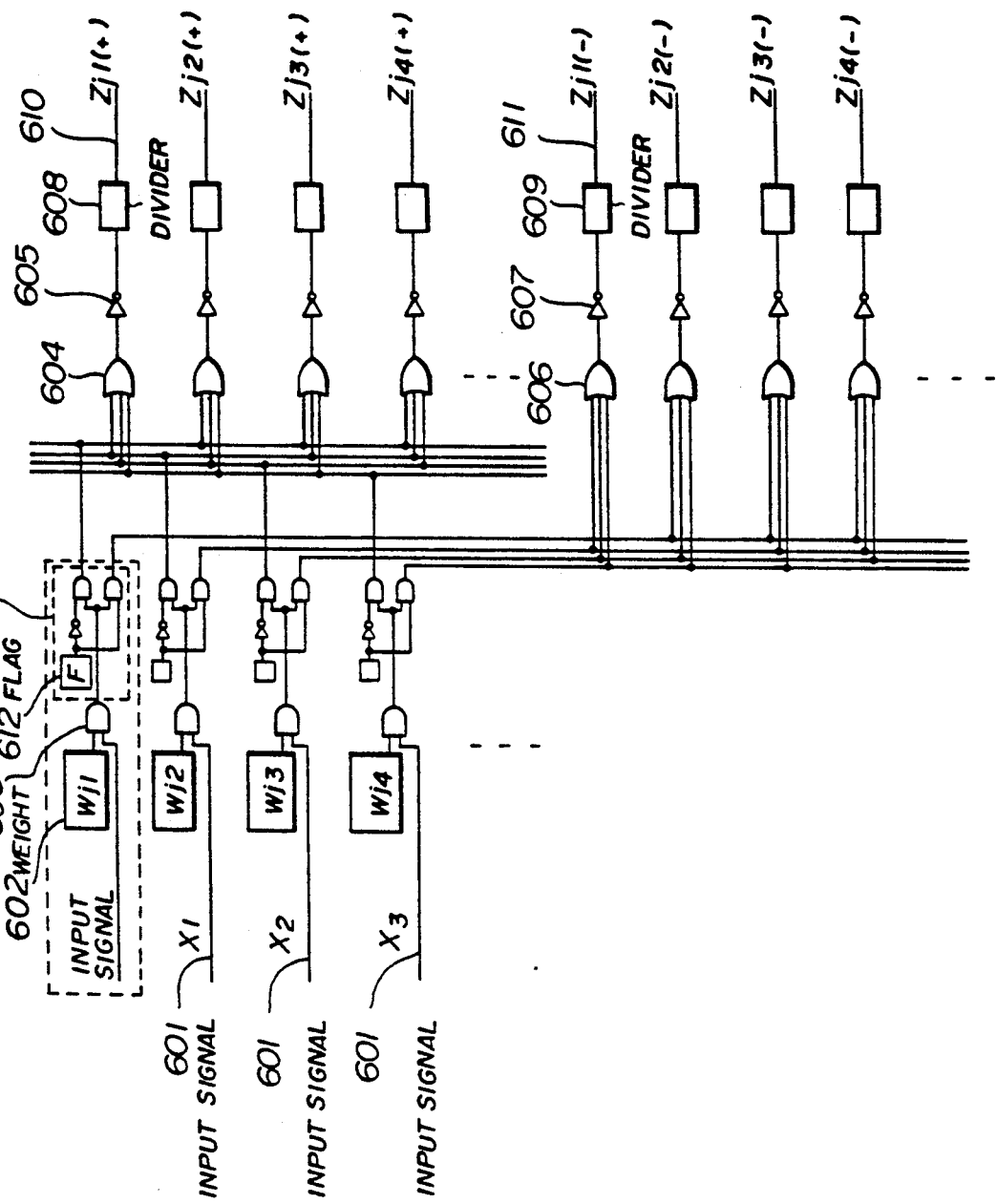
FIG. 24 shows one example of a circuitry diagram of sensitivity generating means shown in FIGS. 20 to 23.

The output signal generating means (105, 305) may be constructed of logical circuits shown in FIGS. 8 to 10, and 12 to 14 (without $W_{ji}$). The sensitivity generating means (107, 308) may be constructed of logical circuits shown in FIG. 24 or 25. FIG. 24 shows the sensitivity generating means (107, 308) in which the sensitivity is defined by the equations (62) and (63), and FIG. 25 shows the same means in which the sensitivity is defined by the equations (64) and (65).

In FIG. 24, each AND circuit 603 performs a logical multiplication for a weight $W_{jk}$ stored in each memory 602 and a corresponding input signal $X_k$ 601 input to the neuron unit j. Next, OR circuits 604 respectively perform a logical sum for outputs of AND circuits 603 in all excitatory synapses but those connected to the neuron unit i, and then each NOT circuit 605 performs a negation for an output of the corresponding OR circuit 604. In addition, each divider 608 reduces the ON-bit density of an output of the corresponding NOT circuit 605 to half to generate a positive sensitivity $Z_{ji+}$610. OR circuits 606 respectively perform a logical sum for outputs of the AND circuits 603 in all inhibitory synapses but those connected to the neuron unit i, and then each NOT circuit 607 performs a negation for it. Each divider 608 reduces the ON-bit density of the output of each NOT circuit 607 to half to generate a negative sensitivity $Z_{ji-}$611. A 1-bit flag 612 informs a switching circuit 613 of an excitatory synapse or inhibitory synapse to switch its process. The dividers 608 and 609 respectively output 1 with a probability of $\frac{1}{2}$ in response to an input of I by using heat noise of a transistor as a random number generating source and a comparator which compares a random number with a predetermined voltage value. Incidentally, the dividers 608 and 609 may delete every other pulse by logically operating an output of a counter.

Figure 25:
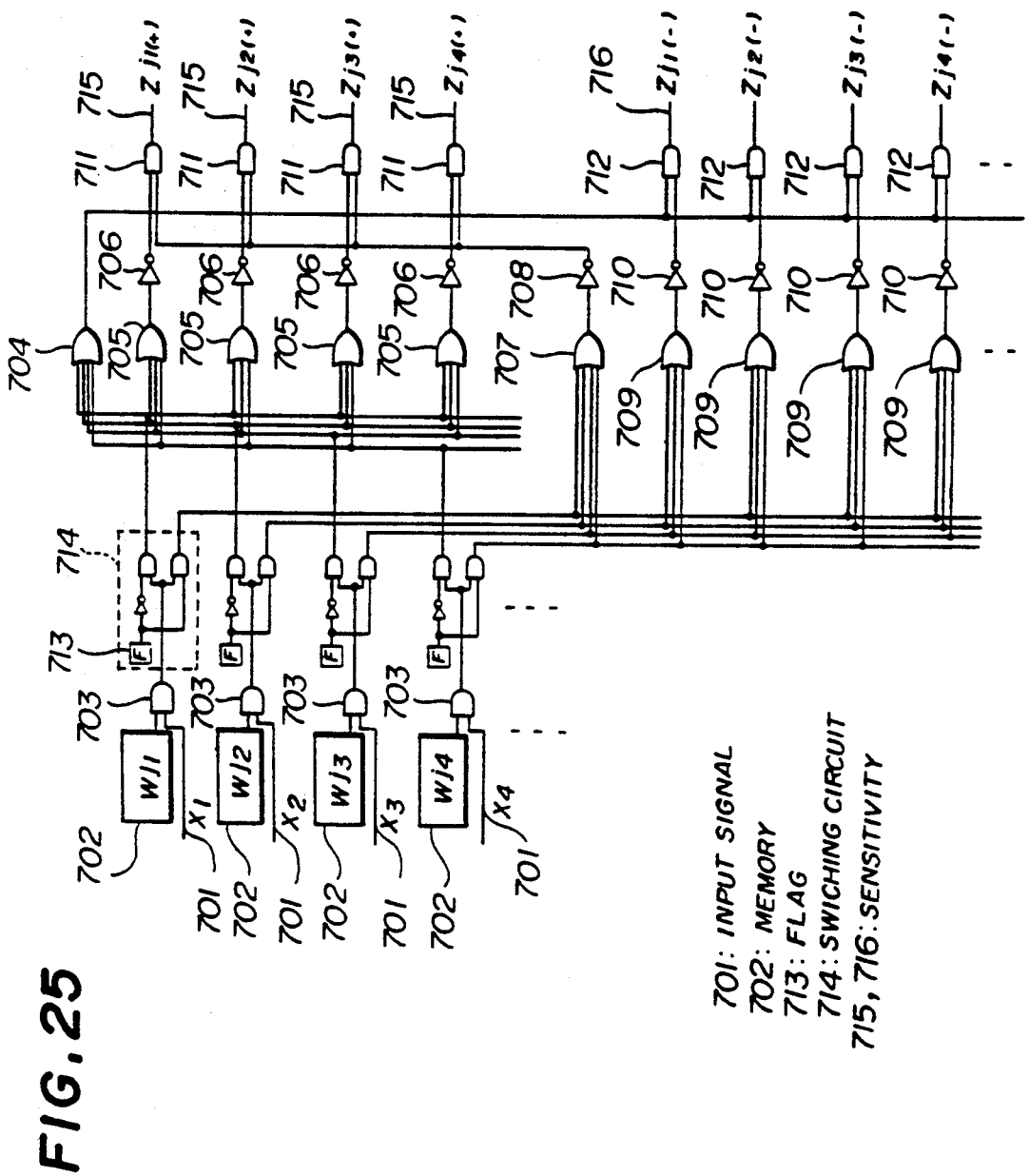
FIG. 25 shows another example of a circuitry diagram of the sensitivity generating means shown in FIGS. 20 to 23.

In FIG. 25, each AND circuit 703 performs a logical multiplication for a weight $W_{jk}$ stored in each memory 702 and a corresponding input signal $X_k$ 701 which is input to the neuron unit j. Next, OR circuits 705 respectively perform a logical sum for outputs of the AND circuits 703 in all excitatory synapses but those connected to the neuron unit i, and then each NOT circuit 706 performs a negation for an output of the corresponding OR circuit 705. In addition, OR circuit 707 performs a logical sum for outputs of AND circuits in all inhibitory synapses, and NOT circuit 708 performs a negation for it, and then each AND circuit 711 performs a logical multiplication for the output of the NOT circuit 708 and the output of each NOT circuit 706 to generate a positive sensitivity $Z_{ji+}$ 715. The OR circuits 709 respectively perform a logical sum for outputs of AND circuits 703 in all inhibitory synapses but those connected to the neuron unit i, and then each NOT circuit 710 performs a negation for it. OR circuit 704 performs a logical sum for outputs of AND circuits in all excitatory synapses, and each AND circuit 712 performs a logical multiplication for the output of the OR circuit 704 and the output of each NOT circuit 710 to generate a negative sensitivity $Z_{ji-}$ 716. A 1-bit flag 713 informs a switching circuit 714 of an excitatory synapse or inhibitory synapse to switch its process.

Figure 26:
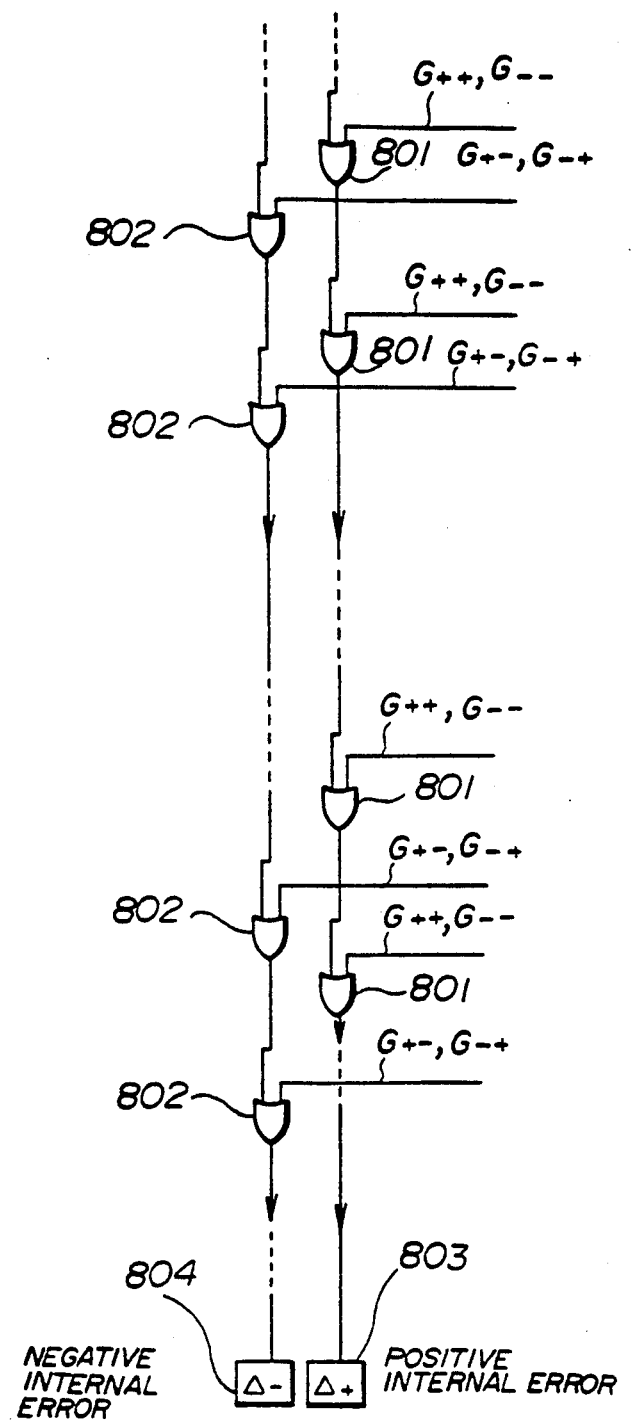
FIG. 26 shows one example of a circuitry diagram of internal error generating means shown in FIGS. 20 to 23.
Figure 27:
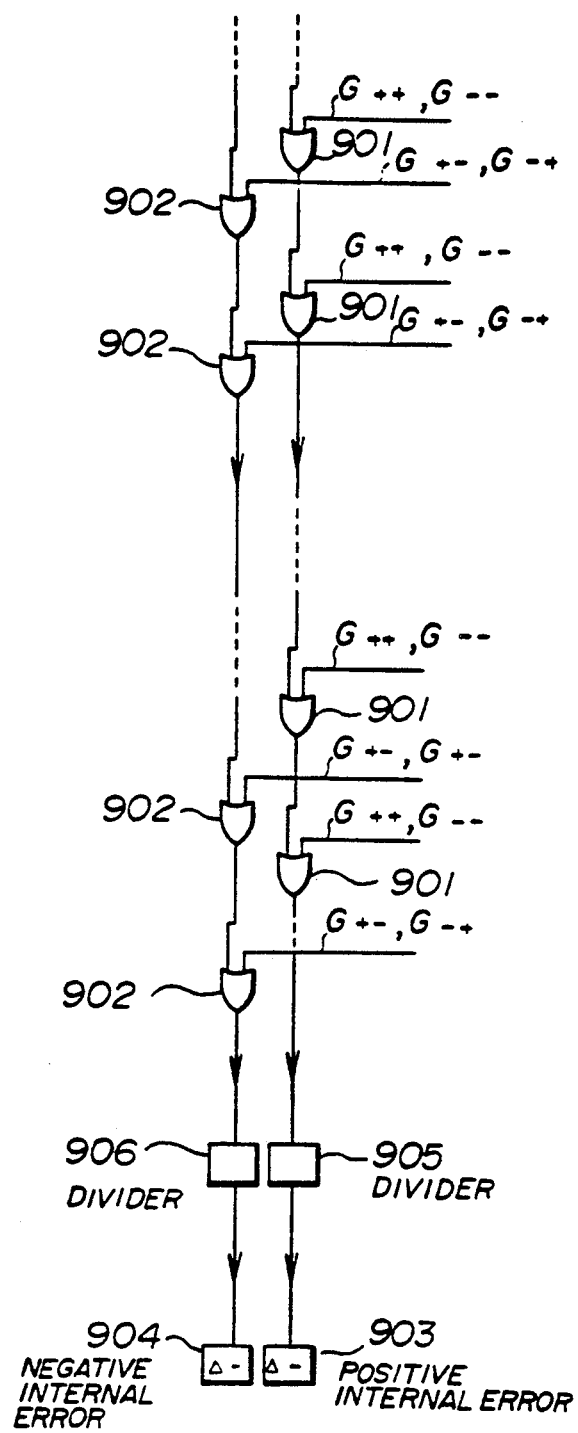
FIG. 27 shows another example of a circuitry diagram of the internal error generating means shown in FIGS. 20 to 23.

FIG. 26 shows a circuitry diagram of the internal error generating means in the neuron unit at the hidden layer in which the internal error is defined by the equations (38) and (39). In FIG. 26, an OR circuit 801 performs a logical sum for the positive error signals $G_{++}$ and $G_{--}$ to generate a positive internal error 803. In addition, an OR circuit 802 performs a logical sum for the negative error signals $G_{+-}$ and $G_{-+}$ to generate a negative internal error 804. Incidentally, the internal error generating means may reduce, as shown in FIGS. 27 and 28, the ON-bit density to half instead of providing the dividers 608 and 609 shown in FIG. 24 in a case where the sensitivity is defined by the equations (62) and (63)

Figure 28:
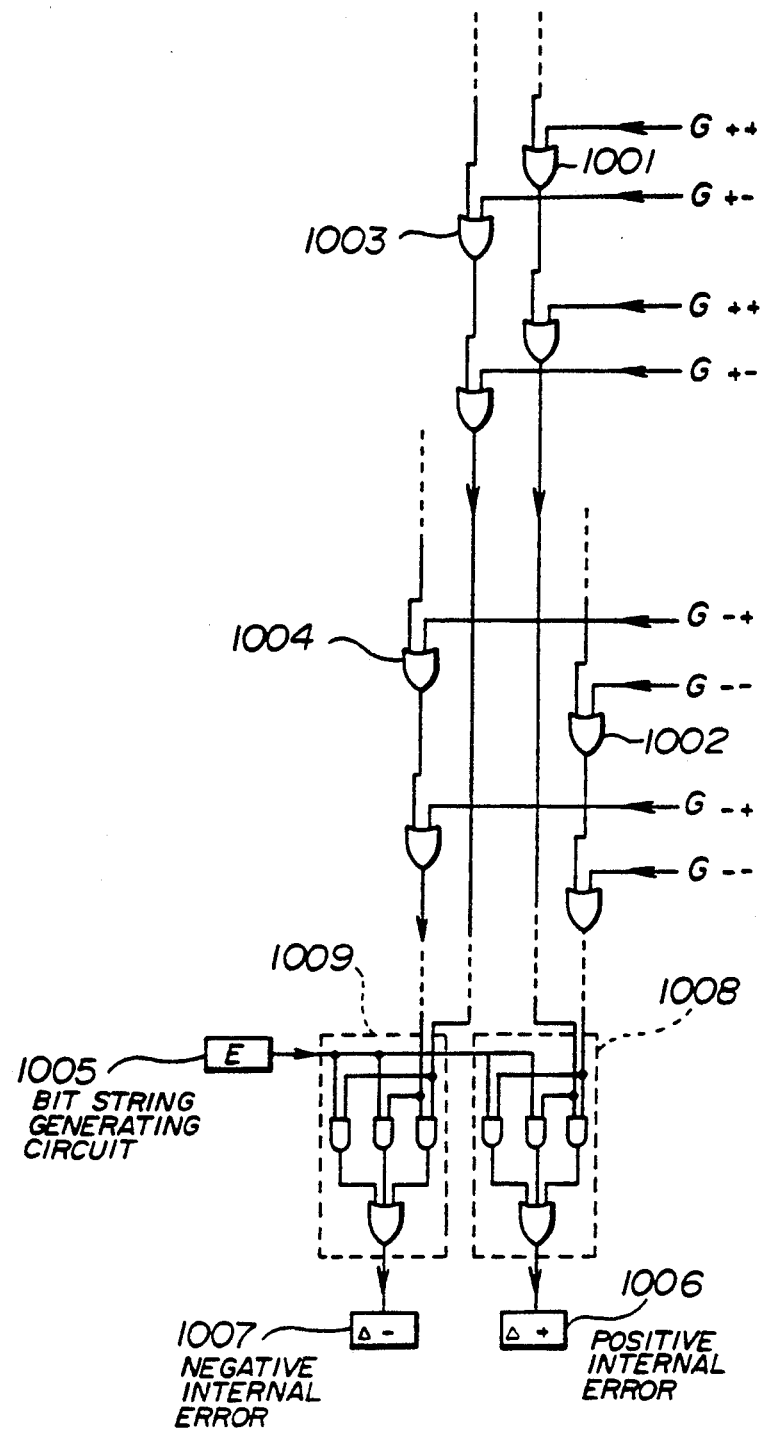
FIG. 28 shows still another example of a circuitry diagram of the internal error generating means shown in FIGS. 20 to 23.

In FIG. 28, numeral 1005 denotes a bit string generating circuit which generates a bit string having an ON-bit density of 0.5. Numeral 1008 denotes a circuit which generates a bit string having an ON-bit density half that of the bit string of the logical-summed positive error signals. Numeral 1009 a circuit which generates a bit string having an ON-bit density half that of the logical-summed negative error signals.

Figure 29:
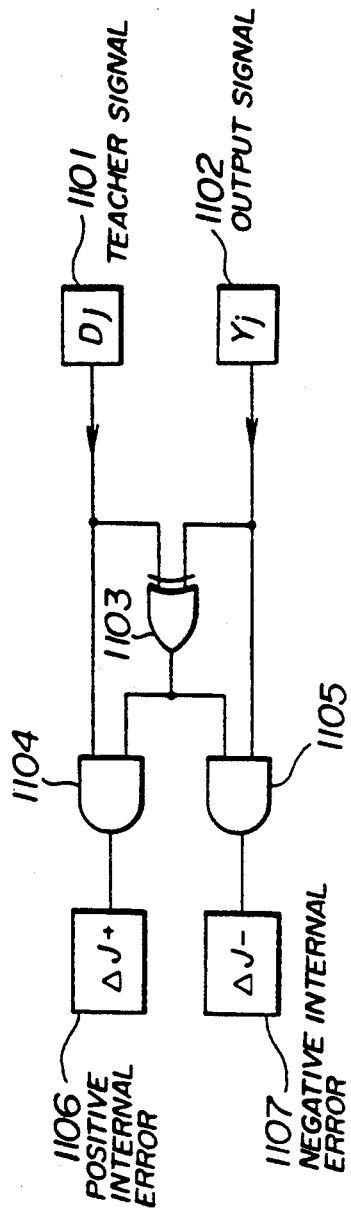
FIG. 29 shows one example of a circuitry diagram of the internal error generating means of a neuron unit at an output layer.
Figure 30:
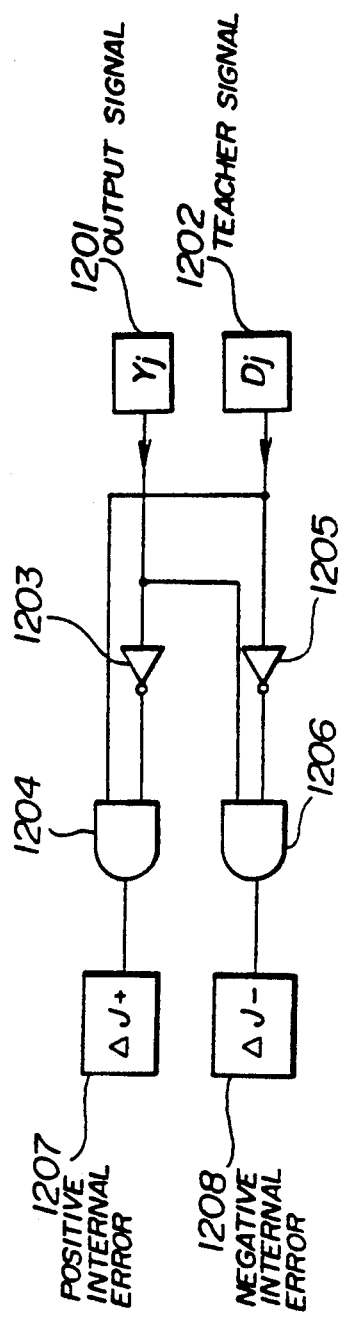
FIG. 30 shows another example of a circuitry diagram of the internal error generating means of a neuron unit at an output layer.

FIG. 29 shows a circuitry diagram of the internal error generating means for generating an internal error defined by the equations (36) and (37). An XOR circuit 1103 performs an exclusive OR operation for an output signal 1102 $Y_j$ and a teacher signal 1101 $d_j$, and then an AND circuit 1104 performs a logical multiplication for an output of the XOR circuit 1103 and the teacher signal 1101 to generate a positive internal error 1106 $\Delta_{j+}$, whereas an AND circuit 1105 performs a logical multiplication for an output of the XOR circuit 1103 and the output signal 1102 $Y_j$ to generate a negative internal error 1107 $\Delta_{j-}$. For $d_j \cap (d_j \text{XOR } Y_j) = d_j \cap (\neg Y_j)$ in the equation (36) and $Y_j \cap (d_j \text{XOR } Y_j) = Y_j \cap (\neg d_j)$ in the equation (37), the internal error generating means shown in FIG. 30 can be substituted for that shown in FIG. 29 where an AND circuit 1204 performs a logical multiplication for an output signal 1201 $Y_j$ inverted by a NOT circuit 1203 and a teacher signal 1202 $d_j$ to generated a positive internal error $\Delta_{j+}$ 1207 whereas an AND circuit 1206 performs a logical multiplication for an output signal 1201 $Y_j$ and the teacher signal 1202 $d_j$ inverted by a NOT circuit 1205 to generate a negative internal error 1208 $\Delta_{j-}$.

Figure 33:
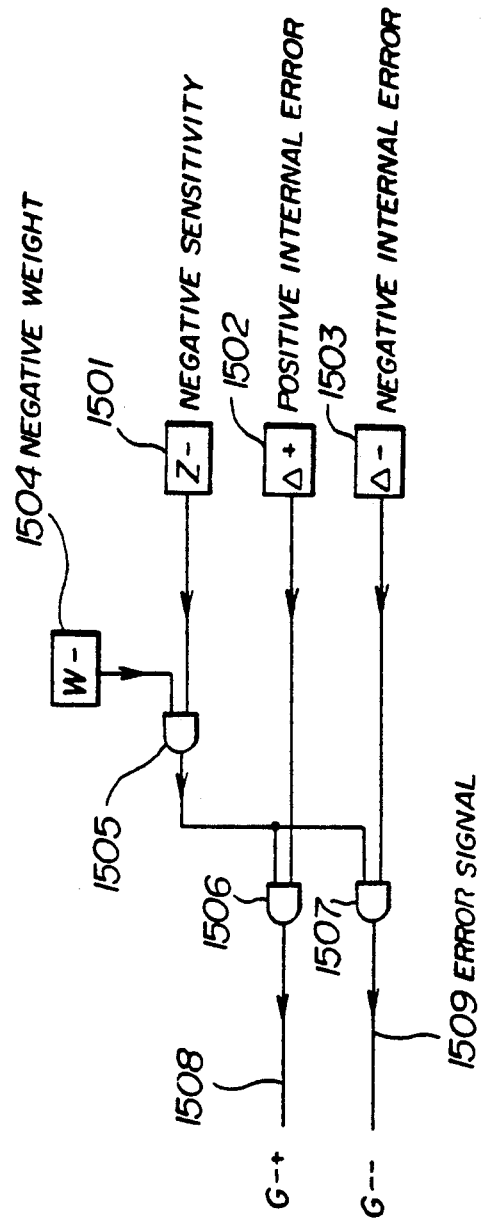
FIG. 33 shows still another example of a circuitry diagram of the error signal generating means shown in FIGS. 20 to 23.

FIGS. 31 to 33 respectively show a circuitry diagram of the error signal generating means for generating an error signal defined by the equations (40) to (43).

FIG. 31 shows a 1-bit flag 1306 which informs a switching circuit 1305 of an excitatory synapse or an inhibitory synapse. An AND circuit 1311 performs a logical multiplication for a positive sensitivity $Z_+$ 1301 generated via an AND circuit 1307, an OR circuit 1308 and a weight W 1310 of the excitatory synapse or performs a logical multiplication for a negative sensitivity $Z_-$ 1302 generated via an AND circuit 1309, the OR circuit 1308 and the weight W 1310 of the inhibitory synapse. Then an AND circuit 1312 performs a logical multiplication for an output of the AND circuit 1311 and a positive or negative internal error 1303 or 1304 to generate a corresponding positive or negative error signals $G_{++}$ and $G_{--}$ 1313 or $G_{+-}$ and $G_{-+}$ 1314.

In FIG. 32, an excitatory synapse is preselected. An AND circuit 1405 performs a logical multiplication for a positive weight $W_+$ 1404 and a positive sensitivity $Z_+$ 1401, and then an AND circuit 1406 performs a logical multiplication for an output of the AND circuit 1405 and a positive internal error $\Delta_+$ 1402 to generate a positive error signal $G_{++}$ 1408 whereas an AND circuit 1407 performs a logical multiplication for the output of the AND circuit 1405 and a negative internal error $\Delta_-$ 1403 to generate a negative error signal $G_{+-}$ 1409.

In FIG. 33, an inhibitory synapse is preselected. An AND circuit 1505 performs a logical multiplication for a negative weight $W_-$ 1504 and a negative sensitivity $Z_-$ 1501, and then an AND circuit 1506 performs a logical multiplication for an output of the AND circuit 1505 and a positive internal error $\Delta_+$ 1502 to generate a negative error signal $G_{-+}$ 1508 whereas an AND circuit 1507 performs a logical multiplication for an output of the AND circuit 1505 and a negative internal error $\Delta_-$ 1503 to generate a positive error signal $G_{--}$ 1509.

Figure 34:
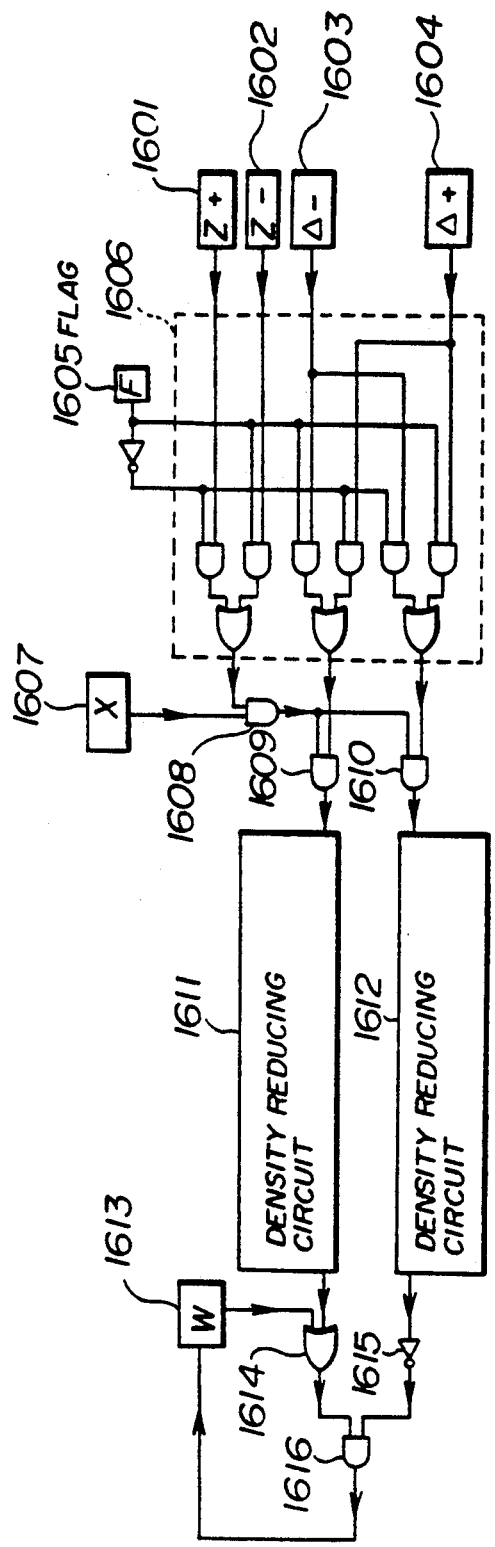
FIG. 34 shows one example of a circuitry diagram of weight modifying means shown in FIGS. 20 to 23.
Figure 35:
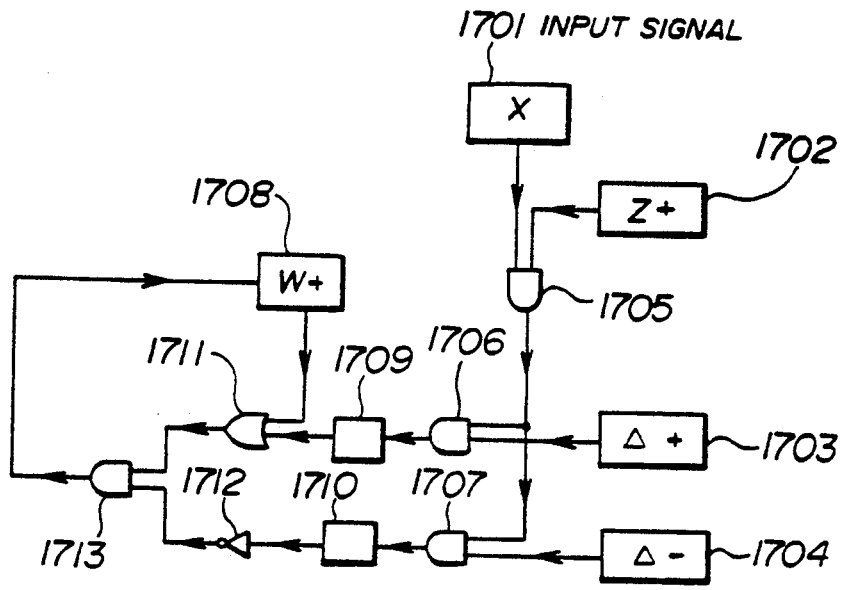
FIG. 35 shows another example of a circuitry diagram of the weight modifying means shown in FIGS. 20 to 23.
Figure 36:
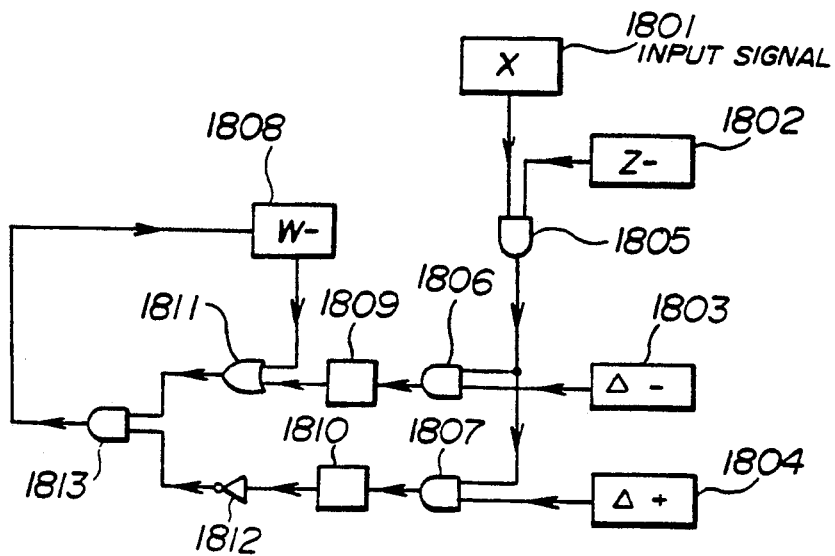
FIG. 36 shows still another example of a circuitry diagram of the weight modifying means shown in FIGS. 20 to 23.

FIGS. 34 to 36 show the weight modifying means for modifying a weight in accordance with the equations (44) and (45).

FIG. 34 shows a 1-bit flag 1605 which informs a switching circuit 1606 of an excitatory synapse or an inhibitory synapse. An AND circuit 1608 performs a logical multiplication for an input signal X 1607 and a positive sensitivity $Z_+$ 1601 or a negative sensitivity $Z_-$ 1602, and then an AND circuit 1609 and 1610 perform a logical multiplication for the above result and a negative error $\Delta_-$ 1603 or a positive error $\Delta_+$ 1604. Subsequently, density reducing circuits 1611 and 1612 respectively reduce an ON-bit density of the output of the AND circuit 1609 or 1610. An OR circuit 1614 performs a logical sum for the output of the density reducing circuit 1611 and a weight 1613, and an inverter 1615 inverts an output of the density reducing circuit 1612. Lastly, an AND circuit 1616 performs a logical multiplication for the output of the OR circuit 1614 and the inverter 1615 to generate a new weight. The density reducing circuits 1611 and 1612 respectively function to multiply a learning ratio $\eta$. The density reducing circuits 1611 and 1612 may each be comprised of a counter or a flip-flop to decimate every other ON-bit. The density reducing circuits 1611 and 1612 comprising a counter have an advantage in that they can each easily and freely set a ratio for reducing the ON-bit density so that the network can be easily controlled. Incidentally, the density reducing circuit may be omitted if $\eta$ is set at 1.

In FIG. 35, an excitatory synapse is preselected. An AND circuit 1705 performs a logical multiplication for an input signal X 1701 and a positive sensitivity $Z_+$ 1702. Next, an AND circuit 1706 performs a logical multiplication for an output of the AND circuit 1705 and a positive internal error $\Delta_+$ 1703 whereas an AND circuit 1707 performs a logical multiplication for an output of the AND circuit 1705 and a negative internal error $\Delta_-$ 1704. The density reducing circuits 1709 and 1710 respectively reduce the ON-bit density of an output of the corresponding AND circuit 1706 or 1707. Then an OR circuit 1711 performs a logical sum for the positive weight $W_+$ and an output of the density reducing circuit 1709, and an inverter 1712 inverts an output of the density reducing circuit 1710. Lastly, the AND circuit 1713 performs a logical multiplication for an output of the OR circuit 1711 and that of the inverter 1712 to generate a new weight. Incidentally, the density reducing circuit may be omitted if $\eta$ is set at 1.

In FIG. 36, the synapse is preselected as an inhibitory synapse. An AND circuit 1805 performs a logical multiplication for an input signal X 1801 and a negative sensitivity $Z_-$ 1802. Next, an AND circuit 1806 performs a logical multiplication for an output of the AND circuit 1805 and a negative internal error $\Delta_-$ 1803 whereas an AND circuit 1807 performs a logical multiplication for an output of the AND circuit 1805 and a positive internal error $\Delta_+$ 1804. The density reducing circuits 1809 and 1810 respectively reduce the ON-bit density of an output of the corresponding AND circuit 1806 or 1807. Then an OR circuit 1811 performs a logical sum for the negative weight $W_-$ and an output of the density reducing circuit 1809, and an inverter 1812 inverts an output of the density reducing circuit 1810. Lastly, the AND circuit 1813 performs a logical multiplication for an output of the OR circuit 1811 and that of the inverter 1812 to generate a new weight. Incidentally, the density reducing circuit may be omitted if $\eta$ is set to 1.

Also, it is preferable to modify all the weights in the network, however it may be beneficial if only some of the weights in the network are modified.

Next follows with reference to FIG. 37 a description of a learning process executed by the above neural network. First is a description of a learning process in which output signal and weight are expressed by a real number values and an error signal, internal error, and sensitivity are each respectively expressed by a monovariate real number value. Initially, the number of layers Lm is substituted for a variable L, and an internal error $\Delta_{J,L}$ is computed by subtracting an output signal $Y_{J,L}$ of a neuron unit at an output layer from a teacher signal $d_j$ (in step 2301). This procedure is iterated from $J=1$ to $J=N_{L=Lm}$, which is the number of neuron units at the output layer. Next, an arbitrary neuron at a hidden layer ($L=Lm-1$ to $L=2$) is named "J", and another neuron unit which is connected to the neuron unit J and receives an output signal from the neuron unit J is named "I". Then a sensitivity Z of a synapse between the neuron units J and I is calculated by using some or all the weights of synapses connected to the neuron unit I and input signals input to the neuron unit I via the above synapses (in step 2302). The internal error of the neuron unit J is calculated by multiplying internal error of the neuron unit I, the weight, and the sensitivity and adding results of these multiplications for $I=1$ to $I=N_{l+1}$ (in step 2303). Sensitivities which are not yet calculated in step 2302 are then calculated in a similar way as in step 2302 (in step 2304). Lastly, each weight is modified by adding the premodified weight $W_{J,I,L}$ to the sensitivity $Z_{j,I,L}$ multiplied by a learning ratio $\eta$, internal error $\Delta_{J,L}$ and input signal $X_{I,L-1}$ (in step 2305).

Figure 38A:
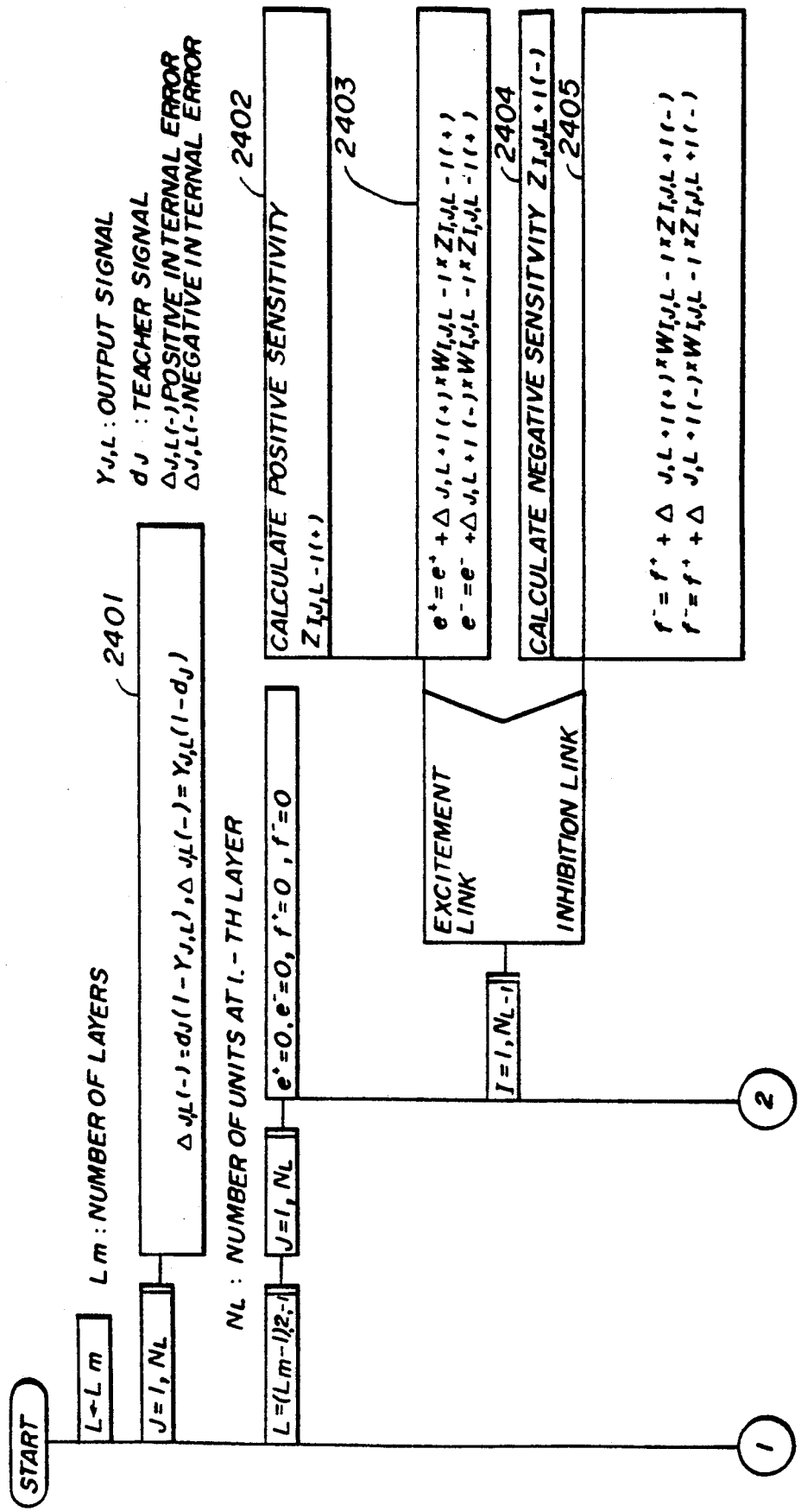
FIGS. 38A and 38B show a second PAD for explaining a learning method according to the present invention using a bivariate error signal, internal error, and sensitivity which are to be expressed by a real number value.
Figure 38B:
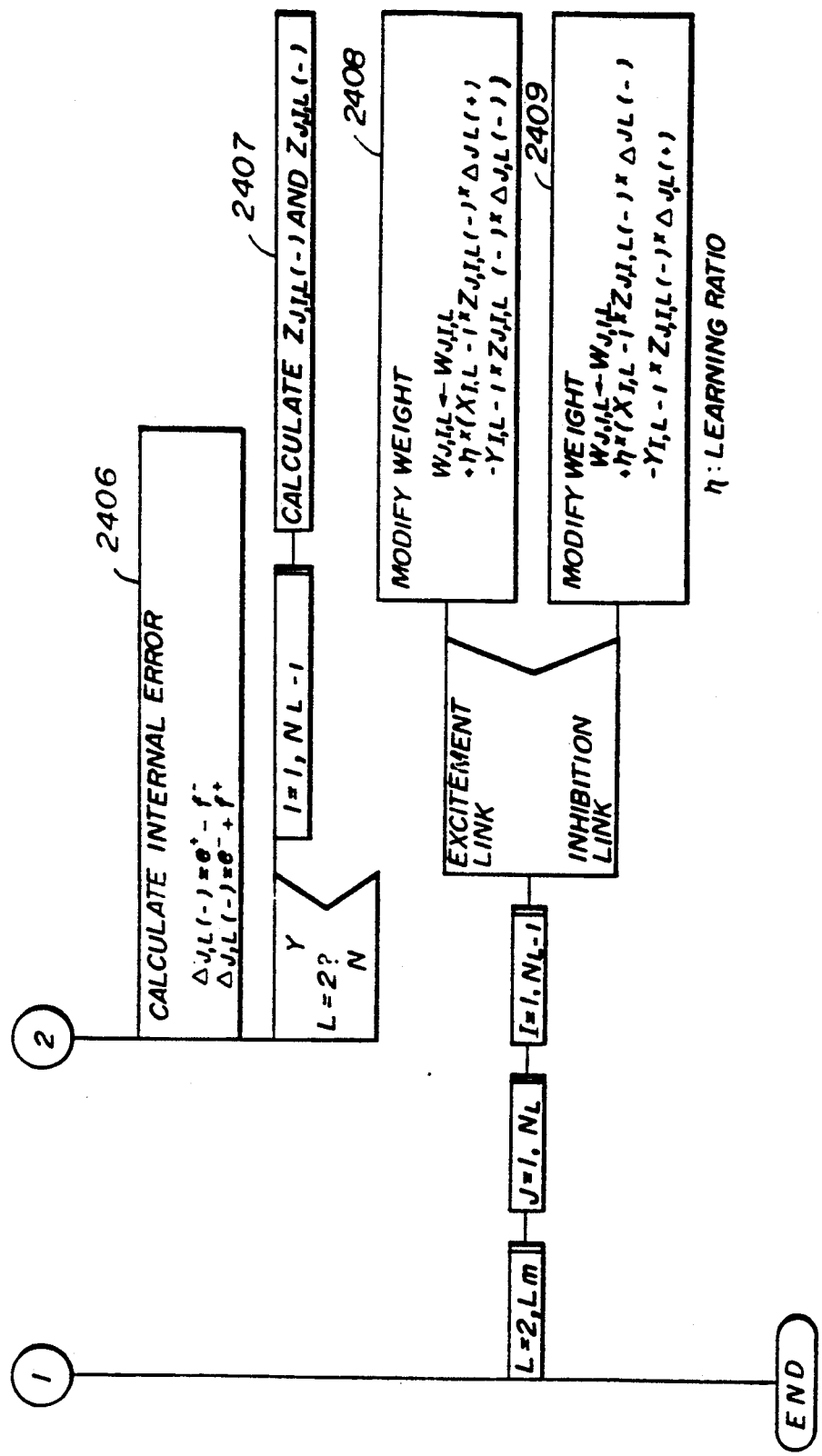

Next follows with reference to FIGS. 38A and 38B a description of the learning process in which output signal and weight are expressed by a real number values and the error signal, internal error, sensitivity are respectively expressed by a bivariate real number values. First, the number of layers Lm is substituted for a variable L, and a positive internal error $\Delta_{J,L(+)}$ and a negative internal error $\Delta_{J,L(-)}$ are respectively calculated by an output signal $Y_{J,L}$ of a neuron unit at an output layer and a teacher signal $d_i$ in accordance with the equation (21) (in step 2401). This procedure is iterated from $J=1$ to $J=N_{L=Lm}$ which is the number of neuron units at the output layer. Next, an arbitrary neuron at a hidden layer ($L=Lm-1$ to $L=2$) is named "J" and another neuron unit which is connected to the neuron unit J via an excitatory synapse and receives a signal from the neuron unit J is named "I". Then a positive sensitivity Z of the excitatory synapse between the neuron units J and I is calculated by using some or all the weights of synapses connected to the neuron unit I and input signals input to the neuron unit via the synapses (in step 2402). Results of multiplications for weight, positive sensitivity, and positive internal error are added into $e^+$ and results of multiplications for weight, positive sensitivity, and negative internal error are added into $e^-$ (in step 2403). In addition, another neuron unit which is connected to the neuron unit J via an inhibitory synapse and receives an output signal from the neuron unit J is named "K". Then a negative sensitivity Z of the inhibitory synapse between the neuron units J and K is calculated by using some or all the weights of synapses connected to the neuron unit I and input signals input to the neuron unit via the synapses (in step 2404). Results of multiplications for weight, negative sensitivity, and positive internal error are added to $f^+$, and results of multiplications for weight, negative sensitivity, and negative internal error are added to $f^-$ (in step 2405). The positive internal errors are computed by adding $e^+$ and $f^-$, and the negative internal errors are computed by adding $e^-$ and $f^+$ (in step 2406). Sensitivities which are not yet calculated in steps 2402 and 2404 are calculated in a similar way as in steps 2402 and 2404 (in step 2407). Lastly, each weight is modified by adding the premodified weight to the corresponding sensitivity multiplied by a learning ratio, corresponding internal error, and input signal (in steps 2408 and 2409).

Figure 39A:
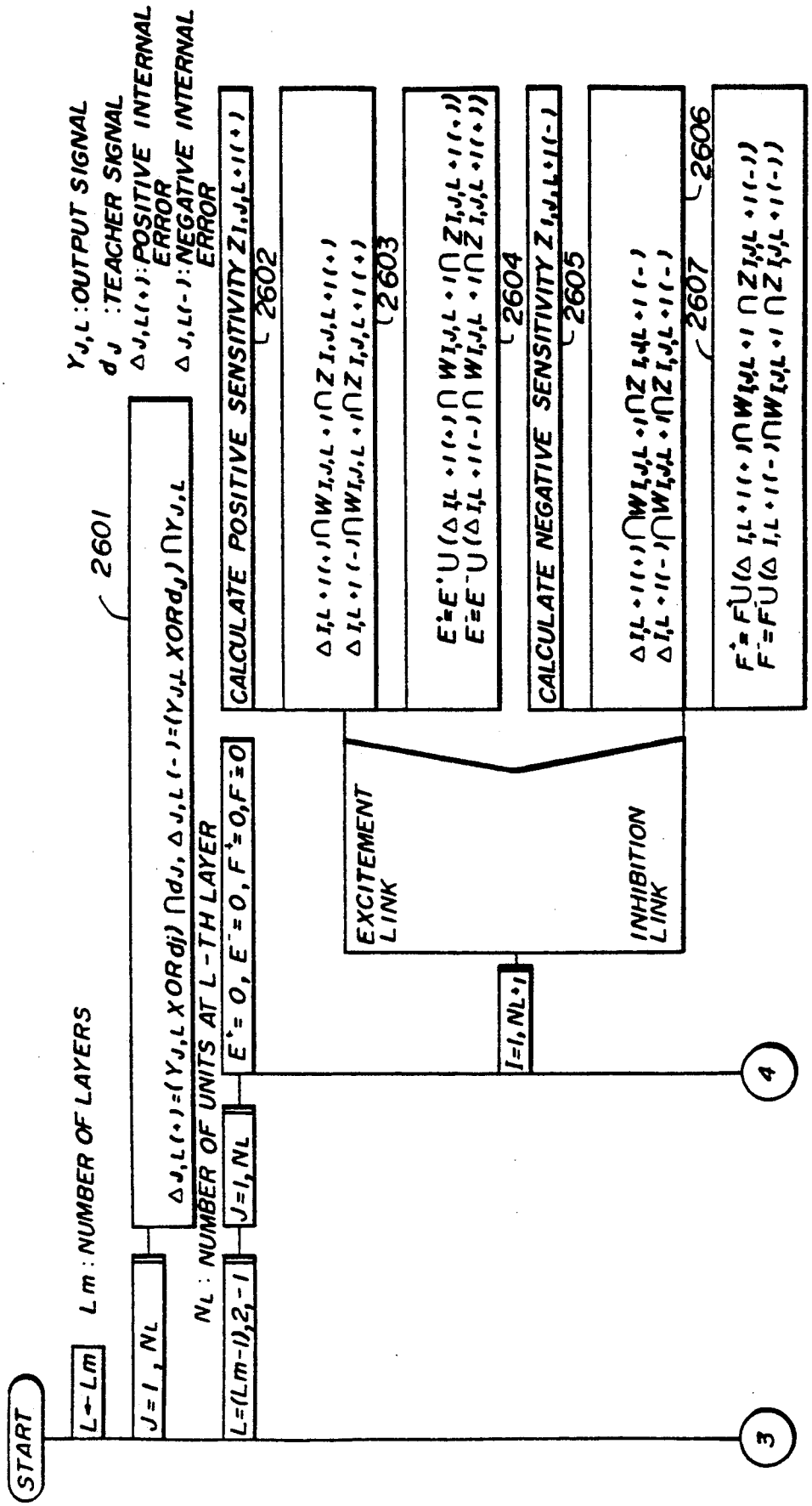

Next follows with reference to FIGS. 39A and 39B a description of a neural network in which the output signal, weight, error signal, internal error, and sensitivity are respectively expressed by a bit string. First, a number of layers Lm is substituted for a variable L, and a positive internal error $\Delta_{J,L(+)}$ and a negative internal error $\Delta_{J,L(-)}$ are computed by an output signal $Y_{J,L}$ of a neuron unit at an output layer and a teacher signal $d_i$ in accordance with the equations (36) and (37) (in step 2601). These procedures are iterated from $J=1$ to $J=N_{L=Lm}$, which is the number of neuron units at the output layer. Next, an arbitrary neuron at a hidden layer ($L=Lm-1$ to $L=2$) is named "J" and another neuron unit which is connected to the neuron unit J via an excitatory synapse and receives a signal from the neuron unit J is named "I". Then a positive sensitivity Z of the excitatory synapse between the neuron units J and I is calculated by using some or all the weights of synapses connected to the neuron unit I and input signals input to the neuron unit via the synapses (in step 2602). Results of logical multiplications for weight, positive sensitivity, and positive internal error are added to E+, and results of logical multiplications for weight, positive sensitivity, and negative internal error are added to E− (in step 2603 and 2604). In addition, another neuron unit which is connected to the neuron unit J via an inhibitory synapse and receives a signal from the neuron unit J is named "K". Then a negative sensitivity Z of the inhibitory synapse between the neuron units J and K is calculated by using some or all the weights of synapses connected to the neuron unit I and input signals input to the neuron unit via the synapses (in step 2605). Results of logical multiplications for weight, negative sensitivity, and positive internal error are added to F+, and results of logical multiplications for weight, negative sensitivity, and negative internal error are added to F− (in step 2606 and 2607). The positive internal errors are computed by logically adding E+ and F−, and the negative internal errors are computed by adding E− and F+ (in step 2608). Sensitivities which are not yet calculated in steps 2602 and 2605 are calculated in a similar way as in step 2602 and 2605 (in step 2609).

Next, if the synapse is an excitatory one, a new weight thereof is generated by performing a logical sum for a signal "1" and the current weight of the synapse, and then performing a logical multiplication for the above result and a signal "2", by performing a logical multiplication for the signals "1" and "2" and then performing a logical sum for the above result and the current weight of the synapse, or by performing a logical multiplication for the signal "2" and the current weight of the synapse and then performing a logical sum for the above result and the signal "1"; the signal "1" being generated by performing a logical multiplication for an input signal transmitted through the synapse, positive sensitivity of the synapse, and positive internal error of a neuron unit which receives the input signal, or decimating ON-bits from the above result to decrease the ON-bit density thereof, and the signal "2" being generated by performing a logical multiplication for the input signal transmitted through the synapse, positive sensitivity of the synapse, and negative internal error of the neuron unit which receives the input signal and then performing a negation for the above result, or by decimating some ON-bits from the above result before performing the negation (in step 2610).

Next, if the synapse is an inhibitory one, a new weight thereof is generated by performing a logical sum for a signal "3" and the current weight of the synapse, and then performing a logical multiplication for the above result and a signal "4", by performing a logical multiplication for the signals "3" and "4" and then performing a logical sum for the above result and the current weight of the synapse, or by performing a logical multiplication for the signal "4" and the current weight of the synapse and then performing a logical sum for the above result and the signal "3"; the signal "3" being generated by performing a logical multiplication for an input signal transmitted through the synapse, negative sensitivity of the synapse, and negative internal error of a neuron unit which receives the input signal, or decimating ON-bits from the above result to decrease the ON-bit density thereof, and the signal "4" being generated by performing a logical multiplication for the input signal transmitted through the synapse, negative sensitivity of the synapse, and positive internal error of the neuron unit which receives the input signal and then performing a negation for the above result, or by decimating some ON-bits from the above result before performing the negation (in step 2611).

Figure 40B:
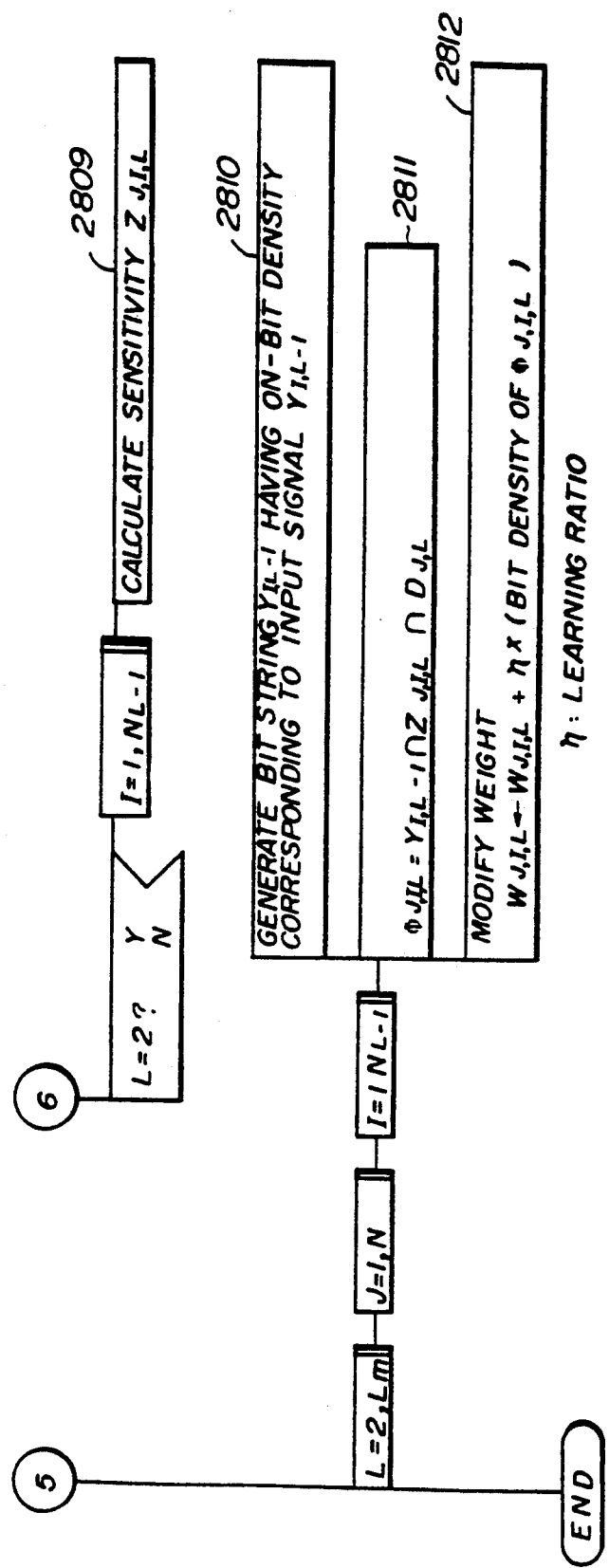
Figure 4I:
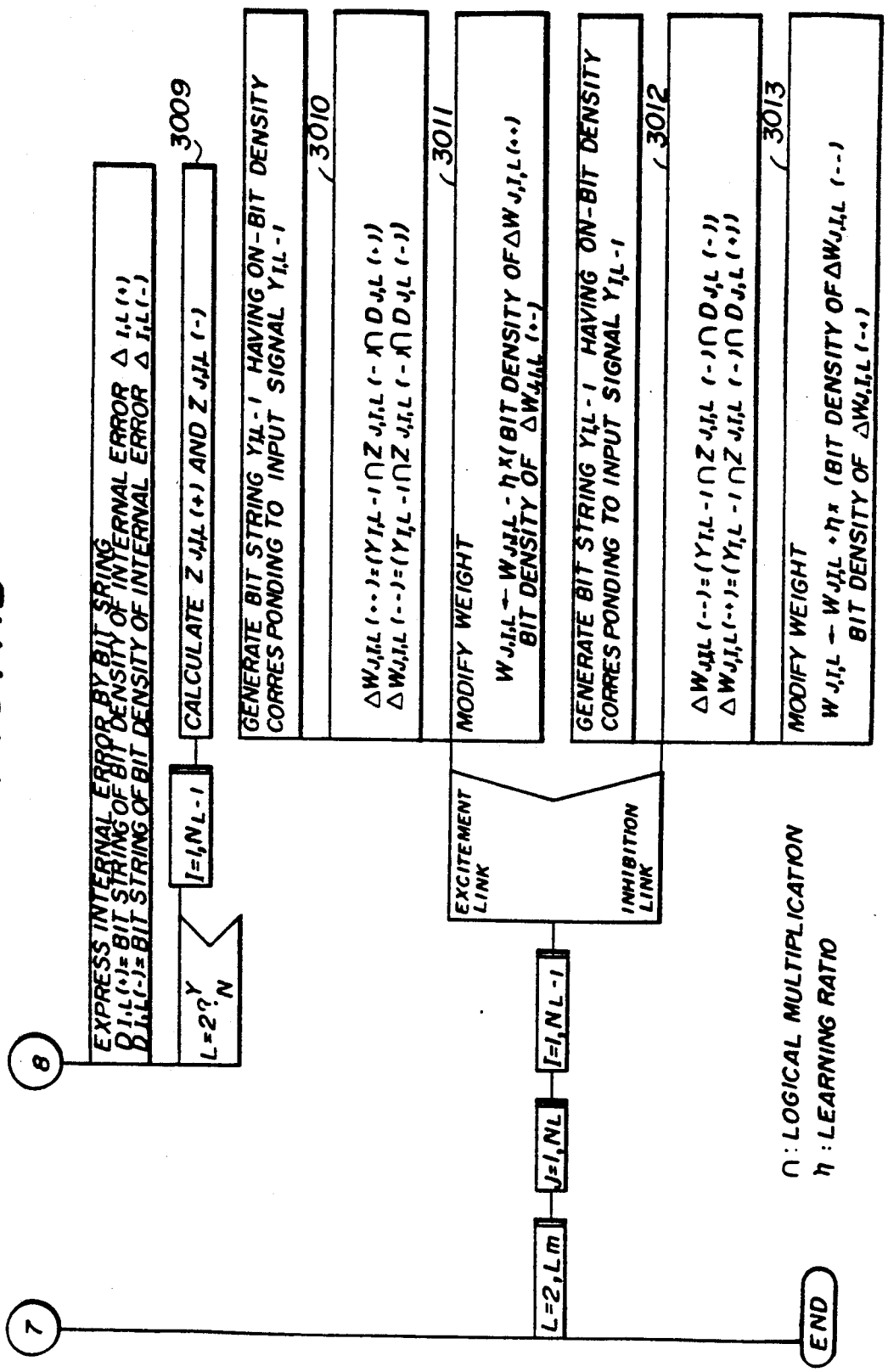

Next follows with reference to FIGS. 40A and 40B a description of a neural network which uses a monovariate error signal, internal error, and sensitivity which can be freely expressed by a bit string or a real number value. As an example of a learning process used for a case where some signals and weights are expressed by a real number value and the others are expressed by a bit string, next follows a case where a bit string is used to calculate a logical multiplication for a weight, sensitivity and internal error and to calculate a logical multiplication for a input signal, sensitivity and internal error, and a real number value is used for other processes. According to the learning process, a real value is converted into a bit string having an ON-bit density corresponding to the real value (in steps 2802, 2804, 2808, and 2810). First, the number of layers Lm is substituted for a variable L, and an internal error $\Delta_{J,L}$ is computed by subtracting an output signal $Y_{J,L}$ of a neuron unit at an output layer from a teacher signal $d_i$ (in step 2801). This procedure is iterated from J=1 to J=$N_{L=Lm}$, which is a number of neuron units at the output layer. Next, an arbitrary neuron at a hidden layer (L=Lm−1 to L=2) is named "J" and another neuron unit which is connected to the neuron unit J and receives a signal from the neuron unit J is named "I". Then a sensitivity Z of a synapse between the neuron units J and I is calculated by using some or all the weights of synapses connected to the neuron unit I and input signals input to the neuron unit via the synapses (in step 2803). The internal error of the neuron unit J is computed by multiplying internal error of the neuron unit I, weight, and sensitivity (in steps 2805, 2806, and 2807). Sensitivities which are not yet calculated in step 2803 are calculated in a similar way as in step 2803 (in step 2809). Lastly, each weight is modified by adding the premodified weight to the sensitivity multiplied by a learning ratio, internal error and input signal (in steps 2811 and 2812). In the above process, a negative real value is expressed by a bit string and a flag representing a negative value.

A description will next be given with reference to FIGS. 41A and 41B of a neural network which uses a bivariate real number for the error signal, internal error, and sensitivity which can be freely expressed by a bit string or a real number value. As an example of a learning process used for a case where some signals and weights are expressed by a real number value and the others are expressed by a bit string, next follows a flow-chart in which a bit string is used to calculate a logical multiplication for a weight, sensitivity and internal error and to calculate a logical multiplication for a input signal, sensitivity and internal error, and a real number value is used for other processes. First, the number of layers Lm is substituted for a variable L, and a positive internal error $\Delta_{J,L(+)}$ and a negative internal error $\Delta_{J,L(-)}$ are computed by an output signal $Y_{J,L}$ of a neuron unit at an output layer and a teacher signal $d_i$ in accordance with the equation (21) (in step 3001). This procedure is iterated from J=1 to J=$N_{L=Lm}$, which is a number of neuron units at the output layer. Next, an arbitrary neuron at a hidden layer (L=Lm−1 to L=2) is named "J" and another neuron unit which is connected to the neuron unit J via an excitatory synapse and receives a signal from the neuron unit J is named "I". Then a positive sensitivity Z of the excitatory synapse between the neuron units J and I is calculated by using some or all the weights of synapses connected to the neuron unit I and input signals input to the neuron unit I via the synapses (in step 3002). Results of logical multiplications for weight, positive sensitivity, and positive internal error are converted into ON-bit densities and added to $e^+$, and results of logical multiplications for weight, positive sensitivity, and negative internal error are converted into ON-bit densities and added to $e^-$ (in steps 3003 and 3004). In addition, another neuron unit which is connected to the neuron unit J via an inhibitory synapse and receives an output signal from the neuron unit J is named "K". Then a negative sensitivity Z of the inhibitory synapse between the neuron units J and K by using some or all the weights of synapses connected to the neuron unit K and input signals input to the neuron unit K via the synapses (in step 3005). Results of logical multiplications for weight, negative sensitivity and positive internal error are converted into ON-bit densities and added to $f^+$, and results of logical multiplications for weight, negative sensitivity and negative internal error are converted into ON-bit densities and added to $f^-$ steps 3006 and 3007). The positive internal errors are computed by adding $e^+$ and $f^-$, and the negative internal errors are computed by adding $e^-$ and $f^+$ (in step 3008). Sensitivities which are not yet calculated in steps 3002 and 3005 are calculated in a similar way as in steps 3002 and 3005 (in step 3009).

Next, if the synapse is an excitatory one, a new weight thereof is generated by performing an arithmetic addition or logical multiplication for a signal "5" and the current weight of the synapse and then performing an arithmetic addition or logical multiplication for the above result and a signal "6", by performing an arithmetic addition or logical sum for the signals "5" and "6" and then performing an arithmetic addition or logical sum for the above result and the current weight of the synapse, or by performing an arithmetic addition or logical multiplication for the signal "6" and the current weight of the synapse and then performing an arithmetic addition or logical sum for the above result and the signal "5"; the signal "5" being generated by performing an arithmetic multiplication or logical multiplication for an input signal transmitted through the synapse, positive sensitivity of the synapse, and positive internal error of a neuron unit which receives the input signal, by decimating ON-bits from the above result to decrease the ON-bit density thereof, or performing an arithmetic multiplication for the above result and the learning ratio, and the signal "6" being generated by performing an arithmetic multiplication or logical multiplication for the input signal transmitted through the synapse, positive sensitivity of the synapse, and negative internal error of the neuron unit which receives the input signal and then performing a negation for the above result, by decimating some ON-bits from the above result before performing the negation, by performing an arithmetic multiplication or logical multiplication for the input signal, positive sensitivity, negative internal error and then multiplying $-1$ by the above result, or by performing an arithmetic multiplication for the above result and the learning ratio (in steps 3010 and 3011).

Next, if the synapse is an inhibitory one, a new weight thereof is generated by performing an arithmetic addition or logical multiplication for a signal "7" and the current weight of the synapse and then performing an arithmetic addition or logical multiplication for the above result and a signal "8", by performing an arithmetic addition or logical sum for the signals "7" and "8" and then performing an arithmetic addition or logical multiplication for the above result and the current weight of the synapse, or by performing an arithmetic addition or logical multiplication for the signal "8" and the current weight of the synapse and then performing an arithmetic addition or logical sum for the above result and the signal "7"; the signal "7" being generated by performing an arithmetic multiplication or logical multiplication for an input signal transmitted through the synapse, negative sensitivity of the synapse, and negative internal error of a neuron unit which receives the input signal, by decimating ON-bits from the above result to decrease the ON-bit density thereof, or performing an arithmetic multiplication for the above result and the learning ratio, and the signal "8" being generated by performing an arithmetic multiplication or logical multiplication for the input signal transmitted through the synapse, negative sensitivity of the synapse, and positive internal error of the neuron unit which receives the input signal and then performing a negation for the above result, by decimating some ON-bits from the above result before performing the negation, by performing an arithmetic multiplication or logical multiplication for the input signal, negative sensitivity, positive internal error and then multiplying $-1$ by the above result, or by performing an arithmetic multiplication for the above result and the learning ratio (in steps 3012 and 3013).

Figure 42B:
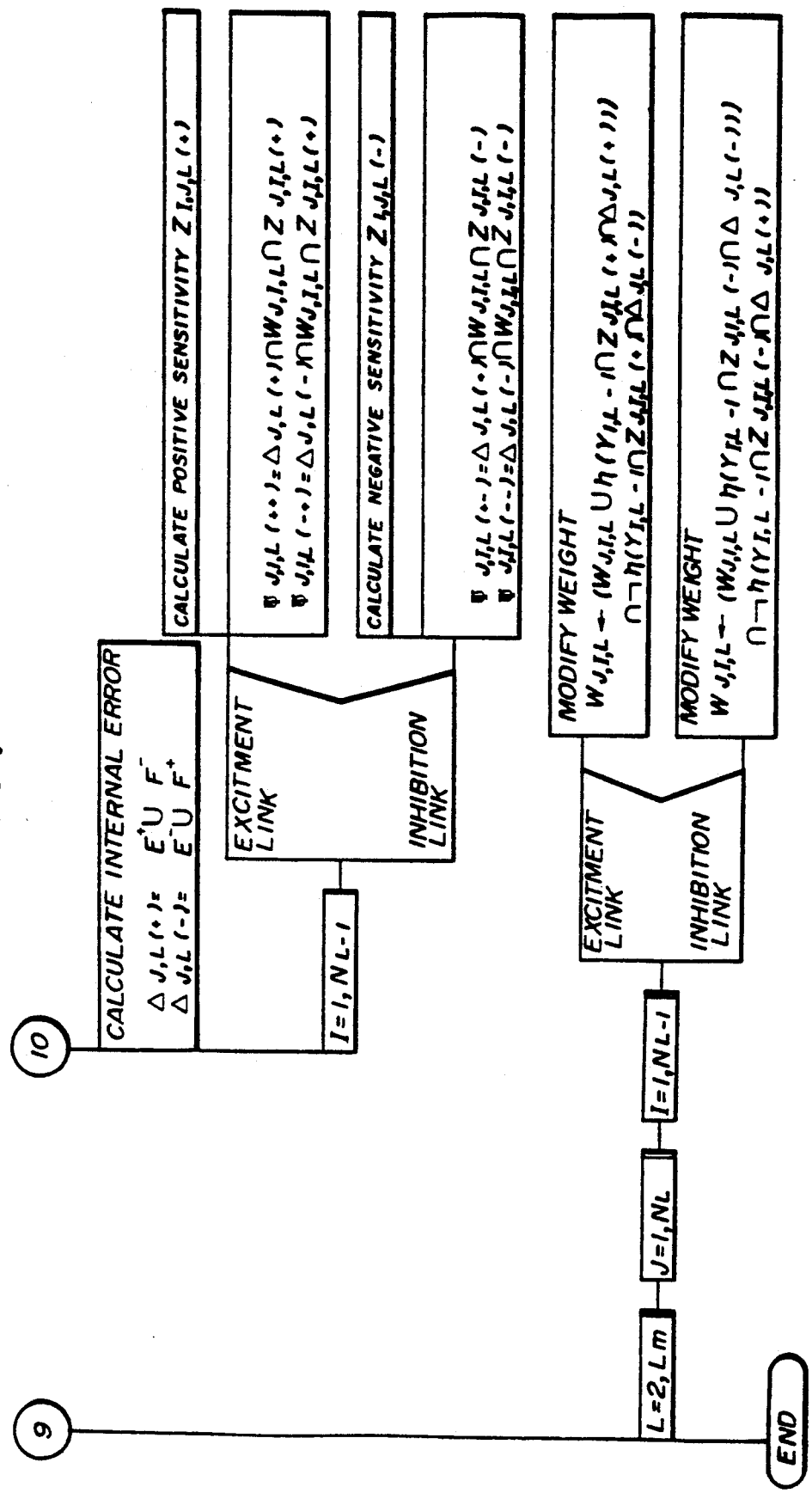
Figure 43A:
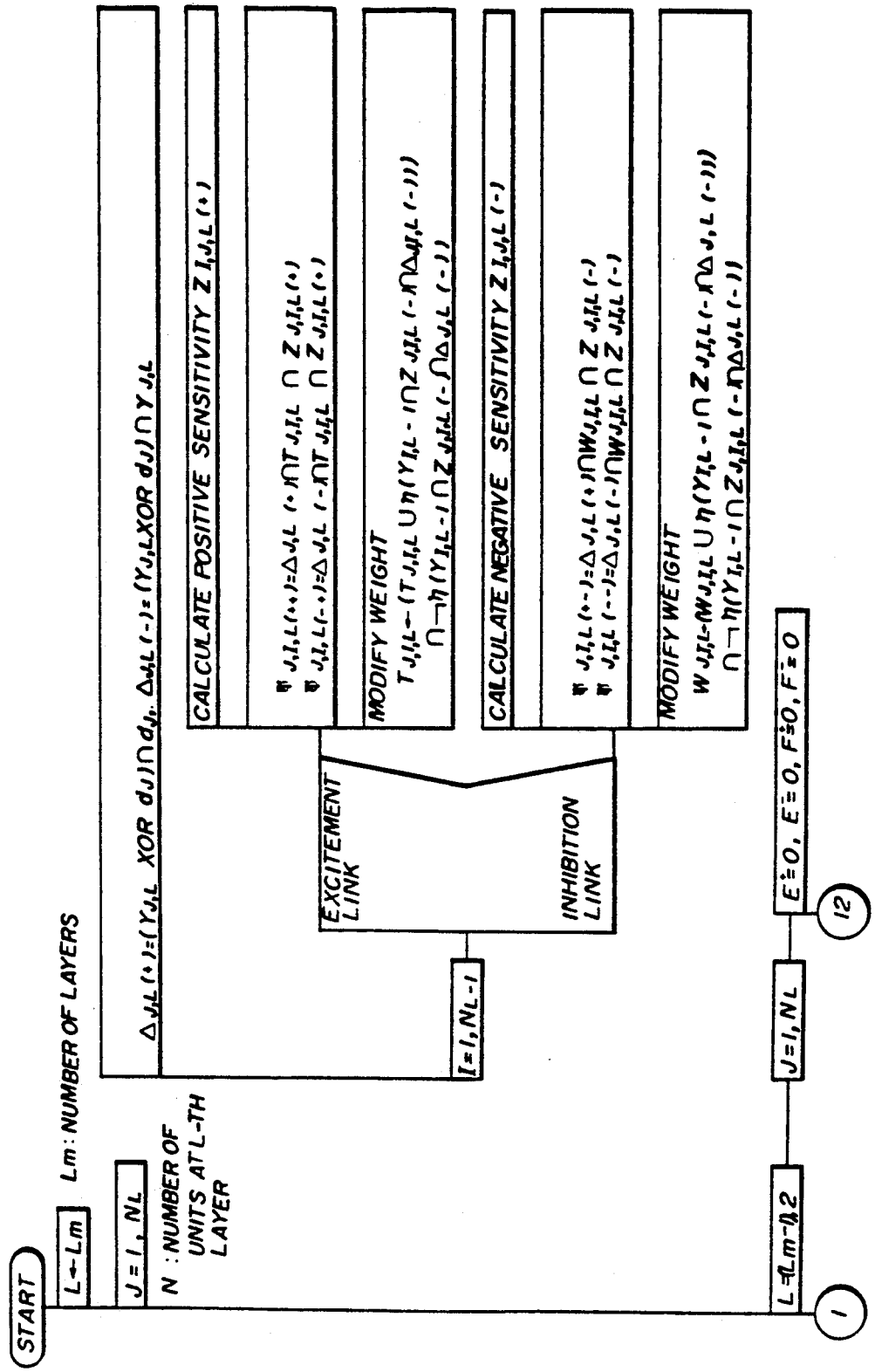

Although the positive and negative sensitivities of a synapse between a target neuron unit and another neuron unit which receives a signal from the target neuron unit are computed before the internal error of the target neuron unit is computed in the learning processes of the above embodiments, the positive and negative sensitivities of a synapse between a target neuron unit and another neuron unit which sends a signal to the target neuron unit may also be computed after the internal error of the target neuron unit is computed as shown in FIGS. 42A and 42B. In addition, a weight of a synapse of the target neuron may be modified whenever the internal error of the target neuron is computed as shown in FIGS. 43A, 43B, 44A, and 44B. The diagram shown in FIGS. 44A and 44B differs from that in FIGS. 43A and 43B in that a modified weight is used to compute the internal error. Incidentally, the learning process shown in FIGS. 42A to 44B may be modified so that all the signals and weights are expressed by real number values, or by real number values and bit strings.

Figure 45:
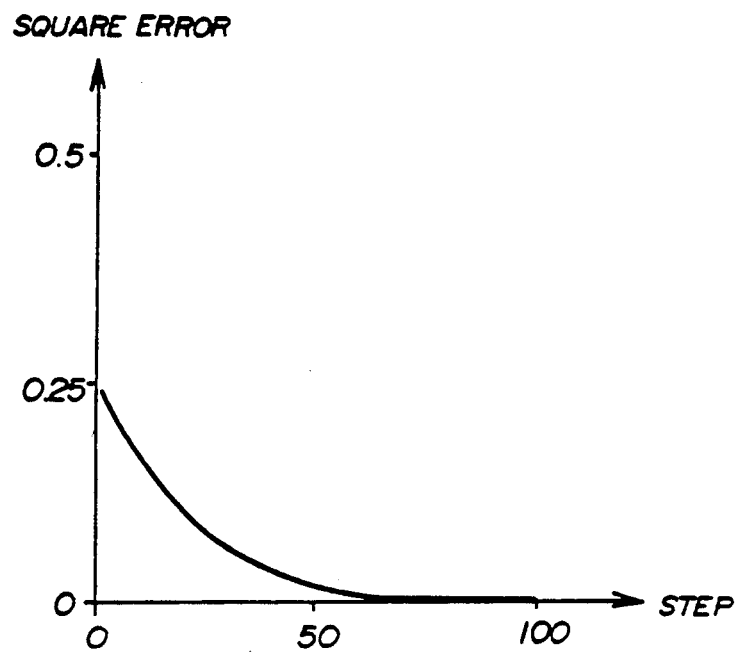
FIG. 45 shows a training result according to the present invention.

According to a computer simulation of the learning process according to the present invention experimentally applied to a neural network in accordance with the equation (51) having $e_j=0$ in the following condition and learning algorithm shown below, a change of an average value of square error defined by the equation (3) for four kinds of input patterns during 100 steps was observed, and, as a result, the square error approximated 0 at the sixtieth-seventieth steps, as shown in FIG. 45. Incidentally, a synapse is an excitatory synapse or an inhibitory synapse.

EXAMPLE 1

CONDITION

| | | |
|---|---|---|
| NUMBER OF LAYERS | 3 | |
| NUMBER OF NEURON UNITS; | INPUT LAYER | 2 |
| | HIDDEN LAYER | 2 |
| | OUTPUT LAYER | 1 |

| | | |
|---|---|---|
| IN FIRST INPUT PATTERN: | | |
| INPUT SIGNAL: | PULSE DENSITY OF NEURON UNIT 1 AT INPUT LAYER | 0 |
| | PULSE DENSITY OF NEURON UNIT 2 AT INPUT LAYER | 1 |
| TEACHER SIGNAL; | PULSE DENSITY OF NEURON UNIT AT OUTPUT LAYER | 1 |
| IN SECOND INPUT PATTERN: | | |
| INPUT SIGNAL: | PULSE DENSITY OF NEURON UNIT 1 AT INPUT LAYER | 1 |
| | PULSE DENSITY OF NEURON UNIT 2 AT INPUT LAYER | 0 |
| TEACHER SIGNAL: | PULSE DENSITY OF NEURON UNIT AT OUTPUT LAYER | 1 |
| IN THIRD INPUT PATTERN: | | |
| INPUT SIGNAL: | PULSE DENSITY OF NEURON UNIT 1 AT INPUT LAYER | 1 |
| | PULSE DENSITY OF NEURON UNIT 2 AT INPUT LAYER | 1 |
| TEACHER SIGNAL: | PULSE DENSITY OF NEURON UNIT AT OUTPUT LAYER | 0 |
| IN FOURTH INPUT PATTERN: | | |
| INPUT SIGNAL: | PULSE DENSITY OF NEURON UNIT 1 AT INPUT LAYER | 0 |
| | PULSE DENSITY OF NEURON UNIT 2 AT INPUT LAYER | 0 |
| TEACHER SIGNAL: | PULSE DENSITY OF NEURON UNIT AT OUTPUT LAYER | 0 |

LEARNING ALGORITHM

Algorithm are shown in FIGS. 39A and 39B. Sensitivities are calculated using equations (66) and (67).

LEARNING CONDITIONS:

NUMBER OF LEARNING STEPS: 100
LEARNING RATIO: 0.5
INITIAL VALUE OF EACH WEIGHT: 0.05

SIGN OF WEIGHTS:

$W_{11}$: −(NEURON UNIT 1 AT INPUT LAYER AND NEURON UNIT 1 AT HIDDEN LAYER)
$W_{12}$: +(NEURON UNIT 2 AT INPUT LAYER AND NEURON UNIT 1 AT HIDDEN LAYER)
$W_{21}$: +(NEURON UNIT 1 AT INPUT LAYER AND NEURON UNIT 2 AT HIDDEN LAYER)
$W_{22}$: −(NEURON UNIT 2 AT INPUT LAYER AND NEURON UNIT 2 AT HIDDEN LAYER)
$W_{11}$: +(NEURON UNIT 2 AT HIDDEN LAYER AND NEURON UNIT AT OUTPUT LAYER)
$W_{12}$: +(NEURON UNIT 2 AT HIDDEN LAYER AND NEURON UNIT AT OUTPUT LAYER)

Next, in an example 2, the above condition was modified so that weights were defined by the following equations:

$$W_{ji}{'+} = W_{ji+} + A_{ji} - B_{ji}, \text{ and}$$

$$W_{ji}{'-} = W_{ij-} + C_{ji} - D_{ji}$$

where $W_{ji}'$ is a new weight, $W_{ji}$ is a previous weight, $A_{ji}$ to $D_{ji}$ are respectively expressed by a pulse density, and defined as follows;

$A_{ji}$ = pulse density of $\eta[Z_{ji+} \cap Y_i \cap \Delta_{j+}]$, $B_{ji}$ = pulse density of $\eta[Z_{ji+} \cap Y_i \cap \Delta_{j-}]$, $C_{ji}$ = pulse density of $\eta[Z_{ji-} \cap Y_i \cap \Delta_{j-}]$, and $D_{ji}$ = pulse density of $\eta[Z_{ji-} \cap Y_i \cap \Delta_{j+}]$.

Figure 46:
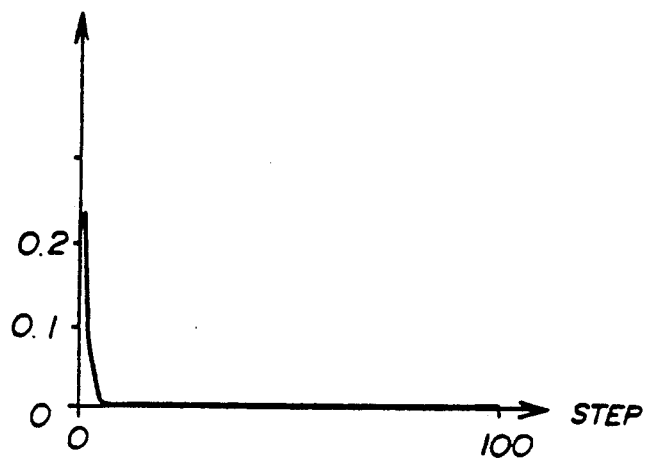
FIG. 46 shows a conventional training result.

In addition, 77 represents a decimation process for decimating some ON-bits, and sensitivities are defined by the equations (66) and (67). As a result, the square error approximated 0, as shown in FIG. 46.

Figure 47:
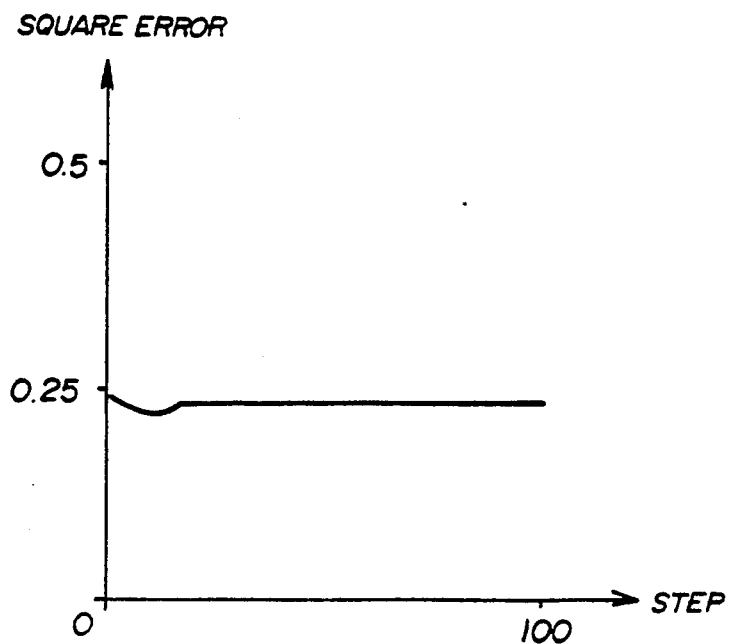
FIG. 47 shows another training result according to the present invention.
Figure 48:
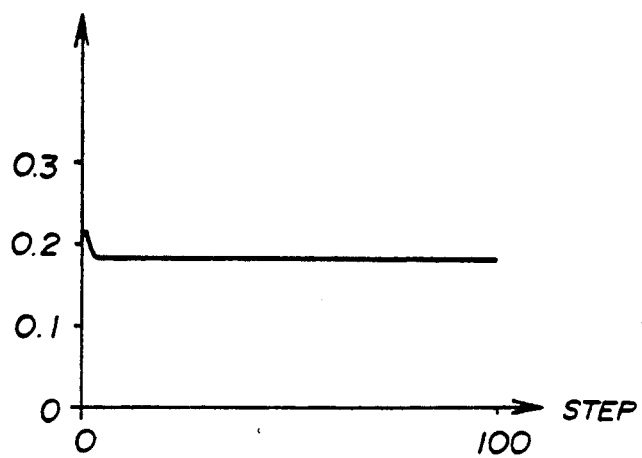
FIG. 48 shows another conventional training result.

Incidentally, the learning algorithm without sensitivity (that is, all values of sensitivities are 1) in the condition of the above example 1 exhibited the result shown in FIG. 47. Moreover, the learning algorithm without sensitivity under the condition of the above example 2 exhibited the result shown in FIG. 48. As shown in FIGS. 47 and 48, the learning algorithm without sensitivity cannot successfully diminish the square error.

Further, the present invention is not limited to these preferred embodiments, as various variations and modifications may be made without departing from the scope of the present invention.

What is claimed is:

1. A method for training of a neutral network which includes a plurality of hierarchically interconnected layers, said layers including an input layer, an output layer, and one or more hidden layers located between the input layer and output layer, the input layer, hidden layer and output layer each respectively including at least one neuron unit, neuron units arranged at successive layers being interconnected to each other via a synapse, an input signal to be supplied to each neuron unit being weighted by a weight of a corresponding synapse whereby each neuron unit receives one or more weighted input signals, each neuron unit which receives more than one of said weighted input signal assigning each said weighted input signal to one of a plurality of groups of weighted input signals, summing up each of said groups of weighted input signals to provide an intermediate output signal for each said group, and processing the intermediate output signals to produce an output signal of the neuron unit, said method comprising the steps of:

(1) supplying an input signal to the neuron unit at the input layer, and supplying a predetermined desired output signal, which is equal to a reference output signal desired to be generated from the neuron unit at the output layer whenever said input signal is supplied to the neuron unit at the input layer;

(2) providing an internal error signal representative of an internal error of a neuron unit at the output layer as a difference between said predetermined desired output signal and an actual output signal of the neuron unit at the output layer;

(3) providing a partial differential coefficient signal representative of a partial differential coefficient, said coefficient being a partial differential of the output signal of the neuron unit with respect to each one of said weighted input signals;

(4) providing an error signal by electronically processing the partial differential coefficient signal, weight, and internal error signal;

(5) providing an internal error signal of the neuron unit at a hidden layer by summing, one layer at a time, error signals backpropagated to the neuron unit from neurons located at a preceding layer of said network; and (6) modifying, by electronically processing the partial differential coefficient signal and the internal error signal, the weight of each of the weighted input signals, so that the output signal of the neuron unit at the output layer can approximate the predetermined output signal.

2. A method according to claim 1, wherein the neural network is a pulse density neural network which is architected on a chip as a digital circuit, and expresses various data as a signal representative of a synchronous bit string consisting of an ON-bit and an OFF-bit, an ON-bit density being defined as a ratio of ON-bits to total number of bits, so that arbitrary data is expressed by subtracting a negative component thereof ($\geq 0$) from a positive component thereof ($\geq 0$) to provide a difference signal representative of a difference between said positive and negative components, wherein the number of groups is two, and wherein each weighted input signal, internal error signal, and partial differential coefficient signal is provided by subtracting a signal representative of a corresponding negative component from signal representative of a corresponding positive component, so that said steps of providing and/or modifying each said signal representative of weight, difference, and partial differential coefficient are individually performed for each said signal representative of corresponding negative component and corresponding positive component.

3. A method according to claim 2, wherein said step of providing a signal representative of a difference between the predetermined output signal and an actual output signal of the neuron unit as the output layer is performed in accordance with the following equations:

$$\Delta_j = \Delta_{j+} - \Delta_{j-}$$

$$\Delta_{j+} = d_j(1-Y_j), \text{ and}$$

$$\Delta_{j-} = Y_j(1-d_j),$$

where "$d_j$" represents the predetermined output signal to be generated from the neuron unit "j", "$Y_j$" represents the actual output signal of the neuron unit "j", $\Delta_j$ represents the difference between $d_j$ and $Y_j$ of the neuron unit "j", "j" represents an identification of the neuron unit, an identification of the neuron unit at the output layer being substituted for "j" in the above equation, $\Delta_{j+}$ represents a positive component of $\Delta_j$, and $\Delta_{j-}$ represents a negative component of $\Delta_j$.

4. A method according to claim 2, wherein said step of providing an internal error signal is performed in accordance with the following equations:

$$\Delta_j = \Delta_{j+} - \Delta_{j-},$$

$$\Delta_{j+} = d_j - Y_j, \Delta_{j-} = 0 \text{ (if } Y_j < d_j\text{), and}$$

$$\Delta_{j-} = Y_j - d_j, \Delta_{j+} = 0 \text{ (if } Y_j \geq d_j\text{)},$$

where "$d_j$" represents a desired output signal to be generated from the neuron unit "j", "$Y_j$" represents the actual output signal of the neuron unit "j", "$\Delta_j$" represents the difference between $d_j$ and $Y_j$ of the neuron unit "j", "j" represents an identification of the neuron unit, an identification of the neuron unit at the output layer being substituted for "j" in the above equation, "$\Delta_{j-}$" represents a negative component of $\Delta_j$.

5. A method according to claim 2, wherein said step of partial differential coefficient signal is performed in accordance with the following equations:

$$Z_{ji} = Z_{ji+} - Z_{ji-},$$

$$Z_{ji+} = (\partial f/\partial U_{j+}).(\partial U_{j+}/\partial S_{ji}), \text{ and}$$

$$Z_{ji-} = (\partial f/\partial U_{j-}).(\partial U_{j-}/\partial S_{ji}),$$

where "f" represents the output of a neuron unit as a function $U_{j+}$ and $U_{j-}$, "$S_{ji}$" represents a weighted input signal from among the weighted input signals to be input from a neuron unit "i" to a neuron unit "j", "$U_{j+}$" is a function which accumulates inputs in a group of input signals corresponding to $S_{ji}$, which $U_{j+}$ is allotted to an excitatory synapse having a positive weight, "$U_{j-}$" is a function which accumulates inputs in a group of input signals corresponding to $S_{ji}$, which $U_{j-}$ is allotted to an inhibitory synapse having a negative weight, "$Z_{ji}$" represents the partial differential coefficient of a synapse between the neutron unit "i" and the neuron unit "j", and "$Z_{ji+}$" is a positive component of $Z_{ji}$ whereas "$Z_{ji-}$" is a negative component of $Z_{ji}$.

6. A method according to claim 2, wherein said step of providing sequentially, layer by layer, an internal error signal of each neuron unit in the hidden layers is performed in accordance with the following equations:

$$\Delta_j = \Delta_{j+} - \Delta_{j-},$$

$$\Delta_{j+} = \sum_{k+} G_{kj++} + \sum_{k-} G_{kj--},$$

$$\Delta_{j-} = \sum_{k+} G_{kj+-} + \sum_{k-} G_{kj-+},$$

$$\Delta_k = \Delta_{k+} - \Delta_{k-},$$
$$Z_{kj} = Z_{kj+} - Z_{kj-},$$
$$G_{kj++} = Z_{kj+} W_{kj+} \Delta_{k+},$$
$$G_{kj+-} = Z_{kj+} W_{kj+} \Delta_{k-},$$
$$G_{kj-+} = Z_{kj-} W_{kj-} \Delta_{k+}, \text{ and}$$
$$G_{kj--} = Z_{kj-} W_{kj-} \Delta_{k-},$$

where "$\Delta_j$" represents the internal error signal of the neuron unit "j", "j" represents an identification of the neuron unit, an identification of an arbitrary neuron unit being substituted for "j" in the above equations, "$\Delta_{j+}$" represents a positive component of $\Delta_j$ whereas "$\Delta_{j-}$" represents a negative component of $\Delta_j$, "$\Delta_k$" represents a positive component of $\Delta_k$ whereas "$\Delta_{k-}$" represents a negative component of $\Delta_k$, "k+" relates to neuron units "k" each of which respectively receives an input from the neuron unit "j" via an excitatory synapse which has a positive weight "$W_{kj+}$" whereas "k−" relates to neuron units "k" each of which receives a signal from the neuron unit "j" via an inhibitory synapse which has a negative weight "$W_{kj-}$", "$G_{kj++}$" and "$G_{kj+-}$" are respectively transmitted via the excitator synapse whereas "$G_{kj--}$" and "$G_{kj-+}$" are transmitted via the inhibitory synapse, "$Z_{kj}$" represents the partial differential coefficient of a synapse between the neuron unit "j" and the neuron unit "k", and "$Z_{kj+}$" is a positive component of $Z_{kj}$ whereas "$Z_{kj-}$" is a negative component of $Z_{kj}$.

7. A method according to claim 2, wherein said step of modifying, by electronically processing the partial differential coefficient signal and the internal error signal, the weight of each of the weighted input signals is performed by the following equations:

$$W_{ji}' = W_{kj+} - W_{kj-},$$

$$W_{ji} = W_{ji+} - W_{ji-},$$

$$\Delta_j = \Delta_{j+} - \Delta_{j-},$$

$$W_{ji}'+ = W_{ji+} + \eta Z_{ji+} X_i (\Delta_{j+} - \Delta_{j-}), \text{ and}$$

$$W_{ji}'- = W_{ji-} + \eta Z_{ji-} X_i (\Delta_{j-} - \Delta_{j+}),$$

where "$W_{ji}'$" is a modified weight of a synapse between a neuron unit "i" and a neuron unit "j", "$W_{ji}'+$" is a positive component of "$W_{ji}'$" whereas "$W_{ji}'-$" is a negative component of "$W_{ji}'$", "$W_{ji}$" is a premodified weight of the synapse between the neuron unit "i" and the neuron unit "j", "$W_{ji+}$" is a positive component of "$W_{ji}$" whereas "$W_{ji-}$" is a negative component of "$W_{ji}$", $\eta$ is a constant called a learning ratio, $X_i$ is an input supplied to the neuron unit "j", "$\Delta_j$" represents the internal error signal representative of an internal error of the neuron unit "j", and "$\Delta_{j+}$" represents a positive component of $\Delta_j$ whereas "$\Delta_{j-}$" represents a negative component of $\Delta_j$.

8. A method according to claim 1, wherein said step of providing an internal error signal is performed in accordance with the following equation:

$$\Delta_j = d_j - Y_j,$$

where "$d_j$" represents the predetermined output signal to be generated from a neuron unit "j", "$Y_j$" represents the actual output signal of the neuron unit "j", "$\Delta_j$" represents the difference between $d_j$ and $Y_j$ of the neuron unit "j", "j" represents an identification of the neuron unit, and, in this equation, an identification of the neuron unit at the output layer is substituted for "j", and wherein said step of providing a partial differential coefficient signal is performed in accordance with the following equation:

$$Z_{ji} = \partial f / \partial S_{ji}$$
$$= (\partial f / \partial U_{jr}) \cdot (\partial U_{jr} / \partial S_{ji}),$$

where "f" represents the output of a neuron unit as a function of $U_{jr}$, "$S_{ji}$" represents a weighted input signal from among the weighted input signals to be input from a neuron unit "i" to the neuron unit "j", "$U_{jr}$" (r=1, ... t, "t" is the number of groups) is a function which accumulates inputs in the "r"-th group of input signals which corresponds to $S_{ji}$, and "$Z_{ji}$" represents the partial differential coefficient signal for a synapse between the neuron unit "i" and the neuron unit "j", and wherein said step of providing sequentially, layer by layer, an internal error signal of each neural unit in hidden layers is performed in accordance with the following equation:

$$\Delta_j = \Sigma_k Z_{kj} W_{kj} \Delta_k,$$

where $W_{kj}$ represents a weight of a synapse between the neuron unit "j" and one of the plurality of neuron units "k" which respectively receive the output signal from the neuron unit "j" as the input signal to the neuron unit "k", $\Sigma_k$ represents a summation of the succeeding function for all values of k, and $\Delta_k$ is the internal error of one of the neuron units "k", and wherein said step of modifying, by electronically processing the partial differential coefficient signal and the internal error signal, the weight of each of the weighted input signals, is performed by the following equation:

$$W_{ji}' = W_{ji} + \eta Z_{ji} X_i \Delta_j,$$

where $W_{ji}'$ is a modified weight of a synapse between the neuron unit "i" and the neuron unit "j", $W_{ji}$ is a premodified weight between the neuron unit "i" and the neuron unit "j", $\eta$ is a predetermined constant called a learning ratio, and $X_i$ is an input signal applied to the neuron unit "j".

9. A neuron network comprising:
an input layer;
an output layer; and
at least one hidden layer located between said input layer and output layer,
wherein the input layer, hidden layer and output layer each respectively includes at least one neuron unit, neuron units arranged at subsequent layers being interconnected to each other via a synapse, an input signal to be supplied to each neuron unit in hidden layers and output layer, said input signal being weighted by a weight of a corresponding synapse whereby each neuron unit receives weighted input signals, and
wherein each neuron unit comprises:
output signal generating means for generating an output signal from a plurality of weighted input signals, said means including further means for separating the plurality of weighted input signals into more than one group, for summing up weighted input signals in each group to provide each group's intermediate output signals, and for processing the intermediate output signals to produce an output signal of the neuron unit;

internal error signal generating means for generating an internal error signal for each neuron unit in the output layer which is representative of a difference between a desired output signal and an actual output signal of the neuron unit at the output layer;

internal error generating means for generating an internal error signal for each neuron unit in hidden layers by summing error signals backpropagated to the neuron unit from neuron units in other layers;

sensitivity generating means for generating a sensitivity signal, said sensitivity signal being representative of a partial differential coefficient that is the result of successively partially differentiating the output signal of the neuron unit with respect to each weighted input signal;

error signal generating means for generating error signals, by electronically processing the sensitivity signal for the synapse, the internal error signal, and the weight for the synapse; and back-propagation means, coupled to said error signal generating means, for back-propagating each of said error signals through each synapse; and weight modifying means, coupled to said internal error signal generating means and sensitivity signal generating means, for modifying each weight of a weighted input signal of said neuron unit, by electronically processing the internal error signal and sensitivity signal of said neuron unit.

10. A neural network according to claim 9, wherein said neural network is a pulse-density neutral network which is architected on a chip as a digital circuit and expresses various data as a signal representative of a synchronous bit string consisting of an ON-bit and an OFF-bit, an ON-bit density being defined as a ratio of ON-bit to total number of bits, so that arbitrary data is expressed by subtracting a negative component thereof ($\geq 0$) from a positive component thereof ($\geq 0$) to provide a difference signal representative of a difference between said positive and negative components.

11. A neural network according to claim 9, wherein said neuron units are semiconductor integrated circuits, wherein the number of groups is two, and wherein input signals from an excitatory synapse have a positive weight and input signals from an inhibitory synapse have a negative weight.

12. A neural network according to claim 11, wherein the output signal generating means comprises:
a first OR circuit for providing a first signal representative of a logical sum of first weighted input signals among the weighted input signals, each of the first weighted input signals being generated from an input signal transmitted through the excitatory synapse to be weighted by the positive weight;

a second OR circuit for providing a second signal representative of a logical sum of second weighted inputs signals among the weighted input signals, each of the second weighted input signals being generated from an input signal transmitted through the inhibitory synapse to be weighted by the negative weight;

a first inverter, coupled to the second OR circuit, for inverting an output of the second OR circuit; and a first AND circuit, coupled to the first OR circuit and to the first inverter, for providing a signal representative of a logical product of both output signals from the first OR circuit and first inverter.

13. A neural network according to claim 12, wherein the output signal generating means further comprises:
a plurality of memories, each corresponding to a synapse, and for storing signals representative of whether the corresponding synapse is an excitatory synapse or an inhibitory synapse; and a plurality of set circuits, each coupled to a corresponding memory among the plurality of memories, for providing a plurality of corresponding weighted input signals either to the first OR circuit if the corresponding memory stores a signal representative of an excitatory synapse, or else to the second OR circuit if the corresponding memory stores a signals representative of an inhibitory synapse.

14. A neural network according to claim 13, wherein each of the plurality of set circuits comprises:
a second inverter coupled to the corresponding memory;

a second AND circuit, having a first input terminal, a second input terminal, and an output terminal, where said first input terminal receives the corresponding weighted input signal, said second input terminal is connected to the corresponding memory via the second inverter, and said output terminal is connected to one of input terminals of the first OR circuit; and a third AND circuit, having a first input terminal, a second input terminal, and an output terminal, where said first input terminal receives the plurality of corresponding weighted input signals, said second input terminal is directly connected to the corresponding memory, and said output terminal is connected to one of input terminals of the second OR circuit.

15. A neural network according to claim 11, wherein the output signal generating means comprises:
a first OR circuit for providing a first signal representative of a first logical sum of first weighted input signals among the weighted input signals, each of the first weighted input signals being generated from an input signal transmitted through the excitatory synapse to be weighted by the positive weight;

a second OR circuit for providing a second signal representative of a second logical sum of second weighted input signals among the weighted input signals, each of the second weighted input signals being generated from an input signal transmitted through the inhibitory synapse to be weighted by the negative weight;

an exclusive OR circuit for providing a third signal, a first input terminal of said circuit being connected to an output terminal of the first OR circuit and a second input terminal thereof being connected to an output terminal of the second OR circuit;

a first inverter, coupled to the exclusive OR circuit, which inverts an output signal from the exclusive OR circuit;

a first AND circuit having a first input terminal connected to the output terminal of the first OR circuit, thereby receiving said first signal at said first input terminal, and having a second input terminal connected to the output terminal of the exclusive OR circuit, thereby receiving said third signal at said second input terminal, said first AND circuit having means for providing at an output terminal thereof a signal representative of a logical product of said first and third signals received, respectively, at said first and second input terminals of said first AND circuit; and a second AND circuit, one input terminal of which is connected to an output of the first inverter, a second input terminal of which is connected to an external signal generator which generates a predetermined input signal; and a third OR circuit, coupled to the first and second AND circuits, for providing a signal representative of a logical product of both outputs of the first and second AND circuits thereby providing the output signal.

16. A neural network according to claim 11, wherein the output signal generating means comprises:

a first OR circuit for providing a first signal representative of a logical sum of first weighted input signals among the weighted input signals, each of the first weighted input signals being generated from an input transmitted through the excitatory synapse to be weighted by the positive weight;

a second OR circuit for providing a second signal representative of a logical sum of second weighted input signals among the weighted input signals, each of the second weighted input signals being generated from an input signal transmitted through the inhibitory synapse to be weighted by the negative weight;

a two-input exclusive OR circuit for providing an XOR signal at an output terminal of said exclusive OR circuit, said XOR signal being a logical 1 when one of said two inputs is a logical 1 and the other one of said two inputs is a logical 0, and said XOR signal being a logical 0 when both of said two inputs are logical 1s or both are logical 0s, one input terminal of said exclusive OR circuit being connected to an output terminal of the first OR circuit and the other input terminal of said exclusive OR circuit being connected to an output terminal of the second OR circuit;

a first inverter, coupled to the exclusive OR circuit, for inverting an output signal from the exclusive OR circuit;

a first AND circuit having a first input terminal connected to the output terminal of the first OR circuit, thereby receiving said first signal at said first input terminal, and having a second input terminal, connected to the output terminal of the exclusive OR circuit, thereby receiving said XOR signal at said second input terminal, said first AND circuit having means for providing at an output terminal thereof a signal representative of a logical product of said first and XOR signals received at said input terminals of said AND circuit;

a second AND circuit, one input terminal of which is connected to an output of the first inverter, the other input terminal of which is connected to an external signal generator which generates a predetermined input signal;

a third OR circuit, coupled to the first and second AND circuits, for providing a third signal representative of a logical product of both output signals from the first and second AND circuits thereby generating the output signal;

a plurality of memories, each corresponding to a synapse, and each of which stores a signal representative of whether the corresponding synapse is an excitatory synapse or an inhibitory synapse; and a plurality of set circuits, each coupled to a corresponding memory among the plurality of memories, for providing corresponding weighted input signals either to the first OR circuit if the corresponding memory stores a signal representative of an excitatory synapse, or else to the second OR circuit if the corresponding memory stores representative of an inhibitory synapse.

17. A neural network according to claim 11, wherein the sensitivity generating means comprises:

a set of first OR circuits, one for each excitatory synapse, for providing a first set of sum signals representative of a logical sum of weighted input signals generated from input signals transmitted through all of the excitatory synapses in a neuron unit but a first excluded synapse, where said first OR circuit belongs to said first excluded synapse, where each of said first OR circuits has an output port;

a set of second OR circuits, one for each inhibitory synapse, for providing a second set of sum signals representative of a logical sum of weighted input signals generated from input signals transmitted through all of the inhibitory synapses in a neuron unit but a second excluded synapse, where said second OR circuit belongs to said second excluded synapse, where each of said second OR circuits has an output port;

inversion means, having first and second input ports coupled respectively to the output ports of said first and second OR circuits, for inverting either said first set of sum signals of said second set of sum signals, whereby a set of inverted signals is provided at an output port of said inversion means; and a divider, coupled to said output port of said inversion means, for reducing an ON-bit density of said set of inverted signals to one half thereof.

18. A neural network according to claim 17, wherein the sensitivity generating means further comprises:

a plurality of memories, each corresponding to a synapse, and for storing signals representative of whether the corresponding synapse is an excitatory synapse or an inhibitory synapse; and a plurality of set circuits, each coupled to a corresponding memory from among the plurality of memories, for providing corresponding weighted input signals either to the first OR circuit if the corresponding memory stores a signal representative of an excitatory synapse, or else to the second OR circuit if the corresponding memory stores a signal representative of an inhibitory synapse.

19. A neural network according to claim 18, wherein each of the plurality of set circuits comprises:

a third inverter coupled to the corresponding memory;

a first AND circuit, having a first input terminal, a second input terminal, and an output terminal, where said first input terminal receives the corresponding weighted input, said second input terminal is connected to the corresponding memory via the third inverter, and said output terminal is connected to the first OR circuit; and a second AND circuit, having a first input terminal, a second input terminal, and an output terminal, where said first input terminal receives each of the weighted input signals, said second input terminal is directly connected to the memory, and said output terminal is connected to the second OR circuit.

20. A neural network according to claim 11, wherein the sensitivity generating means comprises:
  a set of first OR circuits, one for each excitatory synapse, for providing a first set of sum signals representative of a logical sum of weighted input signals generated from input signals transmitted through all of the excitatory synapses in a neuron unit but a first excluded synapse, where said first OR circuit belongs to said first excluded synapse;
  a first inverter, coupled to each first OR circuit, for inverting said first set of sum signals, whereby a first inverted signal is provided;
  a set of second OR circuits, one for each inhibitory synapse, for providing a second set of sum signals representative of a logical sum of weighted input signals generated from input signals transmitted through all of the inhibitory synapses in a neuron unit but a second excluded synapse, where said second OR circuit belongs to said second excluded synapse;
  a second inverter, coupled to each second OR circuit, for inverting said second set of sum signals, whereby a second inverted signal is provided;
  a third OR circuit for providing a third sum signal representative of a logical sum of weighted input signals generated from input signals transmitted through all of the excitatory synapses in a neuron unit;
  a fourth OR circuit for providing a fourth sum signal representative of a logical sum of weighted input signals generated from input signals transmitted through all of the inhibitory synapses in a neuron unit;
  a third inverter, coupled to the fourth OR circuit, for inverting said fourth sum signal, whereby a third inverted signal is provided;
  a first AND circuit, for providing an inhibitory sensitivity signal representative of a logical product of said first and third inverted signals and
  a second AND circuit, for providing an inhibitory sensitivity signal representative of a logical product of said second inverted signal and said third sum signal.

21. A neural network according to claim 11, wherein the internal error generating means of the neuron unit at the hidden layer comprises:
  a first OR circuit for providing a first sum signal representative of a logical sum of all positive components of error signals backpropagated from subsequent neuron units, providing a positive component of the internal error signal; and
  a second OR circuit for providing a second sum signal representative of a logical sum of all negative components of error signals backpropagated from subsequent neuron units, providing a negative component of the internal error signal.

22. A neural network according to claim 21, wherein said internal error generating means further comprises:
  a first divider, coupled to the first OR circuit, for reducing the ON-bit density of an output of the first OR circuit; and
  a second divider, coupled to the second OR circuit, for reducing the ON-bit density of an output of the second OR circuit.

23. A neural network according to claim 11, wherein said internal error generating means of the neuron unit at the hidden layer comprises:
  a first OR circuit for providing at an output terminal thereof a first signal representative of a logical sum of all positive components of error signals backpropagated from subsequent neuron units via excitatory synapses;
  a second OR circuit for providing at an output terminal thereof a second signal representative of a logical sum of all positive components of error signals backpropagated from subsequent neuron units via inhibitory synapses;
  a third OR circuit for providing at an output terminal thereof a third signal representative of a logical sum of all negative components of error signals backpropagated from subsequent neuron units via excitatory synapses;
  a fourth OR circuit for providing at an output terminal thereof a fourth signal representative of a logical sum of all negative components of error signals backpropagated from subsequent neuron units via inhibitory synapses;
  a bit string generating means for generating at an output terminal thereof a signal representative of a bit string having an ON-bit density of 0.5;
  a first AND circuit, having a first input terminal, a second input terminal, and an output terminal, where said first input terminal is connected to said output terminal of the first OR circuit, and said second input terminal is connected to said output terminal of the second OR circuit;
  a second AND circuit, having a first input terminal, a second input terminal, and an output terminal, where said first input terminal is connected to said output terminal of the second OR circuit, and said second input terminal is connected to said output terminal of the bit string generating means;
  a third AND circuit, having a first input terminal, a second input terminal, and an output terminal, where said first input terminal is connected to the output terminal of the first OR circuit, and said second input terminal is connected to said output terminal of the bit string generating means;
  a fourth AND circuit, having a first input terminal, a second input terminal, and an output terminal, where said first input terminal is connected to said output terminal of the third OR circuit, and said second input terminal is connected to said output terminal of the fourth OR circuit;
  a fifth AND circuit, having a first input terminal, a second input terminal, and an output terminal, where said first input terminal is connected to said output terminal of the fourth OR circuit, and said second input terminal is connected to said output terminal of the bit string generating means;
  a sixth AND circuit, having a first input terminal, a second input terminal, and an output terminal, where said first input terminal is connected to the output terminal of the third OR circuit, and said second input terminal of which is connected to said output terminal of the bit string generating means;
  a fifth OR circuit, coupled to said output terminals of said first, second, and third AND circuits, for providing a signal representative of a logical sum of output signals of the first, second, and third AND circuits, providing a positive component of the internal error signal; and a sixth OR circuit, coupled to said output terminals of said fourth, fifth, and sixth AND circuits, for providing a signal representative of a logical sum of output signals of the fourth, fifth, and sixth AND circuits, providing a negative component of the internal error signal.

24. A neural network according to claim 11, wherein the internal error generating means of the neuron unit at the output layer comprises:
- an exclusive OR circuit one input terminal of which receives the predetermined output signal of the neuron unit at the output layer, and a second input terminal of which receives the actual output signal of the neuron unit at the output layer;
- a first AND circuit, one input terminal of which receives the predetermined output signal of the neuron unit at the output layer, and a second input terminal of which is connected to an output terminal of the exclusive OR circuit, providing a positive component of the internal error signal; and
- a second AND circuit, one input terminal of which receives the actual output signal of the neuron unit at the output layer, and a second input terminal of which is connected to the output terminal of the exclusive OR circuit, providing a negative component of the internal error signal.

25. A neural network according to claim 11, wherein the internal error generating means of the neuron unit at the output layer comprises:
- a first inverter for receiving the predetermined output signal of the neuron unit at the output layer;
- a second inverter for receiving the actual output signal of the neuron unit at the output layer;
- a first AND circuit, one input terminal of which is connected to an output terminal of the first inverter, and a second input terminal of which receives the desired output signal of the neuron unit at the output layer, providing a positive component of the internal error signal; and
- a second AND circuit, one input terminal of which is connected to an output terminal of the second inverter, and a second input terminal of which receives the actual output signal of the neuron unit at the output layer, providing a negative component of the internal error signal.

26. A neural network according to claim 11, wherein the error signal generating means comprises:
- a flag for indicating whether a synapse connected to the neuron unit is an excitatory synapse or an inhibitory synapse;
- a switching circuit, coupled to the flag, for individually receiving positive and negative components of the sensitivity signal and the internal error signal, and for selecting positive components of the sensitivity signal and the internal error signal if the flag indicates that the synapse is the excitatory synapse, or selecting negative components of the sensitivity signal and internal error signal if the flag indicates that the synapse is the inhibitory synapse;
- a first AND circuit, one terminal of which receives a weight, and a second input terminal of which is connected to the switching circuit, for providing a signal representative of a logical product of the weight and the positive or negative component of the sensitivity signal selected by the switching circuit;
- a second AND circuit, one input terminal of which is connected to an output terminal of the first AND circuit, and a second input terminal of which is connected to the switching circuit, for providing a signal representative of a logical product of an output signal of the first AND circuit and the positive component of the internal error signal, providing a positive component of the error signal; and
- a third AND circuit, one input terminal of which is connected to an output terminal of the first AND circuit, and a second input terminal of which is connected to the switching circuit, for providing a signal representative of a logical product of an output signal of the first AND circuit and the negative component of the internal error signal, providing a negative component of the error signal.

27. A neural network according to claim 26, wherein the error signal generating means further comprises an inverter connected to the flag, and wherein the switching circuit comprises:
- a fourth AND circuit, one input terminal of which is connected to the flag via the inverter, and a second input terminal of which receives the positive component of the sensitivity signal;
- a fifth AND circuit, one input terminal of which is directly connected to the flag, and a second input terminal of which receives the negative component of the sensitivity signal;
- a sixth AND circuit, one input terminal of which is connected to the flag via the inverter, and a second input terminal of which receives the positive component of the internal error signal;
- a seventh AND circuit, one input terminal of which is directly connected to the flag, and a second input terminal of which is connected to the negative component of the internal error signal;
- an eighth AND circuit, one input terminal of which is directly connected to the flag, and a second input terminal of which is connected to the positive component of the internal error signal;
- a ninth AND circuit, one input terminal of which is connected to the flag via the inverter, and a second input terminal of which is connected to the negative component of the internal error signal;
- a first OR circuit, one input terminal of which is connected to an output terminal of the fourth AND circuit, a second input terminal of which is connected to an output terminal of the fifth AND circuit, and an output terminal of which is connected to a second input terminal of the first AND circuit;
- a second OR circuit, one input terminal of which is connected to an output terminal of the sixth AND circuit, a second input terminal of which is connected to an output terminal of the seventh AND circuit, and an output terminal of which is connected to a second input terminal of the second AND circuit; and
- a third OR circuit, one input terminal of which is connected to an output terminal of the eighth AND circuit, a second input terminal of which is connected to an output terminal of the ninth AND circuit, and an output terminal of which is connected to a second input terminal of the third AND circuit.

28. A neural network according to claim 11, wherein the error signal generating means of the neuron unit for receiving a weighted input via an excitatory synapse comprises:

a first AND circuit, one input terminal of which receives a weight of the excitatory synapse, and a second input terminal of which receives a positive component of the sensitivity signal;

a second AND circuit, one input terminal of which is connected to an output terminal of the first AND circuit, and a second input terminal of which receives a positive component of the internal error signal, providing a positive component of the error signal; and a third AND circuit, one input terminal of which is connected to an output terminal of the first AND circuit, and a second input terminal of which receives a negative component of the internal error signal, providing a positive component of the error signal.

29. A neural network according to claim 11, wherein the error signal generating means of the neuron unit for receiving a weighted input via an inhibitory synapse comprises:

a first AND circuit, one input terminal of which receives a weight of the inhibitory synapse, and a second input terminal of which receives a negative component of the sensitivity signal;

a second AND circuit, one input terminal of which is connected to an output terminal of the first AND circuit, and a second input terminal of which receives a positive component of the internal error signal, providing a negative component of the error signal; and a third AND circuit, one input terminal of which is connected to an output terminal of the first AND circuit, and a second input terminal of which receives a negative component of the internal error signal, providing a positive component of the error signal.

30. A neural network according to claim 11, wherein the weight modifying means comprises:

a flag for indicating whether a synapse is an excitatory synapse or an inhibitory synapse;

a switching circuit, coupled to the flag, for individually receiving positive and negative components of the sensitivity signal and internal error signal, and for selecting positive components of the sensitivity signal and internal error signal if the flag indicates that the synapse is the excitatory synapse, or selects negative components of the sensitivity signal and internal error signal if the flag indicates that the synapse is the inhibitory synapse;

a first AND circuit, one input terminal of which receives an input, and a second input terminal of which is connected to the switching circuit, for providing a signal representative of a logical product of the input signal and the positive or negative component of the sensitivity signal selected by the switching circuit;

a second AND circuit, one input terminal of which is connected to an output terminal of the first AND circuit, and a second input terminal of which is connected to the switching circuit, for providing a signal representative of a logical product of an output signal of the first AND circuit and the positive component of the internal error signal, providing a positive component of the error signal;

a third AND circuit, one input terminal of which is connected to an output terminal of the first AND circuit, and a second input terminal of which is connected to the switching circuit, for providing a signal representative of a logical product of an output signal of the first AND circuit and the negative component of the internal error signal, providing a negative component of the error signal;

a first density reducing circuit, coupled to the second AND circuit, for reducing an ON-bit density of an output of the second AND circuit;

a second density reducing circuit, coupled to the third AND circuit, for reducing an ON-bit density of an output of the third AND circuit;

a first OR circuit, one input terminal of which is connected to the first density reducing circuit, and a second input terminal of which receives a weight;

a first inverter coupled to the second density reducing circuit; and a fourth AND circuit, one input terminal of which is connected to an output terminal of the first OR circuit, and a second input terminal of which is connected to the second density reducing circuit via the inverter, for providing a signal representative of a logical product of the output signal of the first OR circuit and the output signal of the first inverter, providing a modified weight, the modified weight superseding a premodified weight.

31. A neural network according to claim 30, wherein the weight modifying means further comprises a second inverter connected to the flag, and wherein the switching circuit comprises:

a fifth AND circuit, one input terminal of which is connected to the flag via the second inverter, and a second input terminal of which receives the positive component of the sensitivity signal;

a sixth AND circuit, one input terminal of which is directly connected to the flag, and a second input terminal of which receives the negative component of the sensitivity signal;

a seventh AND circuit, one input terminal of which is connected to the flag via the second inverter, and a second input terminal of which receives the positive component of the internal error signal;

an eighth AND circuit, one input terminal of which is directly connected to the flag, and a second input terminal of which is connected to the negative component of the internal error signal;

a ninth AND circuit, one input terminal of which is directly connected to the flag, and a second input terminal of which is connected to the positive component of the internal error signal;

a tenth AND circuit, one input terminal of which is connected to the flag via the second inverter, and a second input terminal of which is connected to the negative component of the internal error signal;

a second OR circuit, one input terminal of which is connected to an output terminal of the fifth AND circuit, a second input terminal of which is connected to an output terminal of the sixth AND circuit, and an output terminal of which is connected to a second input terminal of the first AND circuit;

a third OR circuit; one input terminal of which is connected to an output terminal of the seventh AND circuit, a second input terminal of which is connected to an output terminal of the eighth AND circuit, and an output terminal of which is connected to a second input terminal of the second AND circuit; and a fourth OR circuit, one input terminal of which is connected to an output terminal of the ninth AND circuit, a second input terminal of which is connected to an output terminal of the tenth AND circuit, and an output terminal of which is connected to a second input terminal of the third AND circuit.

* * * * *

UNITED STATES PATENT AND TRADEMARK OFFICE
CERTIFICATE OF CORRECTION

PATENT NO.   :   5,283,855
DATED        :   February 1, 1994
INVENTOR(S)  :   Shuji MOTOMURA, et al.

It is certified that error appears in the above-indentified patent and that said Letters Patent is hereby corrected as shown below:

On the title page, Item [75], the Inventors' city and country should read as follows:

[75] --all of Yokohama, Japan--

Signed and Sealed this

Fifth Day of July, 1994

Attest:

BRUCE LEHMAN

*Attesting Officer*        *Commissioner of Patents and Trademarks*